United States Patent [19]
Beck et al.

[11] Patent Number: 5,832,511
[45] Date of Patent: *Nov. 3, 1998

[54] WORKGROUP NETWORK MANAGER FOR CONTROLLING THE OPERATION OF WORKSTATIONS WITHIN THE COMPUTER NETWORK

[75] Inventors: Robert Earl Beck, Arlington Heights; Ronald L. Schoenberger, Clarendon Hills, both of Ill.

[73] Assignee: Beck Systems, Inc., Chicago, Ill.

[ * ] Notice: The term of this patent shall not extend beyond the expiration date of Pat. No. 5,586,322.

[21] Appl. No.: 746,499

[22] Filed: Nov. 12, 1996

Related U.S. Application Data

[63] Continuation-in-part of Ser. No. 459,528, Jun. 2, 1995, Pat. No. 5,586,322, which is a continuation-in-part of Ser. No. 986,116, Dec. 4, 1992, abandoned, which is a continuation-in-part of Ser. No. 898,191, Jun. 11, 1992, Pat. No. 5,440,739.

[51] Int. Cl.⁶ .................................................. G06F 15/163
[52] U.S. Cl. ...................... 707/201; 707/10; 395/200.33; 395/200.38; 395/200.58
[58] Field of Search ................ 707/10, 201; 395/200.33, 395/200.38, 200.53, 200.58

[56] References Cited

U.S. PATENT DOCUMENTS

| | | | |
|---|---|---|---|
| 4,905,162 | 2/1990 | Hartzband et al. ..................... | 395/62 |
| 4,999,766 | 3/1991 | Peters et al. ............................... | 707/10 |
| 5,113,519 | 5/1992 | Johnson et al. .......................... | 707/201 |
| 5,261,069 | 11/1993 | Wilkinson et al. ...................... | 711/145 |
| 5,440,739 | 8/1995 | Beck et al. ............................... | 395/650 |
| 5,450,606 | 9/1995 | Shiga et al. .............................. | 395/712 |
| 5,537,587 | 7/1996 | Kelley et al. ............................ | 707/200 |
| 5,586,322 | 12/1996 | Beck et al. ............................... | 707/200 |

*Primary Examiner*—Thomas G. Black
*Assistant Examiner*—Jean Raymond Homere
*Attorney, Agent, or Firm*—Fitch, Even, Tabin & Flannery

[57] ABSTRACT

A workgroup organized network manager for controlling the operation of individual workstations within a computer network. The workgroup organized network manager organizes workstations into workgroups and controls the distribution of information to each of the workstations within a defined workgroup. The tasks each workstation performs are defined by a specification consisting of programs. A library of programs is maintained on a host workstation designated as a controlling workstation within the workgroup. The host workstation keeps track of activity occurring on the individual workstations within the workgroup. A file maintenance and inventory system compares the attributes of files, directories, and software located on the workstation to check for discrepancies between files, directories, or software intended to be identical and for locating missing or extra files, directories, and software.

36 Claims, 43 Drawing Sheets

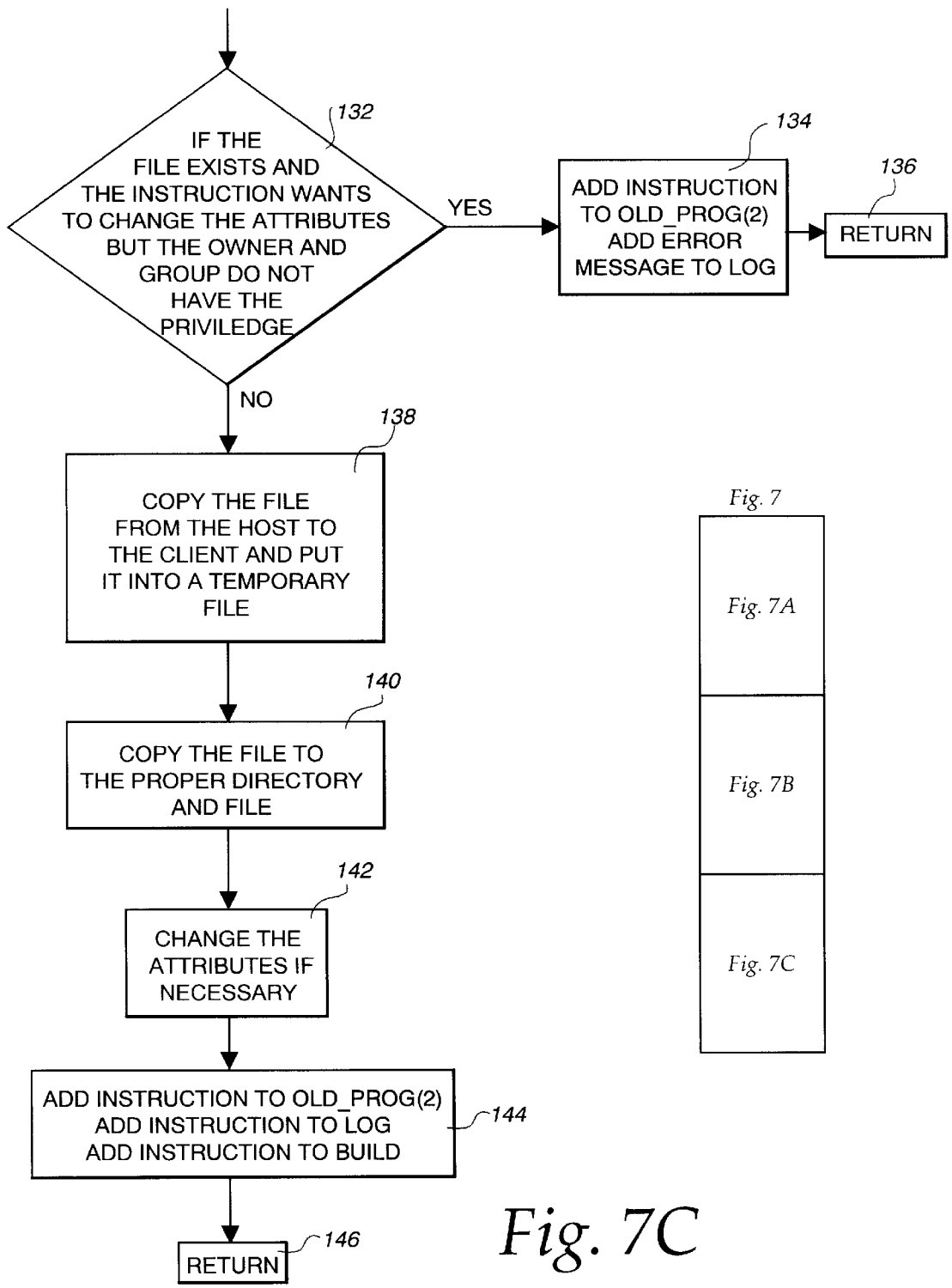

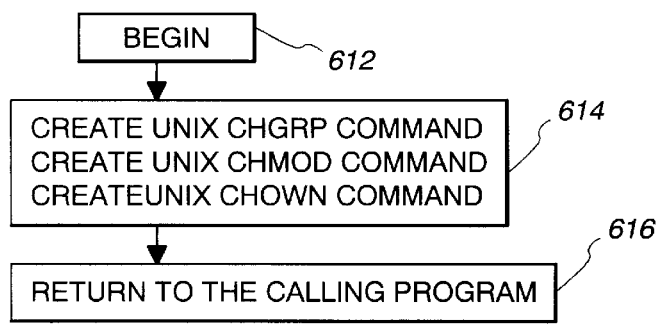
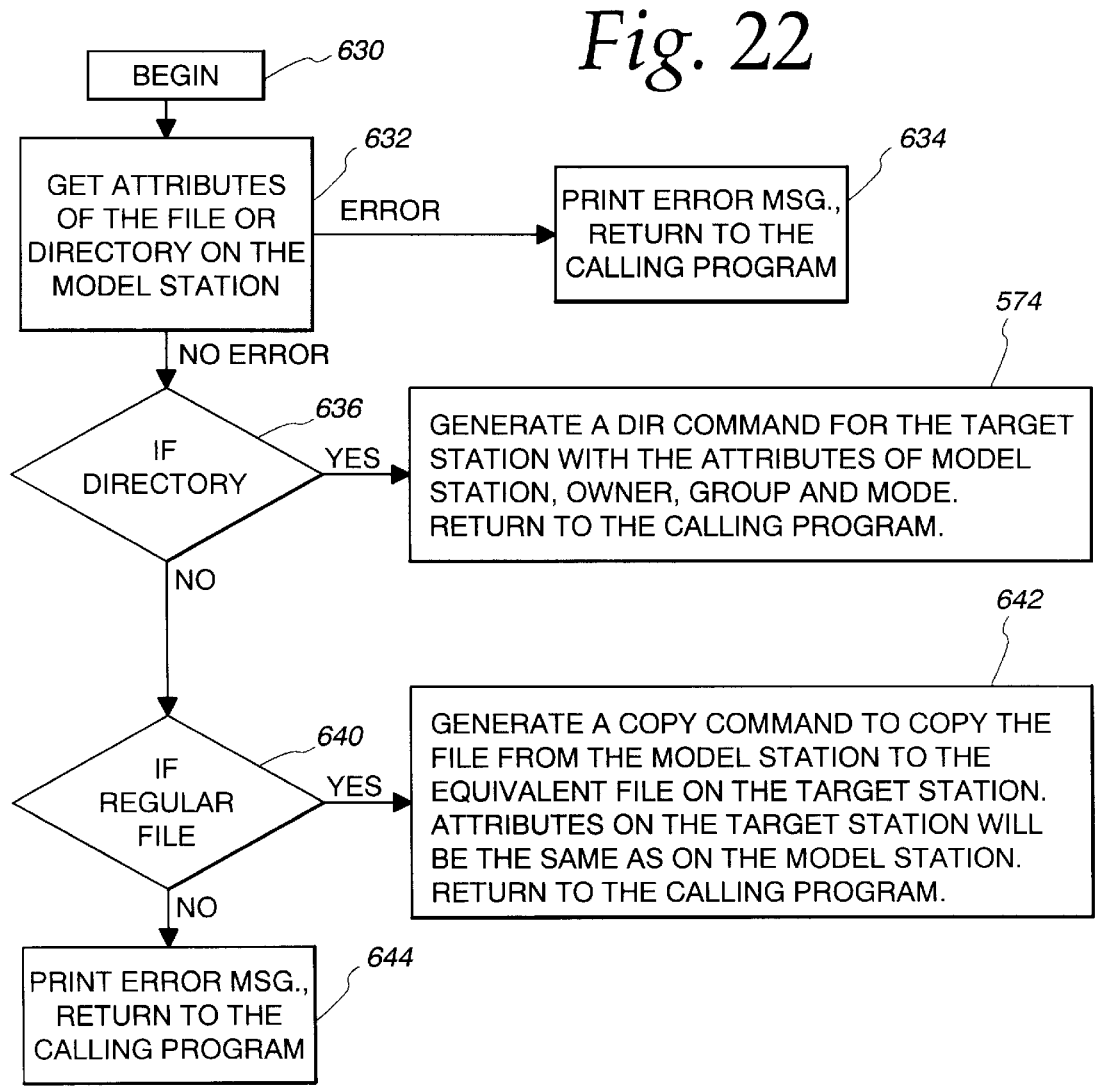

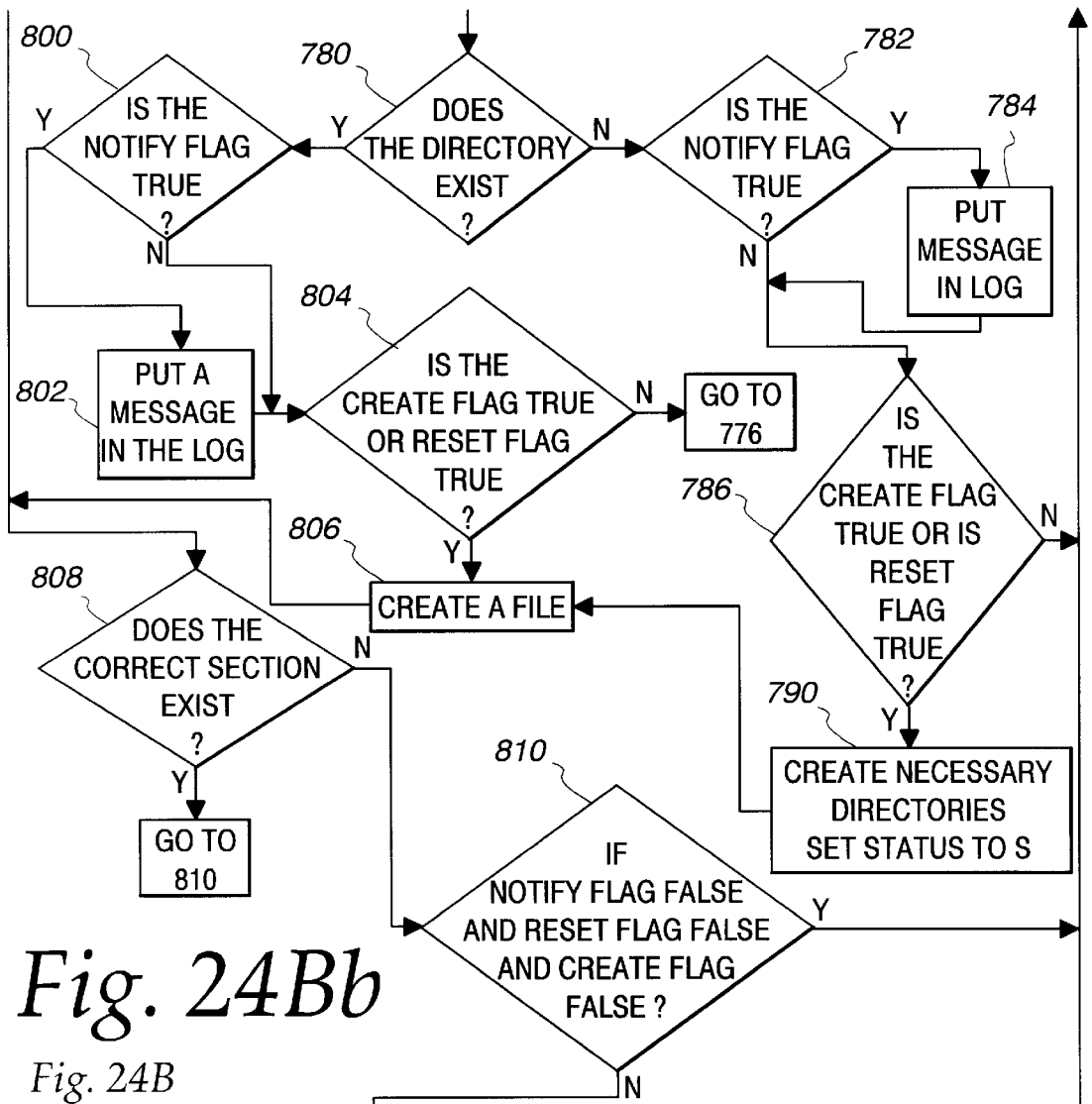
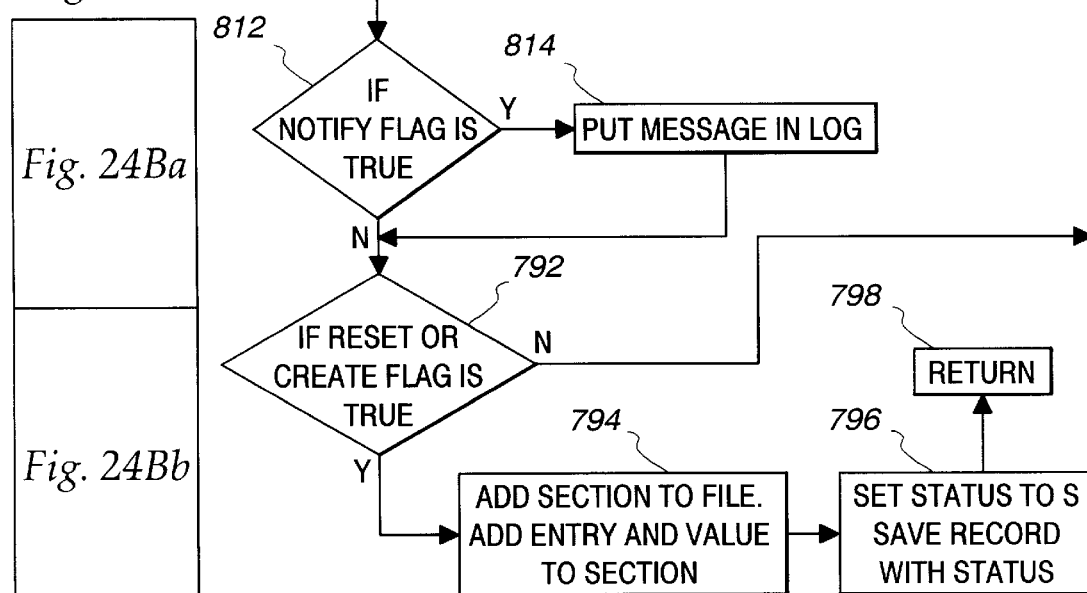
Fig. 24Bb
Fig. 24B
Fig. 24Ba
Fig. 24Bb

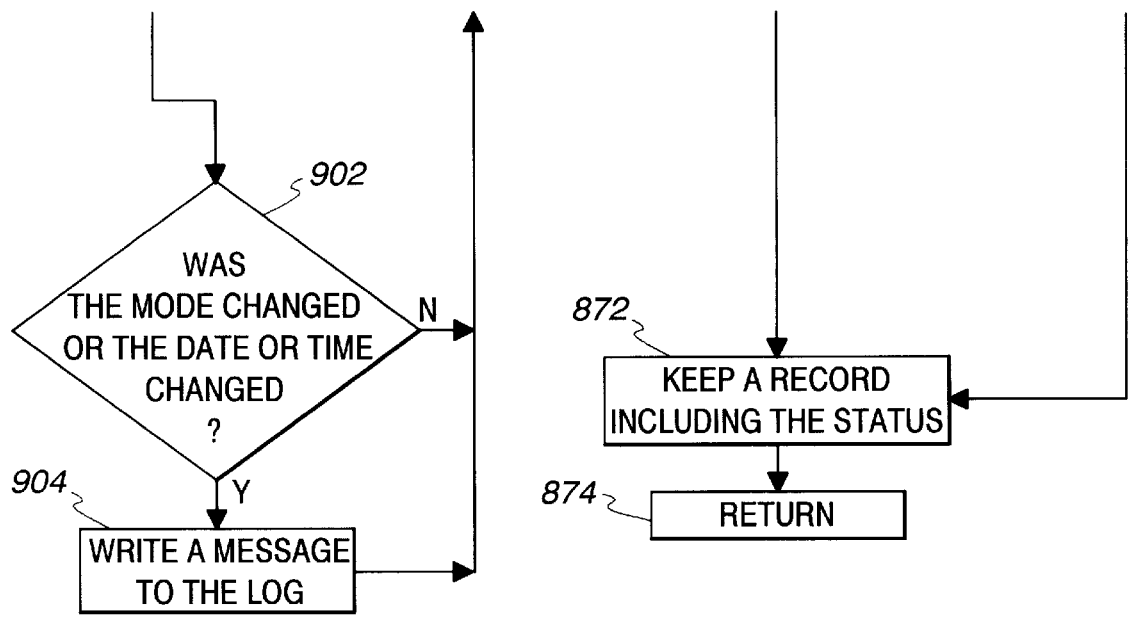
*Fig. 25Ab*
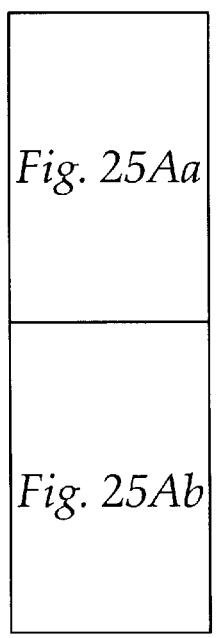

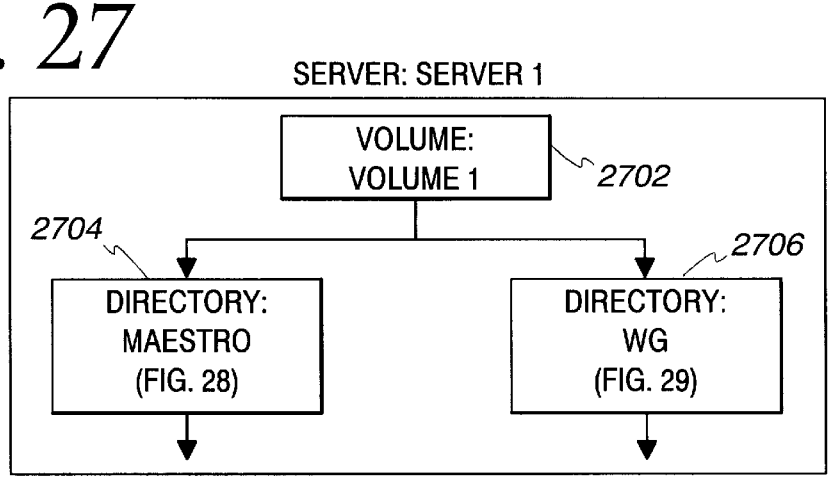
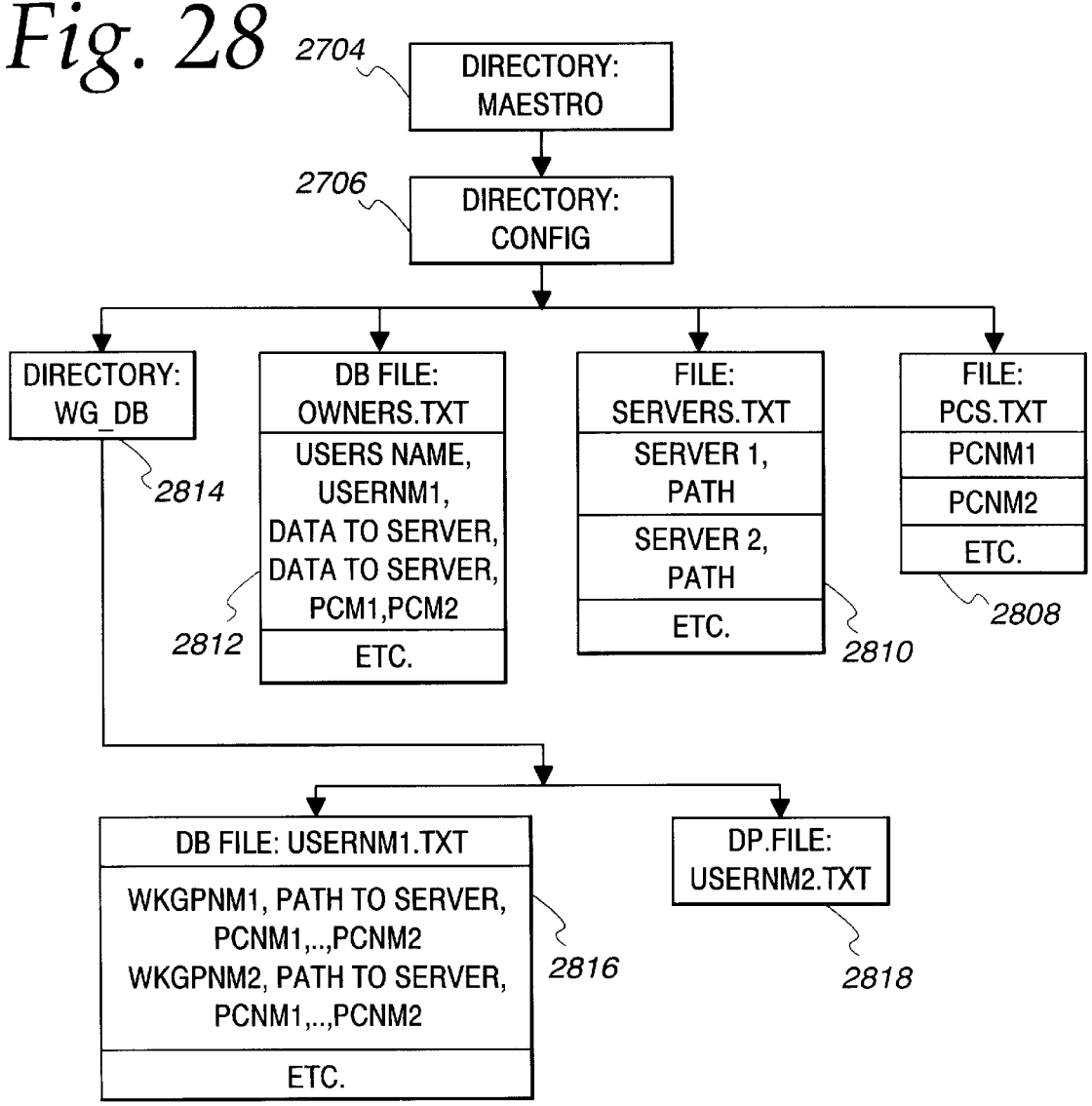

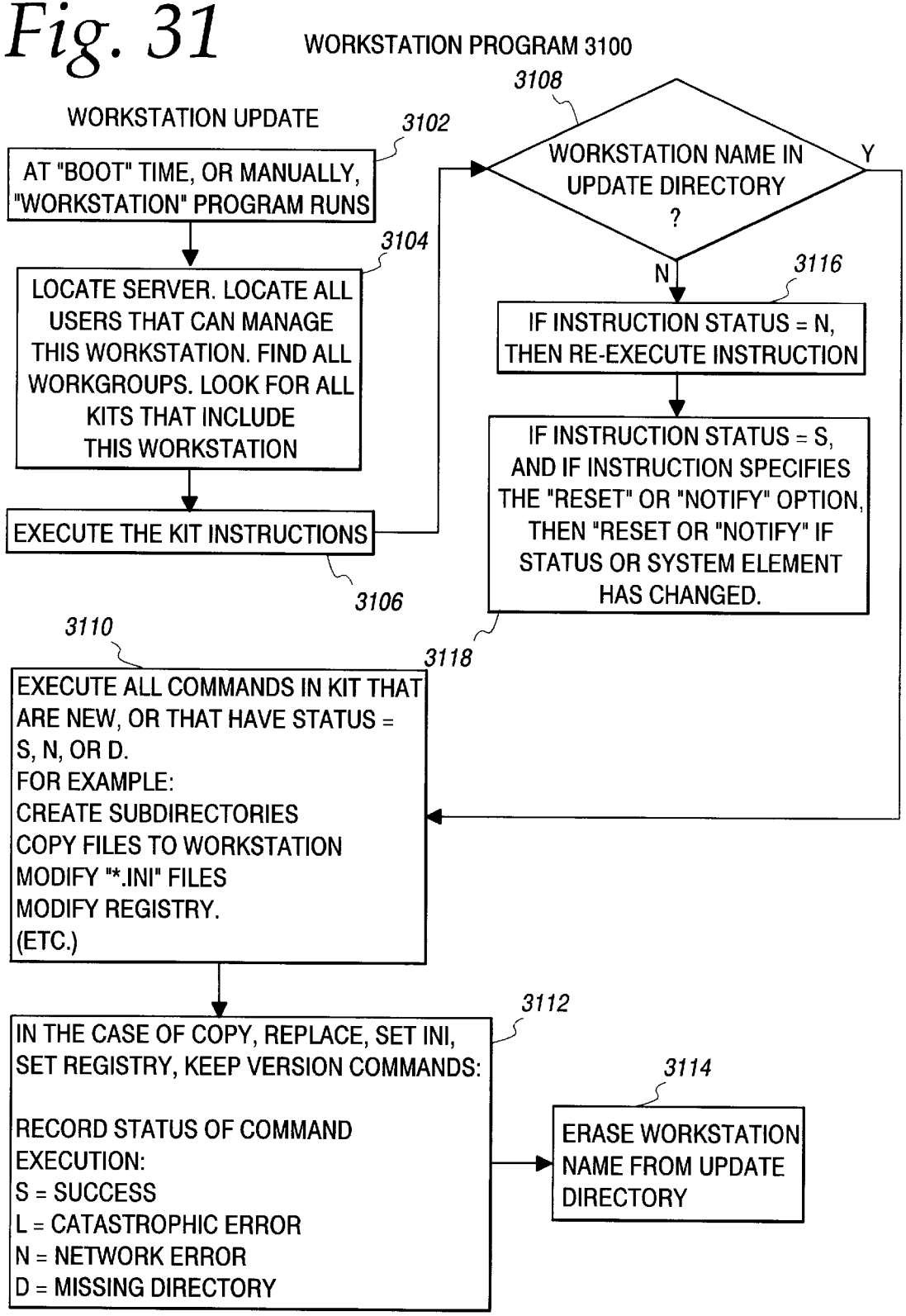

WORKGROUP NETWORK MANAGER FOR CONTROLLING THE OPERATION OF WORKSTATIONS WITHIN THE COMPUTER NETWORK

CROSS-REFERENCE TO RELATED APPLICATIONS

This application is a continuation-in-part of U.S. patent application Ser. No. 08/459,528, filed Jun. 2, 1995 now U.S. Pat. No. 5,586,322, which is a continuation-in-part of U.S. patent application Ser. No. 07/986,116, filed Dec. 4, 1992, abandoned, which is a continuation-in-part of U.S. patent application Ser. No. 07/898,191, filed on Jun. 11, 1992, now U.S. Pat. No. 5,440,739, issued Aug. 8, 1995, which applications are incorporated herein by reference.

FIELD OF THE INVENTION

The present invention relates to computer software for controlling the operation of individual workstations within a computer network. In particular, the invention relates to a workgroup organized network manager which organizes people into groups and computers into workgroups. As used within this invention, a workgroup represents an organization of people and a group of computers connected together by a network. The host computer controls the workgroup. A user at the host computer creates specifications for controlling the operation of the computers in the workgroup. The present invention acts as an agent for the user and implements the specifications on the clients. The invention implements the specifications either periodically or on command. The workgroup organization limits how individuals may use the invention to manipulate the computers in the workgroup. The invention also limits which computers are controlled.

BACKGROUND OF THE INVENTION

Networks consist of a number of interconnected computers which can include a centralized computers connected to remote terminals, a number of individual mini-computers or microcomputers linked to each other, or a combination thereof. In each instance, however, the function of the network is to provide a means for communicating information throughout the network. The minicomputer or microcomputer based centralized file server or a centralized computer typically includes a large central database of information which is accessed by the users at either remote terminals or computer stations. Economies of scale are achieved in these types of systems by storing the massive amounts of information contained in the central database in one central location.

Computer networks consisting of linked mini-computers or personal computers are not necessarily dedicated to accessing information from a large central database of information. These networks, called distributed systems, instead can be directed to the sharing of information created and maintained at each of the mini-computers or workstations within the network. While the distributed system type of network does not lend itself to the control of large amounts of information, as does the central database type of network, it is usually more flexible in the type and variety of tasks that it can perform. Each individual workstation can communicate with other workstations on the network and files can be shared therebetween. This flexibility, however, also means it is more difficult to control the computers so that they will operate in a similar fashion and produce similar results.

A communication software package or a device driver controls transmission of data or information from one workstation to another over communication lines. In addition to the communication software package, other software packages are available which operate to provide additional features not present in the standard communication software packages.

For instance, a time and schedule management software package allows users to view, track, and schedule time-related activities. Users can manage a personal schedule and other users' schedules as well. Permissions can be granted to allow a user to view or modify the scheduler of another user. In addition, permissions can be tailored to suit each user on a network. Users can be defined as parts of a group, with group-wide clearances assigned to all members of a particular group. In addition, defaults can be set for each group or new user, and when a user is added, the setup for that user will not require modifications. While this type of software package can organize workstations into groups having group wide clearances assigned to all members of a group, the tasks performed by the workstation is limited to the performance of calendar or scheduling type tasks and cannot be used for any other purpose.

Another type of software package for use on a network maintains identical copies of files on multiple computers. The files to be copied, the destination of those files, and the operations performed for updating files are all specified at a source workstation. Whenever files are updated, the file is updated at the source workstation and then sent from the source workstation to the various destination workstations. While this type of software makes updating files a simpler task than previously available, this type of software package cannot control the distribution of information to predefined workgroups nor is there any organizational structure to limit access to particular users. In addition, the destination workstation cannot trigger the source computer to update destination workstation files and therefore cannot be guaranteed the latest versions of the files when they are needed. These packages also do not allow the execution of nonfile related commands over the network and do not provide for delayed execution of processes if stations are not available at the time of an update. The stations in the workgroups cannot, therefore, be controlled as a group.

SUMMARY OF THE INVENTION

The present invention is a system of computer programs to organize networked computer workstations into workgroups that are controlled by specifications. The workgroups consist of groups of computers on the network and the people who use the invention to manage them. The computers on the network can include but are not limited to mainframes, minicomputers, servers, and personal computers. For ease of discussion, these machines are referred to as workstations hereinafter. The specifications are the commands that are executed to accomplish the desired results.

Typically, workgroups consist of two or more workstations, in which one workstation is designated to be a host workstation and the remaining workstations are designated to be client workstations. A workgroup is not limited to any maximum number of workstations and a workstation may be part of many workgroups. Workgroups also consist of groups of people, with varying responsibilities, that operate the workgroup. The responsibilities may be distributed between several different people or may be allocated to one person.

The host workstation provides the means for setting up the workgroup and for defining the responsibilities of the people who operate the workgroup. The specifications are also developed on the host and are implemented by installing them in the host workgroup library. As part of the workgroup setup, the workstations which may become clients are defined and then may be addressed by the specifications. A client station administrator defines workstations to be a client by entering the host station name into a client copy of the invention which resides in the client workstation. The client station administrator thus prevents the invention from making changes on the client, if specified. Either a host station or a client station can initiate the execution of the specification on a client since the client and host station are linked together through the software.

The people who operate the invention are designated as station administrators (both host and client), workgroup leaders, workgroup programmers and client users. The administrators install and maintain the invention, define rules of operation and set up the workgroups. The workgroup leaders designate the workgroup programmers and define the limits they operate under. The workgroup programmers write the specifications which actually control the workstations. The client users (engineers, accountants, draftspersons, etc. who actually use the stations) use the files and environment provided through the invention.

Specifications define how a programmer manages client workstations. The invention implements the specifications automatically on all of the client workstations having defined specifications. The effort required to manage a workgroup is reduced to planning and writing specifications instead of repeating similar tedious defining actions on each client workstation. In addition, the invention provides log files showing the history of each workgroup and audit trails showing all implemented specification statements.

Each individual client workstation within a workgroup operates according to a specification defined by a program or programs on the host workstation. The specification defines the parameters within which the workstations and workgroups operate. Because workstations are controlled by the specification, individual workstations can be automatically configured for individual tasks.

Specifications are programs containing specification statements that have been entered into a workgroup library. Programs may be written separately or may be modified at a later time. The client only executes specification statements it has not executed before. The statements are active as long as they remain in the library.

Specification statements typically are equivalent to several commands in the native operating system. The invention checks to see that all of the native commands can be completed successfully before executing the specification statement This prevents the clients from being left in an intermediate state because some of the native commands did not succeed.

Some specifications may pend. Pending specifications are specifications that will not execute until some condition or conditions are satisfied on the client. When the conditions are satisfied, then the specification statements are executed.

Active specifications (those entered into the workgroup library) may be referenced at any time. If a new workstation is added to the workgroup, the specification can be referenced immediately and the workstation set to the same configuration as the other stations in the workgroup. If a client station is disconnected when the host requests that the clients implement the specification, then the station will not be in the correct configuration. Since the invention on the client station recognizes which computer is the host within its workgroup (and thus the location of the workgroup library), the invention on the client can implement the specification when the client rejoins the network.

Before a client station implements the workgroup's specification contained in the library, the invention on the client must retrieve a copy of the workgroup library. The invention uses a single computer account, that exists on all stations, for sending files and other computer network communication. A workgroup's specification can have several programmers. When the invention executes each specification command on a client, the command is executed as if by the command's programmer. It is similar to the programmer logging on to the client and then executing the command. The invention does not use the programmer's computer account or password, thereby enabling the programmer, on the host computer, to control and modify the clients in his workgroup simply by placing specification commands in the workgroup library. The invention tightly controls access to workgroup libraries. Only clients who are members of the workgroup can access the workgroup's library and only clients can access it through the invention.

In addition, the present invention includes a workstation comparison system for comparing the files and directories that are located on the individual workstations to determine whether any discrepancies exist between files or directories that are intended to be the same, to determine if extra files exist or if files are missing from a workstation. For instance, if all workstations within a workgroup are loaded with an identical file or directory, the present invention can determine if the file or directory has been properly loaded on each workstation. In this way, errors are located by comparing the files or directories which are common on some or all of the workstations.

The present invention collects the attributes of the files or directories from workstations of interest at the host workstation. The attributes of a file include the type of file, mode or protection of the file, number of links, owner and group that the file belongs to, the date, the size, and checksum. Once these attributes are collected by host workstation, the attributes associated with the workstations of interest are compared. Any difference is noted and flagged as a potential source of a problem. While the workstation comparison system is currently written for a UNIX system for use with the Workgroup Organized Network Manager, the workstation comparison system can exist by itself and can be written for other computer systems and in other languages for analyzing the files or directories on other computer workstations. Once differences between files or directories are located, extra files are located, or files are found to be missing, the present invention includes the means to change the incorrectly programmed workstation to one which is programmed correctly.

BRIEF DESCRIPTION OF THE DRAWINGS

FIGS. 7A–7C, 7 is a flow diagram of a copy_ref function module;

FIGS. 8A–8C, 8 is a flow diagram of a directory function module;

FIGS. 9A–9B, 9 is a flow diagram of a remove function module;

FIGS. 15A and 15B, 15 are a flow diagram of subroutine of the compare model program of FIG. 14 for determining similarities and differences between files located on a model workstation and a target workstation;

FIG. 21 is a flow diagram of a change mode subroutine;

FIG. 22 is a flow diagram of a copy function subroutine;

FIGS. 24A, 24B and 24C, 24 show a program flow diagram for the set_ini instruction for use in the specification of a workstation program;

FIGS. 27, 28 and 29 together form a block diagram of a typical data structure on a server;

FIG. 31 is an overview block diagram of the steps carried out by the workstation program when the workstation is booted, or when the program is ran manually.

DETAILED DESCRIPTION OF THE PREFERRED EMBODIMENTS

Figure 1:
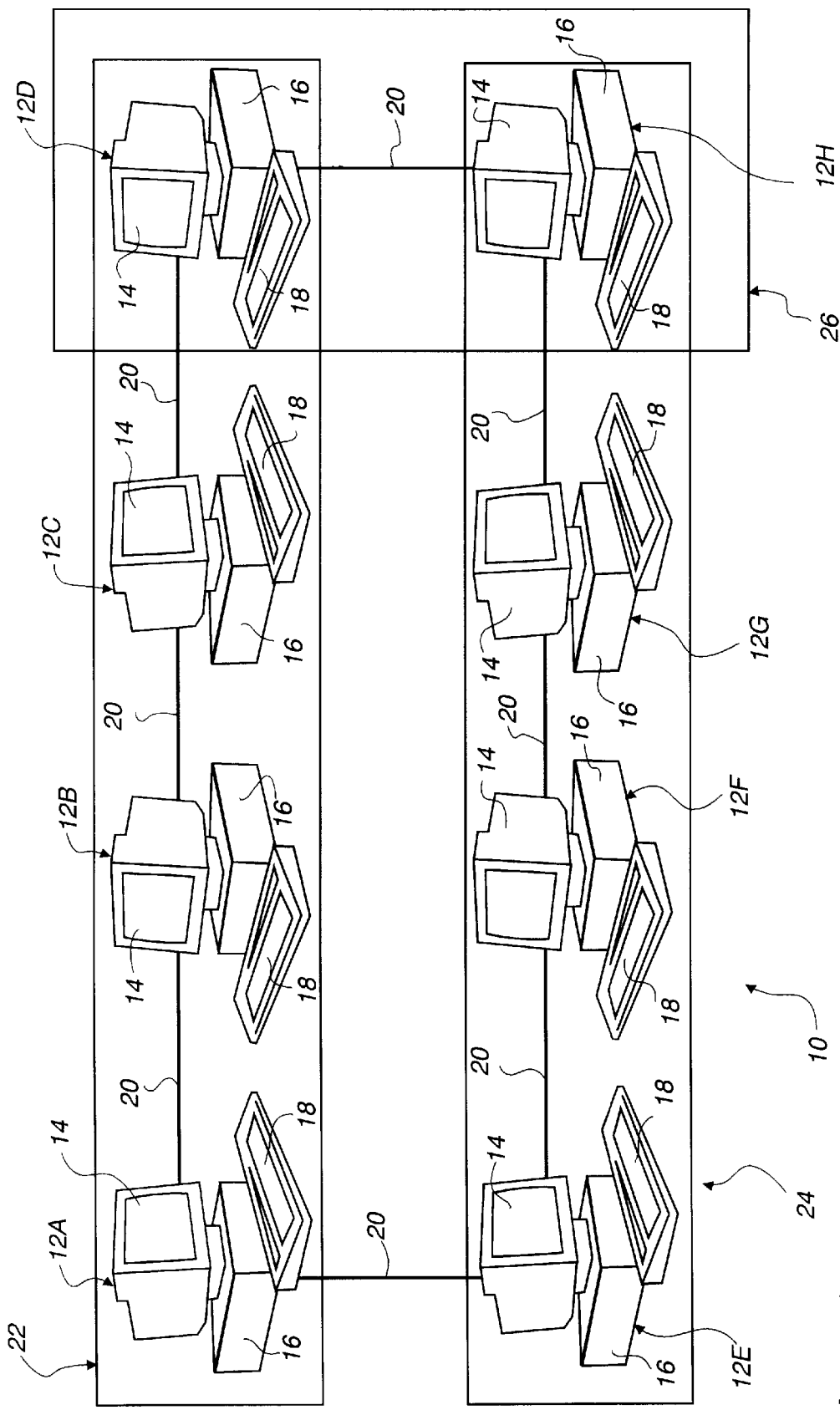
FIG. 1 is a schematic diagram of a networked computer system organized into workgroups.

FIG. 1 illustrates a networked computer system 10 containing a plurality of workstations 12. Each workstation 12 is further identified by a letter, A through H, to aid in the later discussion. Each workstation comprises a video display terminal 14, a computer 16 and a keyboard 18. Each workstation 12 communicates to other workstations 12 via the network as is understood by those skilled in the art.

The present invention is a system of computer programs that organizes and manages workstations 12 within the network 10. While the present invention is written in the C language and UNIX scripting languages and is directed to be used on a UNIX operating system, the present invention is not limited to UNIX and other embodiments will become apparent to those skilled in the art. The present invention controls as many workstations as are contained within the network and is not limited to the number illustrated here.

The workstations 12 of the network 10 are organized into workgroups consisting of workstations selected to be within the organized workgroup by an administrator. For instance, as illustrated in FIG. 1, the network 10 is divided into a first workgroup 22 consisting of workstations 12A through 12D, a second workgroup 24 consisting of workstations 12E through 12H, and a third workgroup 26 consisting of workstations 12D and 12H.

Workgroups correspond most directly to the organization of workgroups in a business, manufacturing, or design environment or other organization such as sections, departments, and projects. For instance, in a manufacturing facility, the workgroup 22 might consist of the electrical engineering department, the workgroup 24 might consist of the mechanical engineering department, and the workgroup 26 might consist of one electrical engineer and one mechanical engineer chosen to work on a specific project.

The workgroups and the individual workstations comprising the workgroups are selected by the administrator according to the individual requirements of each workgroup. As each workgroup is dedicated to the production of a certain type of work product in the case of an engineering design firm, the invention manages each workstation within the workgroup according to specifications that can be defined within the invention. Of course, the present invention has many other applications, for instance, delivering software to various departments within a business organization, analyzing computers in a network, and determining disk space on the workstations.

Before the present invention is operational, the system of programs comprising the invention must be installed on every workstation in the network 10 and certain variables must be defined to give structure to the network according to the individual requirements of the workgroups and workstations.

Once the invention is installed, workgroups can be defined. The definition of a workgroup includes designating one of the workstations 12 to be a workgroup host, designating a number of individual workstations to be workgroup clients, and designating a group of people having defined responsibilities that use the invention to manage the workstations. This and other information is put into a number of files on the workgroup host.

Figure 2:
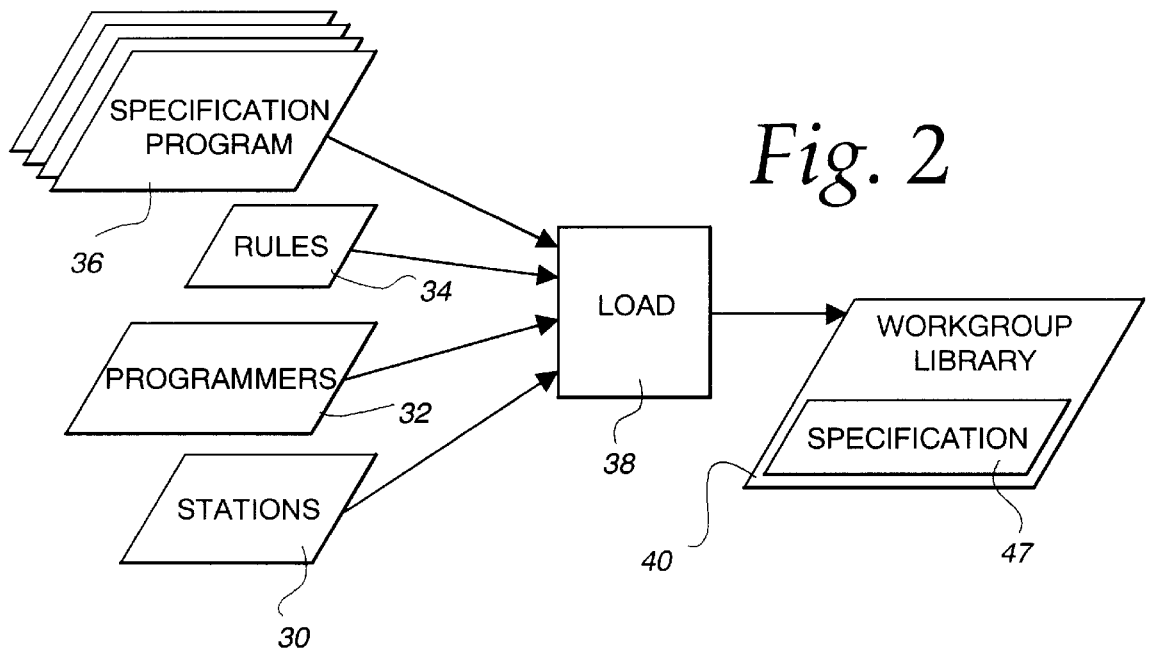
FIG. 2 is a block diagram illustrating the creation of a library file by a load program with a plurality of files as input.

FIG. 2 illustrates a block diagram of certain files on the workgroup host which are created to run the present invention. The files which are created are the stations file 30, the programmers file 32, the rules file 34 and the specification program file 36. These files are input to a load program 38, which checks and adds the specification program file to the workgroup library file 40. Each workgroup has one each of the stations file 30, the programmers file 32, and the rules file 34, but can have many specification program files 36. The stations file 30 contains a list of labels that specify combinations of workstations used by the workgroup. For instance, each label for workgroup 22 as shown in FIG. 1, would be limited to stations 12A, 12B, 12C, and 12D. Each label is saved in the stations file 30. Once the stations have been defined and stored in the stations file 30, the programmers given authority to create the specification programs are defined.

Programmers are individuals who are given the authority to act as a programmer within a defined workgroup. Once each of the programmers has been chosen, each programmer is defined to have the capability of performing certain specification commands on assigned workstations. This information is saved in programmers file 32. The specification commands the programmer may be allowed to use include a copy command, a directory command, a remove file command, a remove all command, a refresh command, an execute command and a remove directory command. Each of these commands typically is equivalent to several commands in the UNIX operating system. The details of these commands will be described later. In addition to the station file and the programmer file, the rules file needs to be defined.

The rules file 34 is established by the workgroup leader and the system administrator. The rules file 34 contains rules used by the load program 38 to check specification programs written by the programmer before adding the specification programs to the workgroup library 40. The rules provided with the invention maintain various levels of security in addition to that provided by UNIX. A mechanism is also provided to allow the host administrator to add to or modify the rules to meet security or other requirements.

A specification program file 36 is a file which is created by a programmer previously defined in the programmers file 32. The workgroup programmers develop specification programs using the specification programming language provided by the present invention. In addition, the invention contains a create_prgm 46, shown in FIG. 3, that can automatically generate specification commands for files in a list, thereby relieving the programmer of much effort when creating new programs. The create_prgm 46 provides a choice of refresh or copy instructions to move files. The generate program will be discussed later.

The specification program file 36 contains individual specification commands written by the programmer to manage the client computers in a workgroup. The load program 38 checks these commands according to the rules file 34. When the programmer loads a specification program, the program is written into the workgroup library 40. Loading the specification program makes the commands within the program active. The present invention implements the specifications 47 contained in the workgroup library 40 on the client computers or stations. Once loaded, the specification program is active and may be referenced by the invention on any workgroup client as long as it remains in the workgroup library 40. How clients implement the specification in the workgroup library 40, will be discussed later The present invention includes eight specification commands with various options. These instructions are shown in the following Table 1. The instructions are copy, refresh, direct, rm_file, rm_dir, rm_dir, rm_all, execute and #.

TABLE 1

```
copy [-m] -h host_file -c client_file -o owner -g group
  -p protection -s Labels -d date
refresh [-m] -h host_file -c client_file -o owner -g group
  -p protection -s labels -d date
dir -c client_directory -o owner -g group -p protection
  -s labels -d date
execute -h host_file -1 shell -s labels -d date
rm_file -c client_file -s labels -d date
rm_dir -c client_directory -s labels -d date
rm_all -c client_directory -s labels -d date
# comment
```

As seen in Table 1, each of the commands begins with the name of the command and is followed by a list of parameters assigned by a workgroup programmer. The copy command starts with the word "copy" and is followed by -h host_file, which specifies a certain file contained on the host, -c client_file, specifying the name given to the file on the client, -o, the owner of the file, -g, the group in which the file will be contained, -p, the protection of the file, -s, the labels, and -d, the date that the command was created. The copy command copies a file from the host to the clients. In addition, the copy command can also change the mode, the owner, and the group of the file, if the programmer has the privileges required by the client computer. Copy also has a maintain option -m, which means that if the file changes on the host, the new file will be transmitted to the clients. This feature will be described in more detail later. The copy command is similar to the sequence of UNIX instructions cp, chmod, chown, and chgrp. The copy command is not executed until all UNIX instructions necessary to implement the copy command can all be performed. This prevents the copy command from being partially executed on a client. This is a trait of all specification commands.

As seen in Table 1, the refresh command has the parameters previously cited for the copy command. The refresh command copies a file from the host to the clients. The refresh command is different from the copy command in that the present invention will not execute the refresh command unless a copy of the file already exists on the client. Such a feature is useful when the programmer does not know which computers or stations have a copy of the file. For instance, the programmer can create a refresh command that updates shell scripts or design references files on all computers in a workgroup. Only those computers with the file will be updated. This is different than the copy command, which will only execute if the file's parent directory exists on the client.

The directory command creates directories on the client. The mode, owner and group are specified. The directory command is not executed unless the directory's parent exists on the client. If the parent directory doesn't exist, the present invention waits for it to appear and then executes the directory command.

The execute command runs UNIX programs on the clients. The execute command has several features that simplify running UNIX programs on many stations on the network. Output from the executed UNIX program can be put into a host log of the present invention. Messages can be mailed to the owner of the individual programs. The present invention places the standard output and standard error in a temporary file on the client.

The rm_file command removes a file from the individual client and it is quite similar to the rm command in UNIX. If the file is not present on the client or if the command would fail, the present invention ignores the command and does not attempt to execute it later.

The rm_dir command removes the directory from the client and is similar to the rm_dir command in UNIX. Like UNIX, the directory must be empty for the command to succeed. If the directory is not present on the client or if the command would fail, the present invention ignores the command and does not attempt to execute it later.

The rm_all command removes a directory and its files and subdirectories from the clients. The rm_all command is different from the UNIX "rm_r" command in that it first checks to see if all files and directories can be removed before beginning. The rm_all command works only if it can successfully remove all the directories and files as instructed. If the command cannot succeed on the client, the present invention ignores the command and does not attempt to execute it later.

Finally, the last command is the # command which allows one line of comment to be inserted into the program.

The meanings of the available options for each of the prior instructions is listed in the following Table 2 and is shown as previously discussed.

TABLE 2

-m This maintain option means that if host_file changes on the host, the command will re-execute on the client.
-h host_file
    Use host_file as the source host file for the command.
-c client_directory or client_file
    Use client_file (client_directory) as the target client file (directory) for the command.
-o owner
    Make owner the owner of the target directory or file (client_directory or client_file) on the client.
-g group
    Make the target directory or file (client_directory or client_file) belong to the UNIX group on the client.
-p protection
    Set the protection of the target directory or file (client_directory or client_file) to protection where protection is of the form "rwxrwxrwx". These three sets of letters represent read, write, and execute permissions for the UNIX owner, UNIX group, and others.
-s labels
    Labels specify combinations of stations used by the workgroup. The present invention executes the command on the stations represented by labels. Labels can be several labels separated by commas.
-d date
    The date and time the command line was written or last modified. Date uses the following format: mm/dd/yy-hh:mm:ss
-l shell
    Use shell when executing host_file on the client. Shell can be any common UNIX shell - sh, ksh, csh.

Once the stations file 30, the programmers file 32, the rules file 34 and the program file 36 have been completed, the programmer uses the load program 38 to place the specification program and the stations file 30 into the workgroup library 40. The workgroup library 40 contains individual instructions defined by the programs, which include not only those instructions which have been defined by the programmers, but also include additional information generated by the load program 38.

To illustrate the operation of the load program 38, an example using the copy instruction will be discussed. The copy instruction used as an example is shown in Table 3.

TABLE 3 copy -m -h /usr/ron/build -c /usr2/ron/build2 -o ron -g proj_100 -s elect -d 05/28/92-17:10:09

As seen there, -m is included, which means that if the host file changes, the changed file will be automatically copied to the client station. The host file -h, which is identified here as /usr/ron/build, is the source host file for the command. The client file -c, which is identified here as -c /usr2/ron/build2, is the target of the copy command. The owner -o is identified here as ran. The group -g is identified as proj_100, which makes the target file belong to the proj_100 UNIX group on the client. The label -s, which is identified here as elect, represents stations in the electrical group previously shown as workgroup 22 in FIG. 1. Finally, -d indicate s the ate and time that the command was written or last modified. The load program 38 first checks the syntax of the copy command and then identifies the protection, owner, and group for the file /usr/ron/build and the directory /usr/ron. It also gets the date when the build file was last modified. This information comes from the operating system and is used to perform certain checks. The present invention will not load the command into the library file 40 if any of the checks fail.

The load program 38 uses the rules file 34 to check the specification program. It uses the stations file 30 to make certain that elect is a valid label. The load program 38 uses the programmers file 32 to see whether or not ron can use the copy command and whether or not ron can use the elect label. In addition, the load program checks to see whether or not ron can access the file build and, in addition, the file build is checked to make certain that it is an ordinary file and can be read by others. Of course, other checks can also be implemented into the load program at the option of the individual person using the present invention. The present embodiment determines whether a condition is satisfied by using standard conditional test statements known to those skilled in the art. After passing these tests, the present invention calculates the check sum for the build file and assigns values to the following copy parameters shown in Table 4:

TABLE 4

-U ron -G proj_100 -K check_sum -P /usr/ron/prg.mp
-M modify_date

The load program assigns these values to the copy parameters if all the tests have been passed. As seen in Table 4, -U ron indicates that ron is the UNIX user who loaded the program into the workgroup library. -G proj_100 indicates the UNIX group that the programmer belonged to when the program was loaded into the library. -K check_sum indicates the value of the check sum for the particular file indicated. -P /usr/ron/prg.mp indicates the name of the program file and its directory. -M modify_date indicates the date that the file was last modified. In addition, certain other optional checks can be performed by the present invention. These checks establish additional levels of security. For instance, one check that could be performed is to determine whether or not the file build is owned by ron. Also, does the file build belong to the proj_100 UNIX group, and is the directory /usr/ron owned by the programmer ron. If these checks are implemented, then these additional checks limit access. Of course, these are not the only optional checks that can be included and additional checks can be made as is understood by those skilled in the art according to the teachings presented herein.

Once the load program 38 has determined that the copy command passes each of these checks, then the present invention creates a new copy instruction which the load program 38 writes to the PROJ workgroup library. The copy command is contained in the library 40 as shown in Table 5:

TABLE 5 copy −P /usr/ron/prg −m −h /usr/ron/build
−c /usr/ron/build2.mp −o ron −g proj__100 −s elect −d
05/28/92-17:10:09 −U ron −G proj__100 −K
check__sum −M modify__date This copy command includes the particular parameters which have been generated by the load program based on the rules and based on the information previously programmed into each of the files.

Table 6 illustrates a basic configuration of the library 40:

TABLE 6

!<LIBRARY>
!STATION HEADER −d last__modify__date
    STATION DATA
!STATION FOOTER
!PROGRAM HEADER −P program −d date__loaded −U USER −G GRP
    PROGRAM COMMANDS
!PROGRAM FOOTER −P program
.
.
.
!PROGRAM HEADER −P program −d date__loaded −U USER −G GRP
    PROGRAM COMMANDS
!PROGRAM FOOTER −P program As shown, the library is labeled in the beginning as a library. Following that, there is an indication of a station header and a station footer, which contains the definition of labels that can be used by the -s option of program commands. Following that is a program header including certain parameters which are defined in Table 7:

TABLE 7

−d last__modify__date
    The date when the STATION DATA was last
    modified by the workgroup leader.
−d date__loaded
    The date when program was loaded into the
    library.
−P program
    The name of the program file and its directory.
−U USER
    The name of the programmer that loaded the
    program into the library.
−G GRP
    The UNIX group that the programmer belonged to
    when the program was loaded into the library.

Following the program header are individual program commands. It is here that the individual program commands are listed as generated by the load program 38. For instance, the program command copy, shown in Table 5, would be contained within this section of the program commands. PROGRAM COMMANDS contains any number of specification commands previously written by the programmer which have passed all the tests which the load program 38 performed.

Following the program commands is a program footer delineating the end of the program. The library may contain additional specification programs each consisting of program headers, followed by specification commands and program footers.

Eight types of commands used in the present invention are contained within the program sections of the library. These commands are the same as those previously used by the programmer to generate the individual programs for each of the files. Table 8 lists these commands, which have been modified by the load program 38 to include additional information not previously shown when the programmer programmed the individual commands in the first place.

TABLE 8 copy −P program [−m] −h host__file −c client__file −o owner
    −g group −p protection −s labels −d date −M modify__date
    −K check__sum −U USER −G GROUP
refresh −P program [−m] −h host__file −c client__file −o
owner  −g group −p protection −s labels −d date −M modify__
date
    −K check__sum −U USER −G GROUP
    dir −p program −c client__directory −o owner −g group
    −p protection −s labels −d date −U USER −G GROUP
    execute −P program −h host__file −1 shell −s labels −d date
−M modify__date −K check__sum −U USER −G GROUP
rm__file −P program −c client__file −s labels −d date
    −U USER −G GROUP
rm__dir −P program −c client__directory −s labels −d date
    −U USER −G GROUP
rm__all −P program −c client__directory −s labels −d date
    −U USER −G GROUP
comment Table 2 lists the meanings of the arguments for most of the above commands, while Table 9 lists the same information for the -P program, -U user, and -G group arguments:

TABLE 9

−P program
    The name of the program file and its directory.
−U USER
    The name of the programmer that loaded the program
    into the library.
−G GROUP
    The UNIX group that the programmer belong to when
    the program was loaded into the library.

Figure 3:
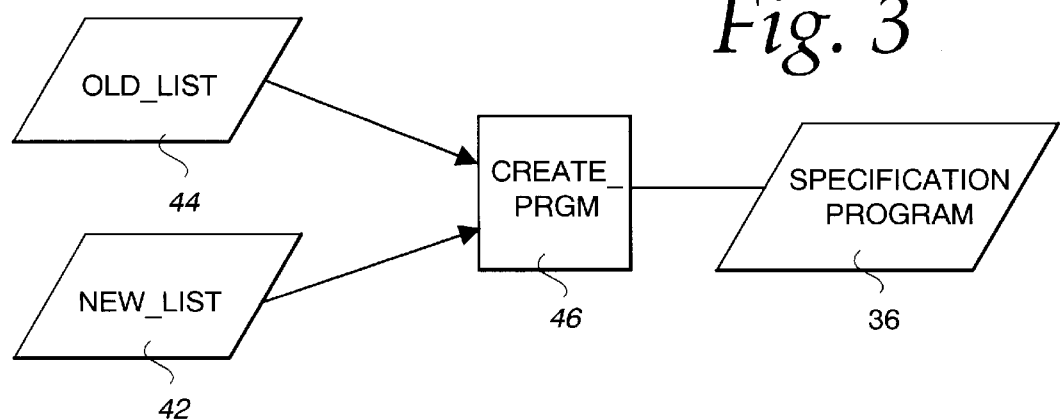
FIG. 3 is a block diagram illustrating the creation of a program file by a program called create_prgm.

FIG. 3 illustrates an additional feature of the present invention in which the program file 36 is automatically created by create__prgm program 46. The create__prgm 46 creates a specification program based on the data in new__list 42 and old__list 44.

Table 10 shows the create program instruction which is generated by the programmer. The programmer inserts the information necessary into the appropriate locations shown in the create program instruction of Table 10.

TABLE 10 create__prgm −c {copy | refresh}  [−m] −s labels
[−o old__list] −d source__dir −t target__dir
−i new__list The create__prgm 46 will create a copy or refresh command for the files in the new__list, depending on whether the copy or refresh command has been selected. The create__prgm 46 will also create dir commands for the files' parent directories if the copy command is used. If the -o option is used, in which the old__list is shown, then the program will also contain remove commands. It will have a rm__file command for each file listed in the old__list that is not also listed in the new__list. Similarly, it will have a rm__dir command for each directory in the old__list that is not also in the new__list. The various options are defined and shown in Table 11 for the create__prgm 46.

TABLE 11

-i new_list
    File new_list contains a list of directories and files used to create the program. Each record in new_list can only have one directory or file.
-c {copy | refresh}
    Use the copy or refresh command.
-m Use the maintain option in the copy or refresh commands.
-s labels
    Use labels in each command to specify which computers should execute the commands on. Labels can be several labels separated by commas.
-d source_dir
-t target_dir
    If the source directory (source_dir) and target directory (target_dir) differ, the copy and refresh commands will send the files and create directories from the source directory on the host to the target directory on the clients.
-o old_list
    File old_list contains a list of directories and files. The present invention will generate rm_dir and rm_file commands for all directories and files listed in old_list but are not in new_list. Each record in old_list can only have one directory or file.

First, the create_prgm checks for mandatory options which are the -c, -d, -t, -s and -i options. If the -o is used, the create_prgm finds the directory and file entries in the old_list that are not in the new list. The selected entries are sorted in reverse order to process file entries before directory entries. Then, for each entry, the create_prgm generates an rm_file command if it is a file, or an rm_dir command if it is a directory. The operating system is used to determine these definitions.

Next, the create_prgm 46 builds a command for each directory and file in the new list. Entries are sorted in the new_list to create dir commands before the copy commands. If the entry is a directory and the -c option is copy, then a dir command is created. The create_prgm 46 includes the directory's owner, UNIX group, and protection in the dir command. This data is obtained from the operating system. The dir command also requires a date, which create_prgm 46 obtains from the operating system.

If the entry is a file and the -c option is copy, then the create_prgm creates a copy command automatically for the new file. This command requires the file's owner, the UNIX group, and protection which is obtained from the operating system. This command also requires a date, which is also obtained from the operating system. If the entry is a file and the -c option is refresh, the create prgm 46 program creates a refresh command. This command requires the file's owner, UNIX group, and protection which create_prgm 46 obtains from the operating system. A date is also required, which is obtained from the operating system.

If source_dir and target_dir differ, then the -c option in each command will have target_dir in place of source_dir.

Each workgroup has its own library. The workgroup library contains a number of specification programs written by workgroup programmers. The programs combine to form a specification for the workstation. This specification defines and limits the operation of each individual workstation within the workgroup.

The present invention in no way limits access to files or information which are on the network and which do not fall within the previously defined parameters of the specification programs. In fact, the present invention is almost transparent to the user in that the user can create and maintain his own files without interference from the present invention.

Figure 4:
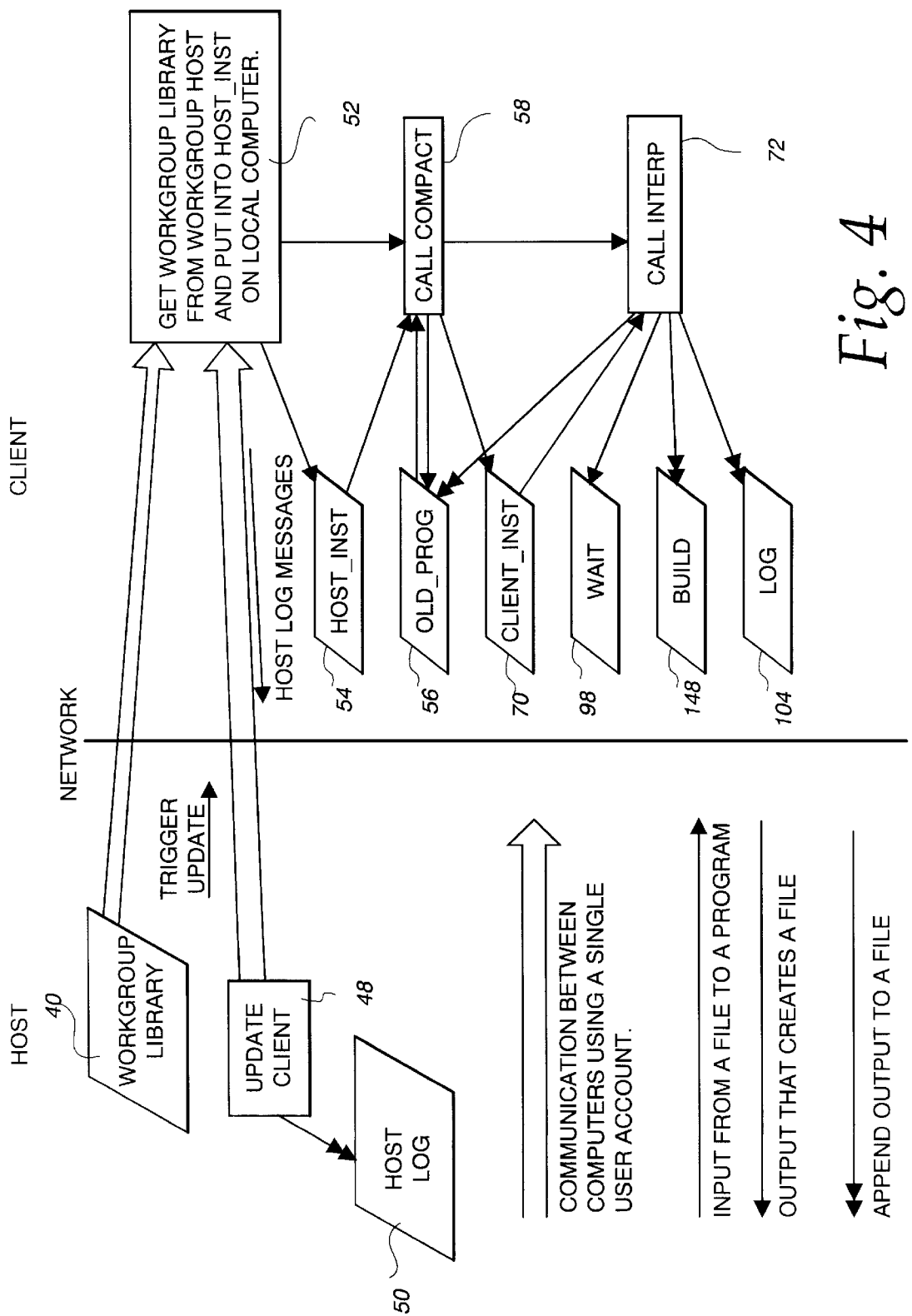
FIG. 4 is a block diagram illustrating a number of program modules and their interaction with and creation of a number of files.

FIG. 4 illustrates a plurality of files and program modules which are used once the workgroup library has been completed. After the load program 38 adds specification programs 36 to the workgroup library 40, the invention on the client can implement the specification programs.

The host update client program 48 establishes contact with a client workstation and executes a first program 52 on the client to implement the workgroup specification 47. Contact between the host and the client is maintained during execution of program 52 so that output from program 52 can be put into the host log 50. The invention uses a single computer account, that exists on all stations, for transferring files and other network communication. If, however, a client workstation initiates the implementation of workgroup specifications for itself, the invention on the client establishes contact with the workgroup host and executes the client update program 48 which, as described above, executes the client program 52 on the client. Client workstations initiate implementations of workgroup specifications through the update client program 48 to maintain the host log 50.

When the workgroup host initiates the implementation of workgroup specifications for client workstations, the invention executes the update utility that updates the workgroup library, described later, and then calls the update client program 48 for each client. The present invention does not call the next client until the current client completes implementation of the specification.

There are various instances when the workgroup client implements the specifications in the workgroup library. Implementation at a client can occur upon power-up of the individual client, at the user's request on the client workstation, at the programmer's request on the workgroup host or at times specified by the workgroup leader on the workgroup host.

Program module 52 gets the workgroup library 40 from the workgroup host and puts the workgroup library 40 into the host_inst file 54, which exists on the client. The host_inst file 54 reflects the current status of the library as contained in the workgroup host.

The client workstation keeps track of specification commands that have been previously implemented on this particular workstation in another file called the old_prog file 56. The old_prog file 56 is both input to and receives output from the compact program 58. Consequently it is convenient to talk of old_prog(1) as the input into compact 58 and old_prog(2) as the output from compact 58.

Figure 5:
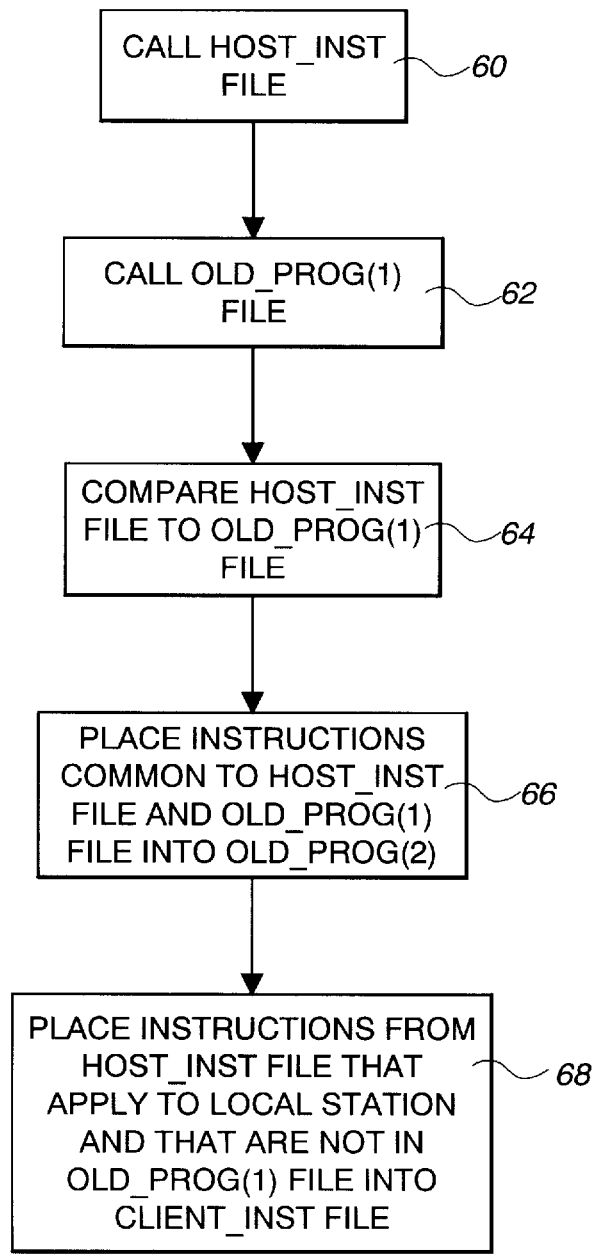
FIG. 5 is a flow diagram of the compact program module.

The updating of the old_prog 56 is performed by a program module called compact program module 58. FIG. 5 illustrates the operation of the compact program module 58. Initially, at step 60, the compact program module 58 calls the host_inst file 54. At step 62, the compact program module 58 calls the old_prog (1). At step 64, the compact program module 58 compares the host_inst file 54 to the old_prog (1) file. At step 66, specification commands which are common to the host_inst file 54 and to the old_prog (1) file, are put into the old_prog (2) file. The common commands are those commands in the workgroup library 40 which have been implemented on the present workstation.

Specification commands in the workgroup library 40 that apply to the client and have not yet been implemented are put into a client_inst file 70. The client_inst file 70 contains instructions from the host_inst file 54 that apply to the local station and that are not in the old_prog (1) file. These include pending commands, described later, and new specification commands. After operation of the compact program module 58, the old_prog (1) file 56 has been replaced with old_prog (2) file 56, and client_inst file 70 contains specification commands that the present invention using a program module called interp 72 executes on the client computer.

Figure 12:
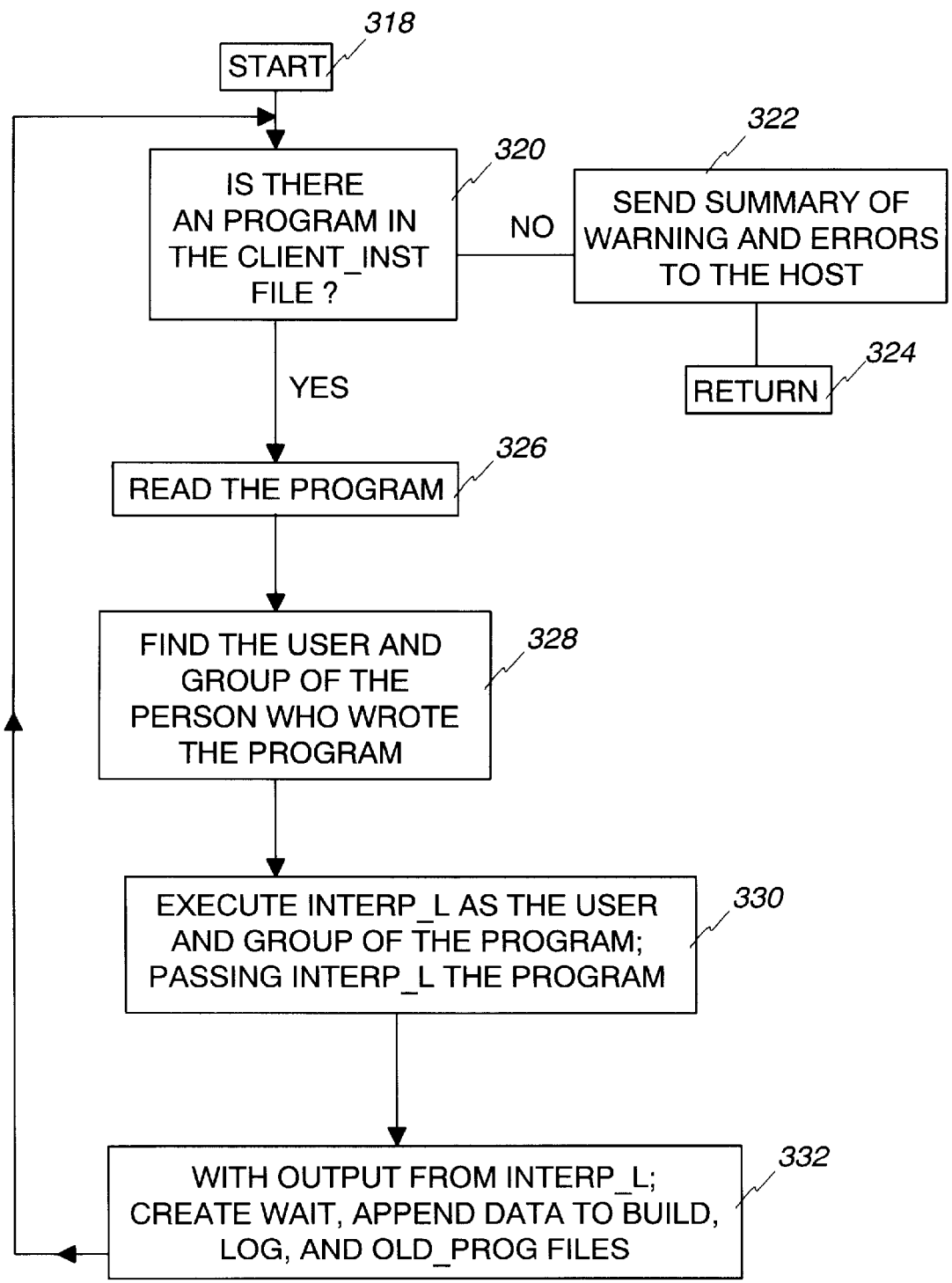
FIG. 12 is a flow diagram of the interp function module.

FIG. 12 describes the operation of the interp program 72. The interp program starts at block 318. Block 320 checks to see if there are any programs in the client_inst file 70. If there are programs in the client_inst file 70, then the next program is read at block 326 and the UNIX user and group of the programmer are determined at block 328. In block 330, the invention executes interp_1 as though it was executed by the programmer of the specification program and passes it the specification program. Output from interp_1 is used to create the wait file 98 that contains pending commands, adds implemented instructions and instructions that cause warnings or errors to the old_prog file 56, adds implemented instruction to the build file 148, and adds warning messages, error messages and implemented instructions to the log 104 in block 332. Following block 332 the programs loops back to block 320. When the client_inst file 70 is empty, then a summary of warnings and errors is sent to the workgroup host by block 322 and the routine exits at block 324.

Figure 6:
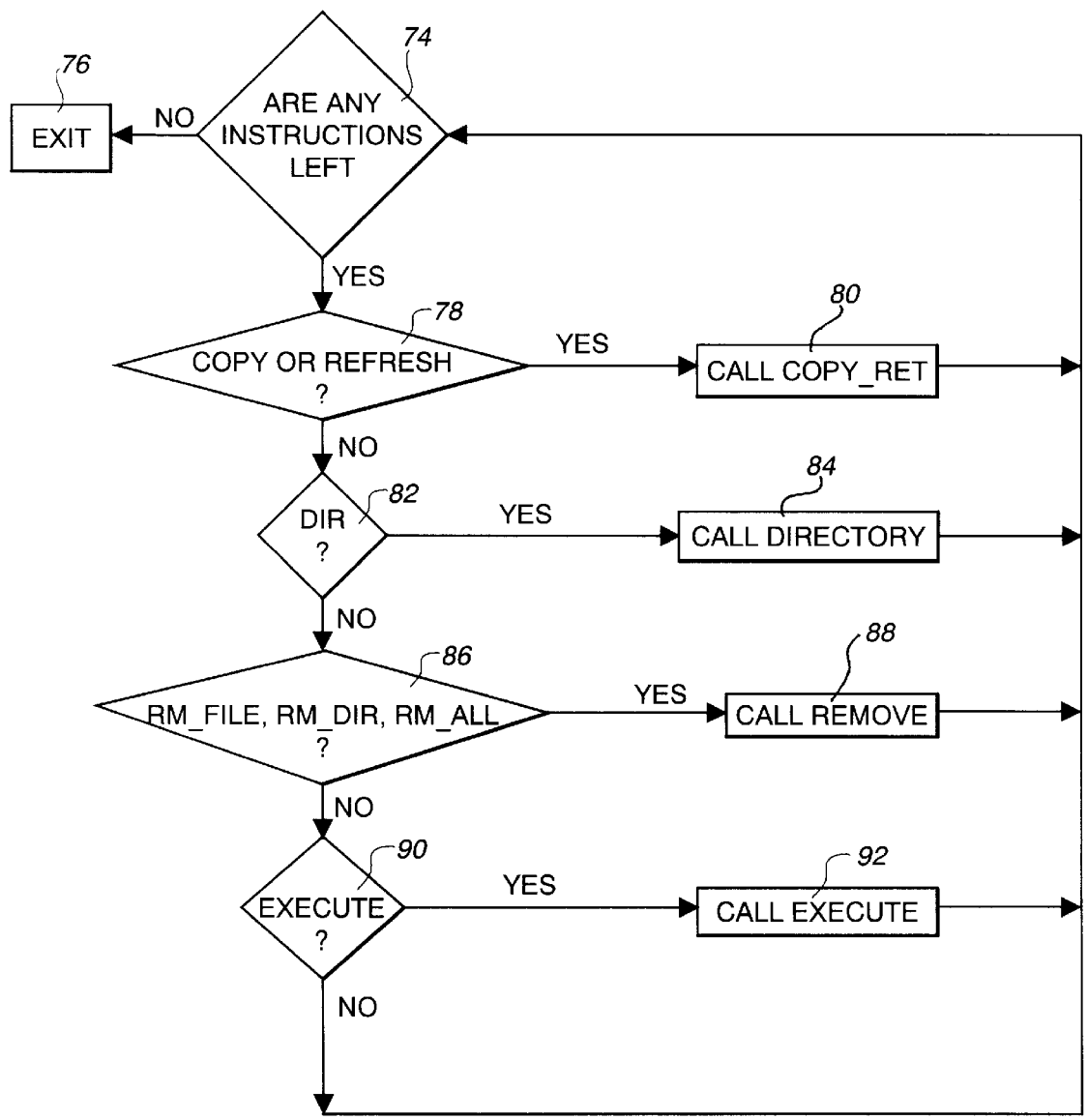
FIG. 6 is a flow diagram of the interp_1 program module.

FIG. 6 illustrates the operation of the interp_1 program. The interp_1 program parses each command and passes arguments to the appropriate function, where execution of the instruction is attempted. Step 74 determines whether there are any more instructions. If no instructions are left from the client_inst 70 file, the interp_1 program exits at step 76.

If client_inst file 70 contains instructions to be executed, each instruction is examined to determine what type of instruction it is. If the instruction is a copy or refresh instruction at step 78, then the copy_ref program is called at step 80. If the instruction is not a copy or refresh instruction, it is checked to determine whether or not it is a dir instruction at step 82. If it is a dir instruction, the directory program is called at step 84. If not a dir instruction, as determined at step 82, then at step 86 it is determined whether or not the instruction is a rm_file, a rm_dir file, or a rm_all instruction. If it is any one of these three instructions, then a remove program is called at step 88. If at step 86 it is determined that it is not a remove type of instruction, then it is determined whether or not it is an execute instruction at step 90. If yes, the execute program is called at step 92. If not, the program returns to determine whether or not there are any instructions left at step 74.

Figure 7A:
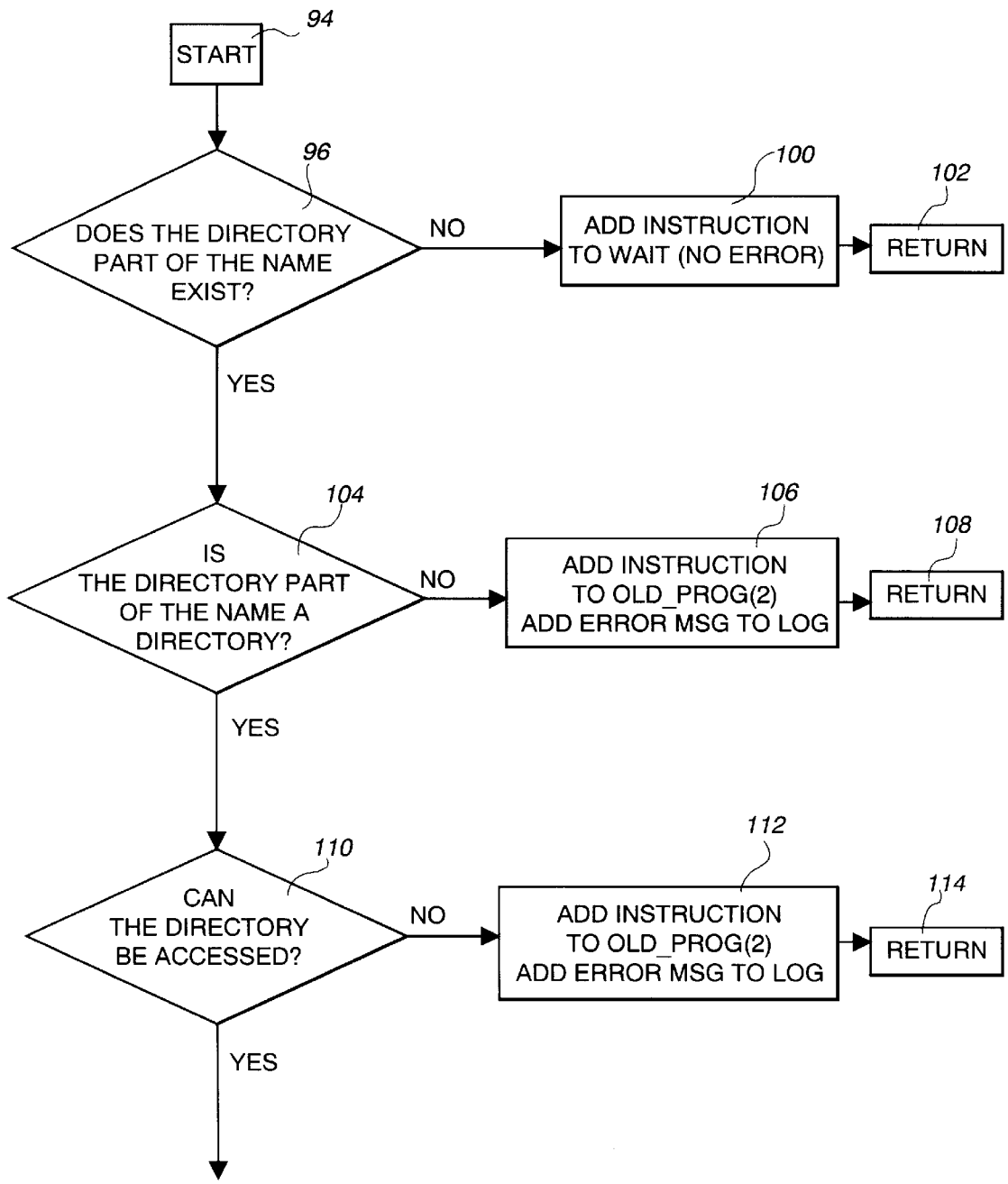
Figure 7B:
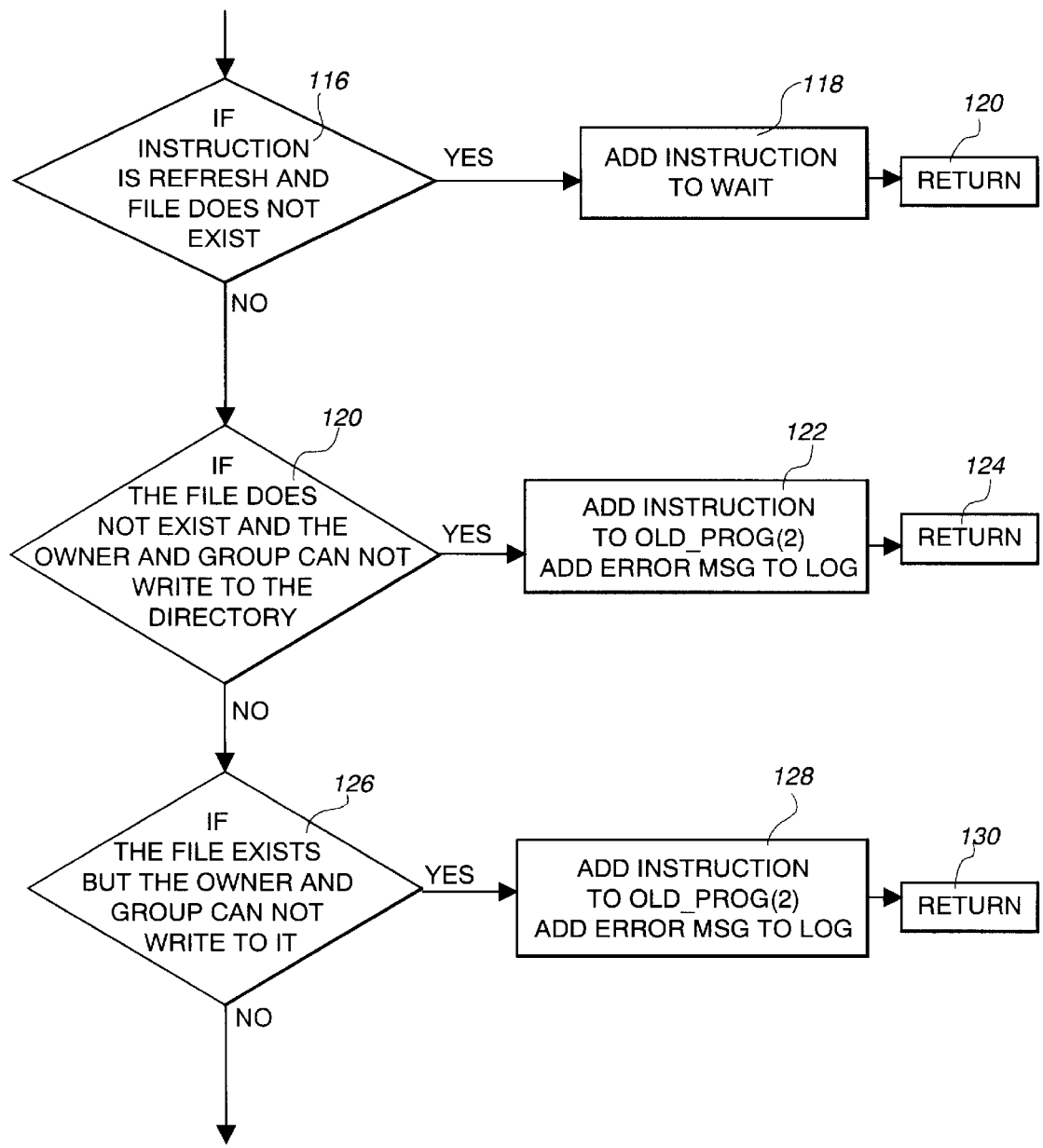

FIGS. 7A–7C illustrate the copy_ref subroutine, which is called at step 80 by the interp_1 subroutine. The copy and the refresh commands copy a file from the host workstation to the client workstation, if the owner and group of the program have permission within UNIX to do so. Both of these commands can also change the attributes of the file on a client if they have the privileges within UNIX to do so. The copy_ref subroutine begins at step 94.

At step 96, it is determined whether the directory that will contain the file exists on the client. If it does not exist, this particular instruction is added to a wait file 98, as seen in FIG. 4. The wait file contains instructions which are waiting to be executed but cannot be executed at this time. They are called pending instructions. Once the instruction is added to the wait file 98, at step 100, the copy_ref subroutine returns at step 102 to the interp_1 subroutine shown in FIG. 6. If, however, the directory part of the name does exist on the client, then at step 104 a determination is made as to whether the directory part of the name is a directory. If not a directory, an instruction is added to the old_prog (2) file 56 and an error message is added to the log file 104 at step 106. Once added, this subroutine returns to the calling subroutine at step 108.

If the directory part of the name is a directory as determined at step 104, the subroutine then determines whether or not the directory can be accessed at step 110. If it cannot be accessed at step 110, then the instruction is added to the old_prog file 56 and is also added as an error message to the log file 104 at step 112. The subroutine then returns to the calling program at step 114.

If the directory can be accessed, as determined at step 110, then the subroutine at step 116 determines if the instruction is a refresh instruction and if the file does not exist. If yes, the refresh instruction is added to the wait file 98 at step 118 and at step 120 the present subroutine returns to the calling subroutine. If step 116 is not satisfied, step 120 checks to see if the file does not exist and that the owner and the group cannot write to the directory. If step 120 is satisfied, this instruction is added to the old_prog file 56 and an error message is added to the log file 104 at step 122. After adding the error message to the log file 104, the subroutine returns at step 124 to the calling subroutine.

If step 120 is not satisfied, then at step 126 if the file exists but the owner and group specified cannot write to that particular file, then the instruction is added to the old_prog file 56 and an error message is added to the log 104 at step 128. Thereafter, the subroutine returns at step 130 to the calling subroutine.

Step 132 follows from a negative decision at step 126. If the file exists and the instruction wants to change the attributes, but the owner and group cannot, then the instruction is added to the old_prog file 56 and an error message is added to the log file 104 at step 134. Upon completion of step 134, the subroutine returns at step 136 to the calling subroutine.

If step 132 is negative, then it is acceptable to copy the file from the host to the client at step 138, at which point the host file is put into a temporary file at the client location. This illustrates the trait that specification commands are not performed until all necessary UNIX operations can be completed. The file is then copied to the proper directory and file at step 140. If necessary, attributes are changed at step 142. Once the attributes have been changed, the instruction is added to the old_prog 56 file, the log file 104, and the build file at step 144. When step 144 is completed, the subroutine returns to the calling subroutine at step 146.

As seen by the description of the copy_ref subroutine, the interp routine outputs some commands to a wait file 98. These commands are pending commands. Pending commands are not executed until some condition on the client is satisfied Pending commands are not put into the old_prog file 56, so the invention will check to see if they can be implemented the next time update client block 48 on FIG. 4 is called. The old_prog file 56 contains all executed commands, whether they succeeded or caused errors or warnings. The wait file 98 can be viewed by users on the client to see what commands are pending. In addition, the log file 104 keeps a record of the result of all executions. This is used for bookkeeping purposes.

In addition to the wait file 98 and the log file 104, a build file 148 is also accessed by the interp subroutine. The build file 148 is maintained on the client workstation only. This build file is an audit trail of all instructions that are successfully executed on the client. The present invention appends the implemented commands from each workgroup to the same build file.

Specification programs are normally left in the library. The present invention keeps track of the commands that have been attempted and does not re-execute those that were successful or those that caused an error or a warning. As long as the specification remains in the workgroup library, the invention can implement the specification on any new workstations that may be added to the workgroup and on workstations that may have been off-line. In addition, the specification must remain in the library for pending commands to be implemented.

The copy and the refresh command may not execute and may not cause an error. These pending commands will be attempted again as long as they are left in the library.

Pending commands allow the programmer to write specifications that respond to differences between clients and to changes on a client. This is often needed when setting up projects or distributing software to the individual workstations. For example, if a programmer wants to configure some software, he can write a specification without knowing which computers in a group have or will have the software.

Returning now to FIG. 6, if the interp_1 routine determines at step 78 that the instruction is not a copy or refresh command, it proceeds to step 82 where it determines whether or not the command is a dir command. If it is a dir command, at step 84 the directory subroutine is called.

Figure 8A:
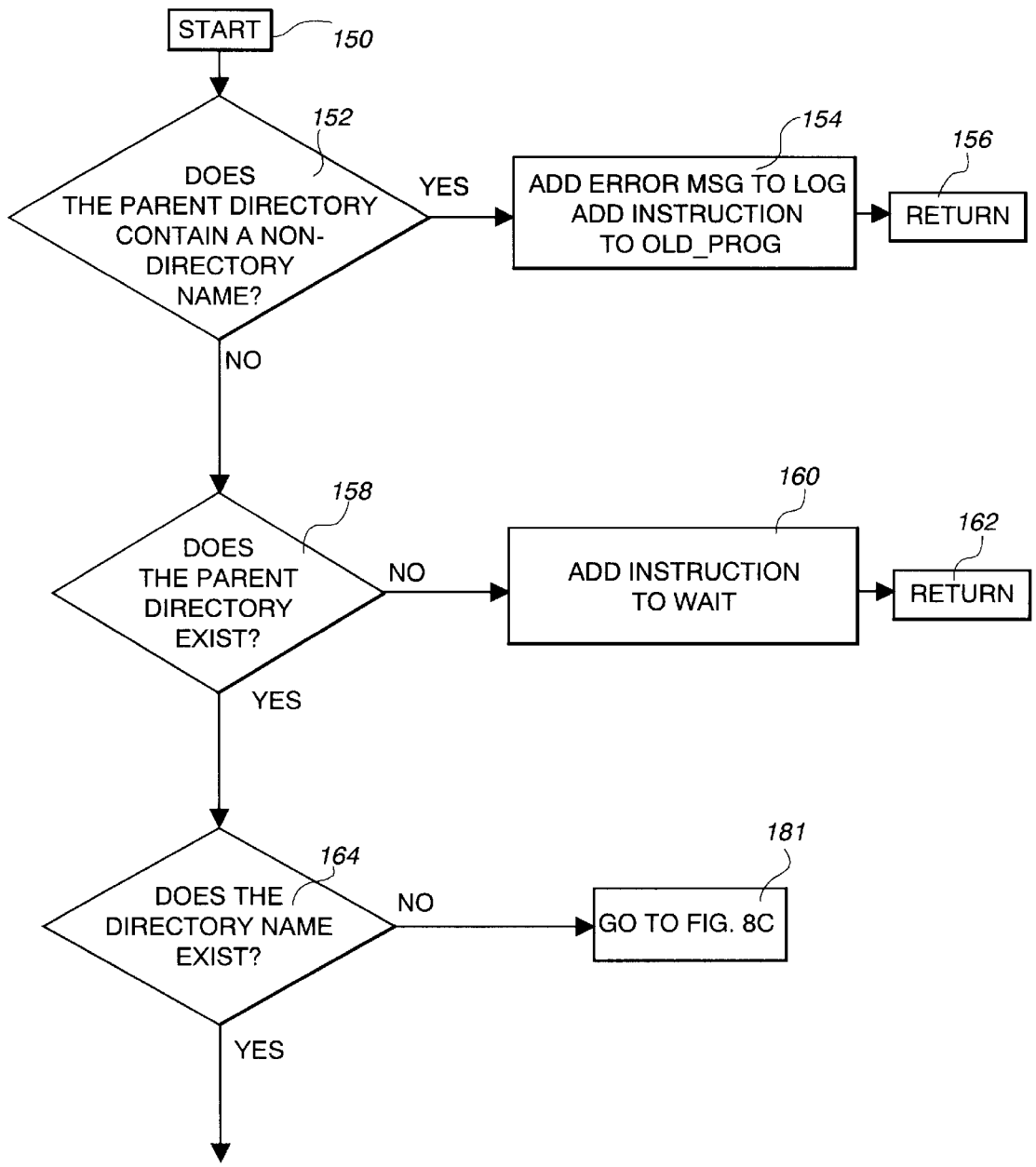
Figure 8B:
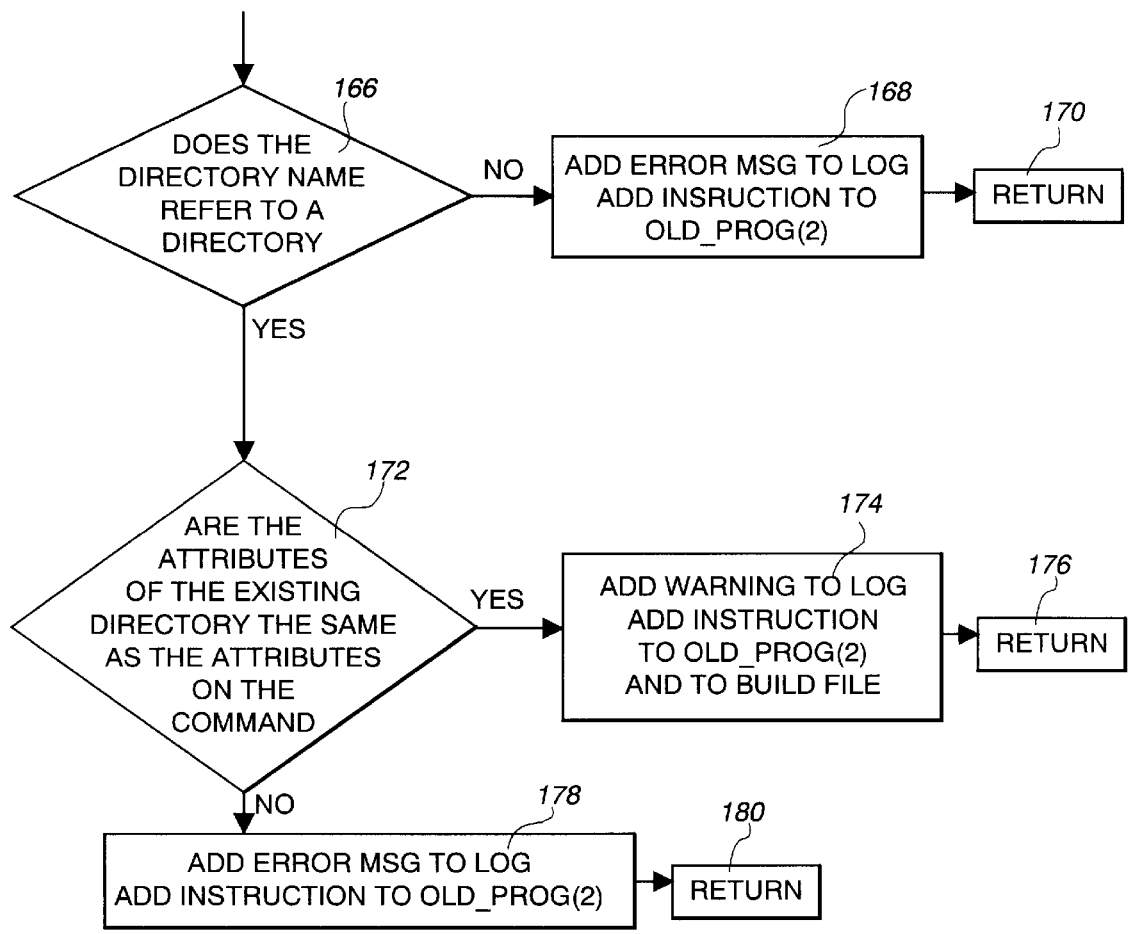
Figure 8C:
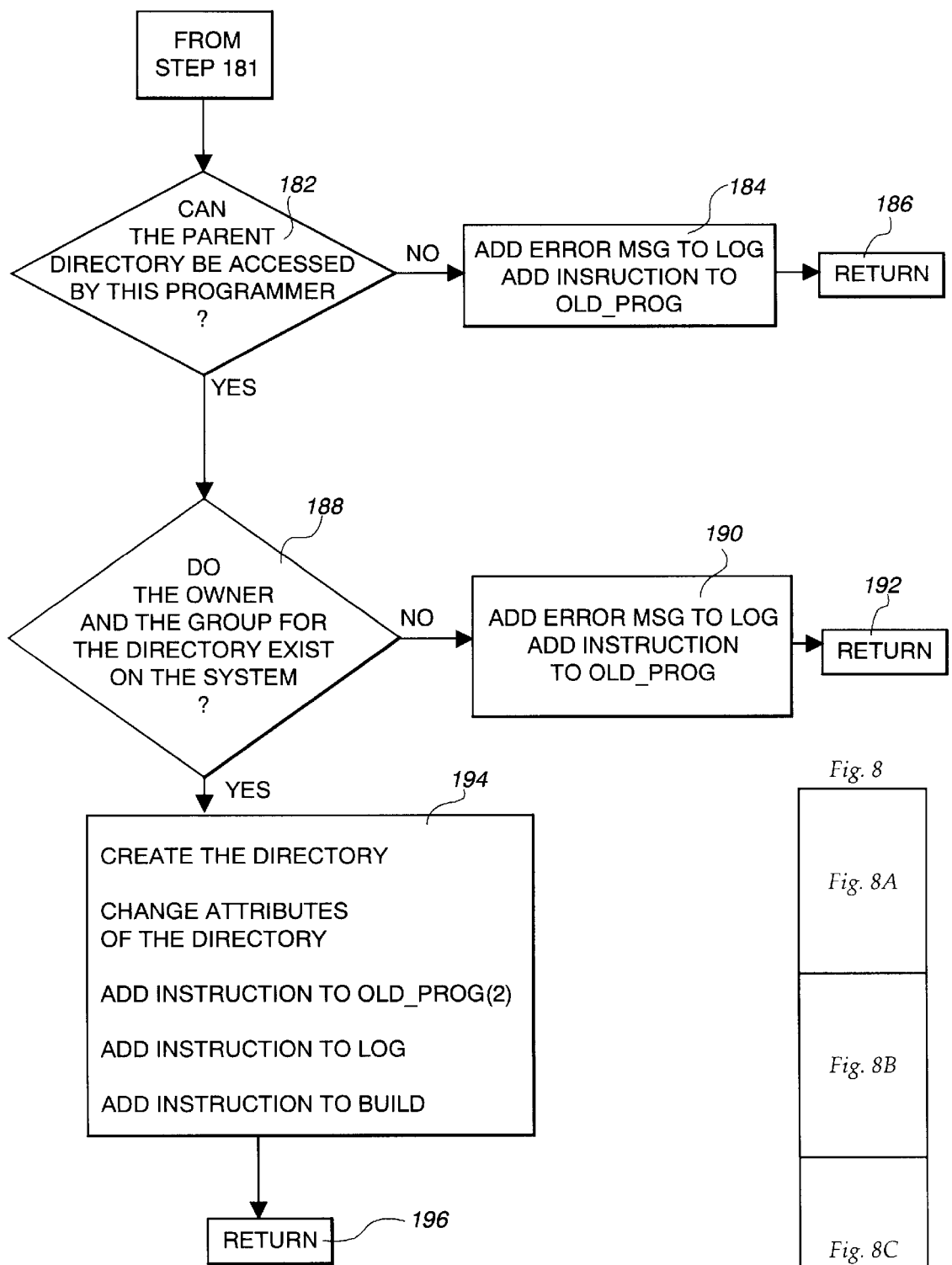

FIGS. 8A–8C illustrate the operation of the directory subroutine. The directory function 84 creates a directory on the client, using the data that is in the dir command. At step 150, the directory subroutine begins. At step 152, the directory subroutine checks to see if the parent directory name contains a non-directory. If so, an error message is added to the log file 104 and the instruction is added to the old_prog file 56 at step 154. Subsequently, at step 156 the subroutine for the directory returns to the interp_1 program.

If, however, all parts of the parent directory name that exist are directories, then the directory subroutine checks at step 158 to see whether or not the parent directory exists. If the parent directory does not exist, the command pends and at step 160, the instruction is added to the wait file 198. At step 162, the directory subroutine then returns to the calling program.

If, however, the parent directory does exist, then at step 164 the subroutine checks to see whether or not the directory name exists. If the directory name does exist, then the directory proceeds to FIG. 8B, at which point the subroutine checks at step 166, to determine if the directory name refers to a directory.

If the directory name does not refer to a directory, at step 168 an error message is added to the log file 104 and the instruction is added to the old_prog file 56. At step 170, the subroutine returns to the calling program.

If, however, the directory name does refer to a directory, then at step 172 the subroutine determines whether or not the attributes of the existing directory are the same as the attributes on the dir command. If these attributes are the same, then at step 174 a warning is added to the log file 104, this instruction is added to the old_prog file 56 and the command is added to the build file 148, whereupon the subroutine returns to the calling routine at step 176.

If, however, the attributes are not the same, then an error message is added to the log file 104 and the instruction is added to the old_prog file 56 at step 178 and upon completion, returns to the calling program at step 180.

Returning now to FIG. 8A, at step 164 the check determines whether or not the directory name exists. If it does not exist, the subroutine continues at step 181 to the program shown in FIG. 8C, where, at step 182, the directory subroutine determines whether or not the parent directory can be accessed by the programmer of the dir command (refer to Table 9). If the parent directory cannot be accessed by this programmer, at step 184 an error message is added to the log file 104 and the instruction is added to the old_prog 56 and then the routine returns at step 186.

If, however, the parent directory can be accessed by the user and group of the programmer of the dir command, at step 188 the subroutine asks whether or not the owner and the group for the directory exist on the system. If the owner and the group for the directory do not exist on the client, at step 190 an error message is added to the log file 104 and the instruction is added to the old_prog file 56, whereupon the subroutine returns at step 192 to the calling program.

If the owner and the group for the directory do exist on the system, as determined at step 188, the program at 194 completes a number of tasks. At 194, the directory is created, the attributes of the directory are changed to match attributes stated in the dir command, the instruction is added to the old_prog file 56, the instruction is also added to the log 104, and the instruction is added to the build file 148, signifying that it is a command which has been completed. After completion of step 194, the program returns to the calling program at step 196.

Returning again to FIG. 6, if the interp_1 subroutine determines that the instructions are not a copy instruction, a refresh instruction or a directory instruction, it proceeds to step 86 where it is determined whether or not the instruction is a remove file instruction, remove directory instruction or a remove-all instruction. These are rm_file, rm_dir and rm_all. If the interp_1 subroutine determines that it is a remove instruction, the remove subroutine is called at step 88.

Figure 9A:
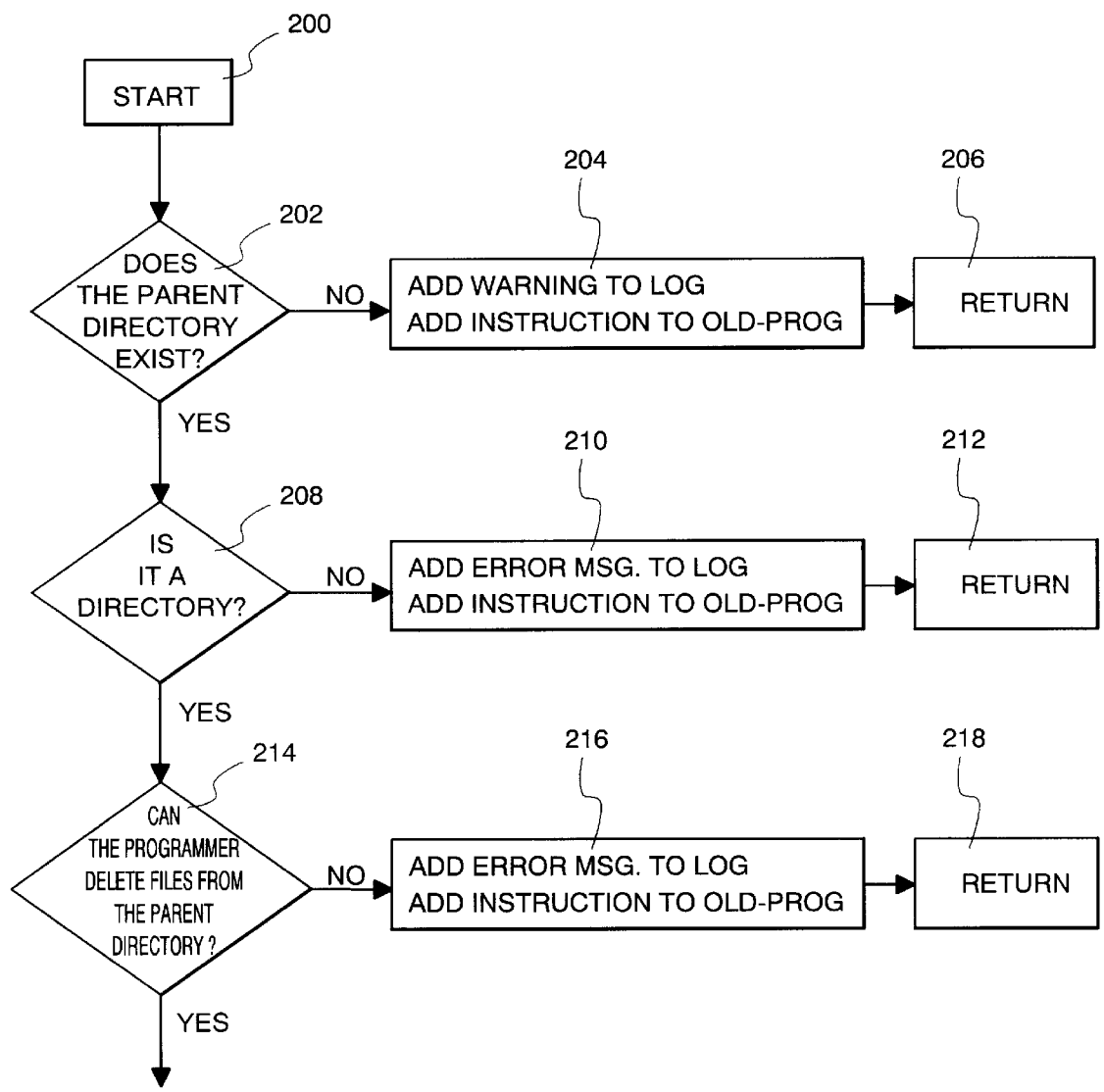
Figure 9B:
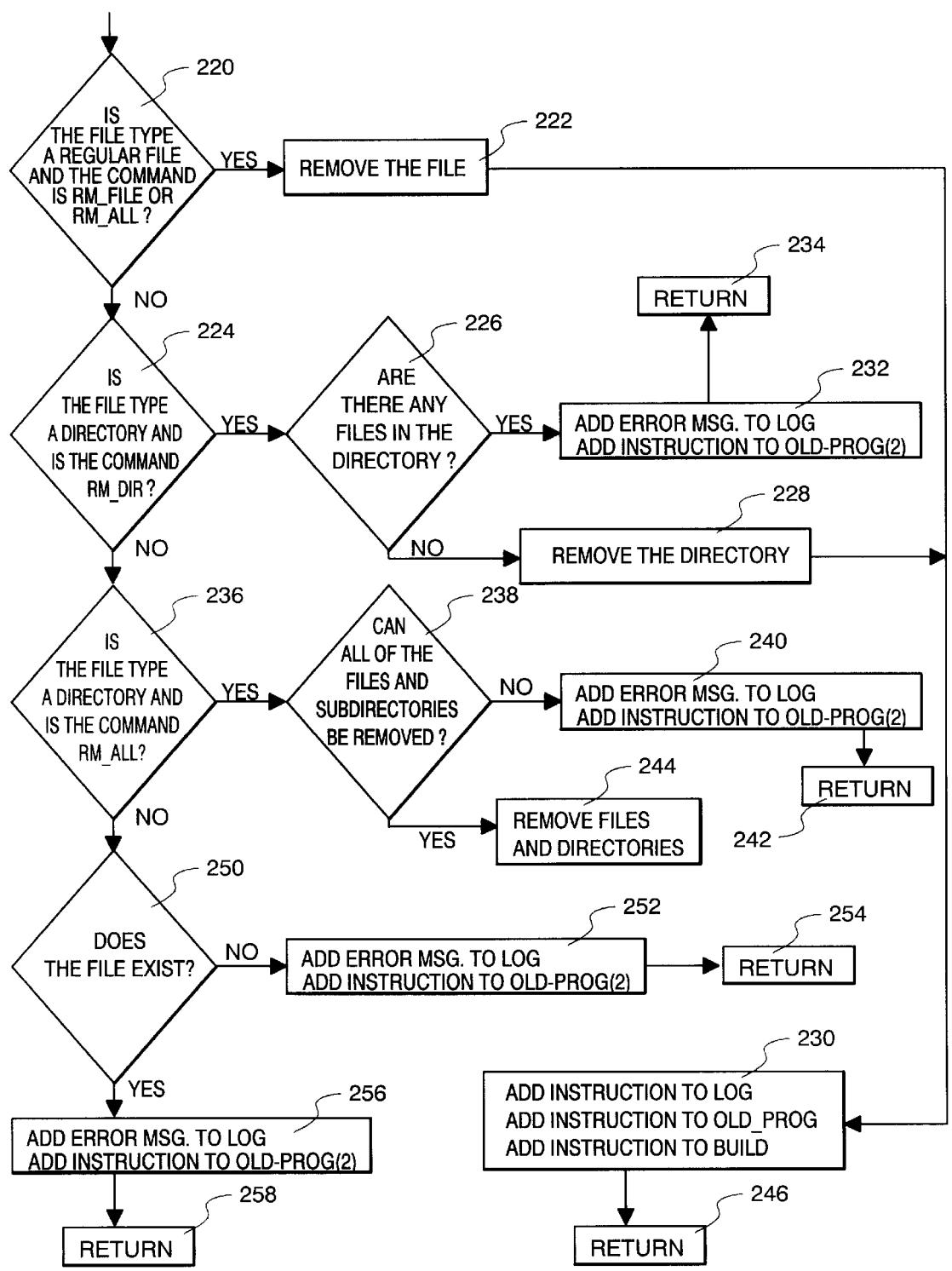

FIGS. 9A and 9B illustrate the operation of the remove subroutine. The remove subroutine begins at step 200, whereupon at step 202 the remove subroutine checks whether or not the parent directory exists. If the parent directory does not exist, at step 204 a warning is added to the log file 104 and the instruction is added to the old_prog file 56, upon which time it returns at step 206.

If, however, the remove subroutine does determine that the parent directory exists, at step 202 the subroutine proceeds to step 208, where it is checked to see whether or not it is a directory. If it is not a directory, at step 210 an error message is added to the log file 104 and the instruction is added to the old_prog 56 and returns at step 212.

If it is a directory, however, at step 214 a check is made to determine whether or not the programmer can delete files from the parent directory. If the programmer does not have the ability or authorization to delete files from the parent directory, at step 216 an error message is added to the log file 104 and the instruction is added to the old_prog file 56 and returns at step 218.

If the programmer does have authorization to delete files from the parent directory, as determined at step 214, the subroutine continues to step 220, shown in FIG. 9B. In step 220, it is determined whether or not the file type is a regular file and whether the command is a rm_file or a rm_all. If it is, at step 222 the file is removed. At step 230, the command is added to the log file 104, the old_prog file 56 and the build file 148. It continues to step 246 where it returns to the calling routine.

If, however, the file type is not a regular file or the command is not a rm_file or a rm_all file, then at step 224 a check is made to determine if the file type is a directory and whether or not the command is a rm_dir file. If the file type is a directory, and the command is an rm_dir command, then at step 226 a determination is made to see whether or not the directory is empty. If empty, the directory is removed at step 228. At step 230, the command is added to the log file 104, the old_prog file 56 and the build file 148. It continues to step 246 where it returns to the calling routine.

If there are, however, files in the directory, an error message is added to the log file 104 and the instruction is added to the old_prog 56 at steps 232 and returns at step 234. If the file type is not a directory or the command is not rm_dir, the routine proceeds to step 236, where a check is made to determine if the file type is a directory and if the command is an rm_all command. If yes, the subroutine proceeds to step 238 and a determination is made as to whether or not all of the descendant files and the subdirectories can be removed.

If they cannot be removed, at step 240 an error message is added to the log file 104 and the instruction is added to the old_prog 56, whereupon the subroutine returns at step 242. If the decision at step 238 is yes, at step 244 the files and the directories are removed. At step 230, the command is added to the log file 104, the old_prog file 56 and the build file 148. It continues to step 246 where it returns to the calling routine.

If it was determined at step 236, however, that the file type was not a directory or the command was not an rm_all command, then at step 250 it is determined whether or not the file exists. If the file does not exist, at step 252 a warning is added to the log file 104, the instruction is added to the old_prog file 56, and the subroutine returns at step 254.

If the file does exist at step 250, an error message is added to the log file 104 and the instruction is added to the old_prog file 56 at step 256 and returns at step 258.

Returning again to the interp_1 subroutine, as shown in FIG. 6, if it has been determined that the command is not a copy or a refresh command, is not a dir command, and is not a remove instruction, then step 90 determines if the command is an execute command. If there is an execute instruction at step 90, the execute subroutine is called at step 92.

Figure 10:
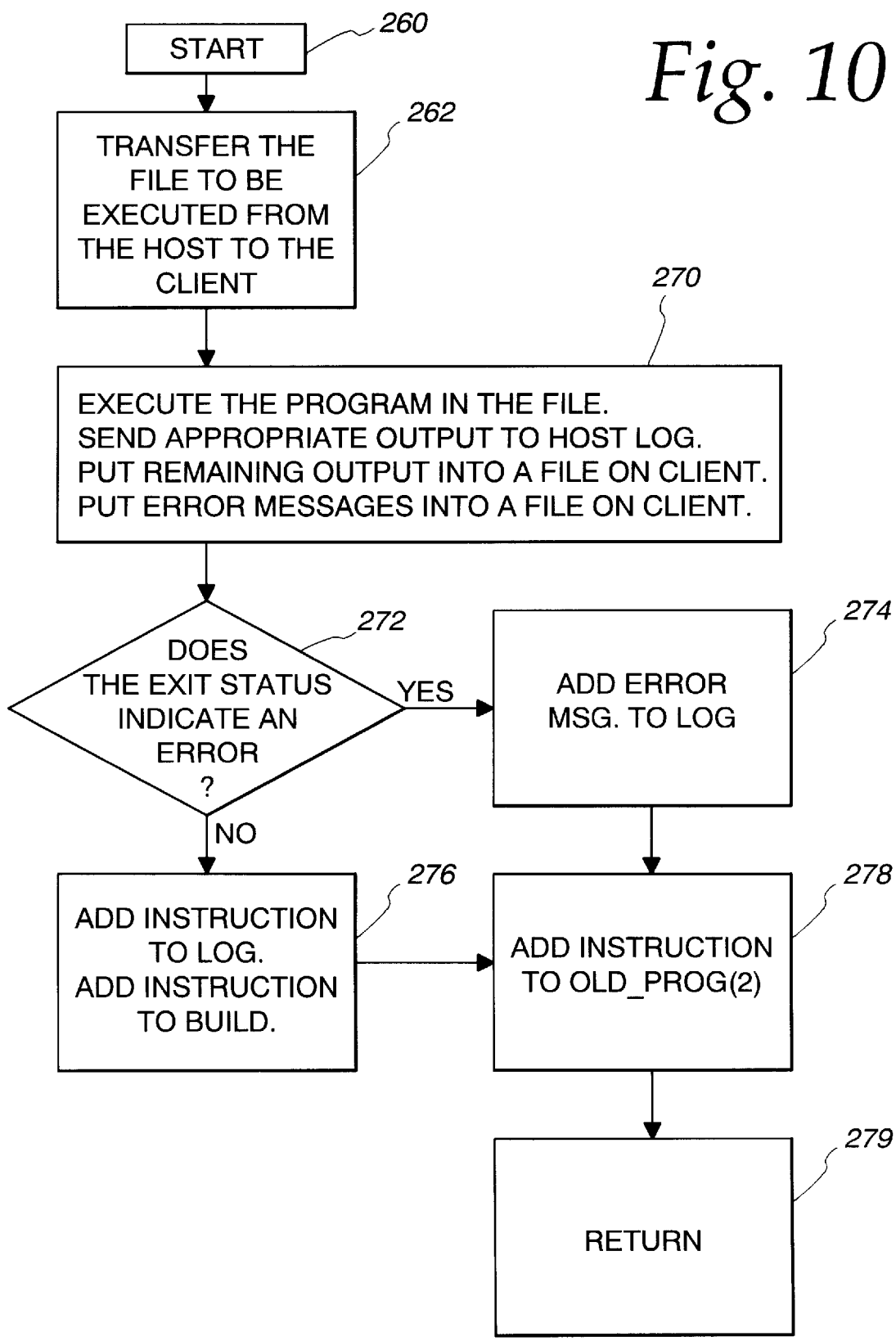
FIG. 10 is a flow diagram of an execute program module.

The execute subroutine is shown in FIG. 10. The execute routine begins at step 260. At step 262, the file to be executed is transferred from the host to the client. At step 270 the subroutine; (1) executes the program listed in the file, (2) sends the appropriate output to the host log, (3) puts the remaining output into a file on the client, and (4) puts error messages into a file on the client. Once these steps have been completed as shown in the box 270, the subroutine proceeds to step 272 to determine whether or not the exit status indicates an error.

If the exit status indicates an error, an error message is added to the log file 104 at step 274, at step 278 the instruction is added to the old_prog 56, and at step 279 it returns to the calling routine. If there are no error messages, then at step 276 the instruction is added to the log file 104 and the build file 148. Then at step 278 the instruction is added to the old_prog file 56 and at step 279 returns to the calling program.

Another feature of the present invention is the ability to check the current status of the host files specified by the copy, refresh and execute commands listed in the library. An update library utility (update), updates the commands in the library with the maintain option (-m). See TABLES 1 and 2. It detects errors in the copy, refresh, and execute commands caused by a change in the status of the host file. It also loads the current station label definitions into the library. The present invention executes the update utility at the times specified by the workgroup leader and prior to block 48, update client, started by a programmer on the host.

Figure 11:
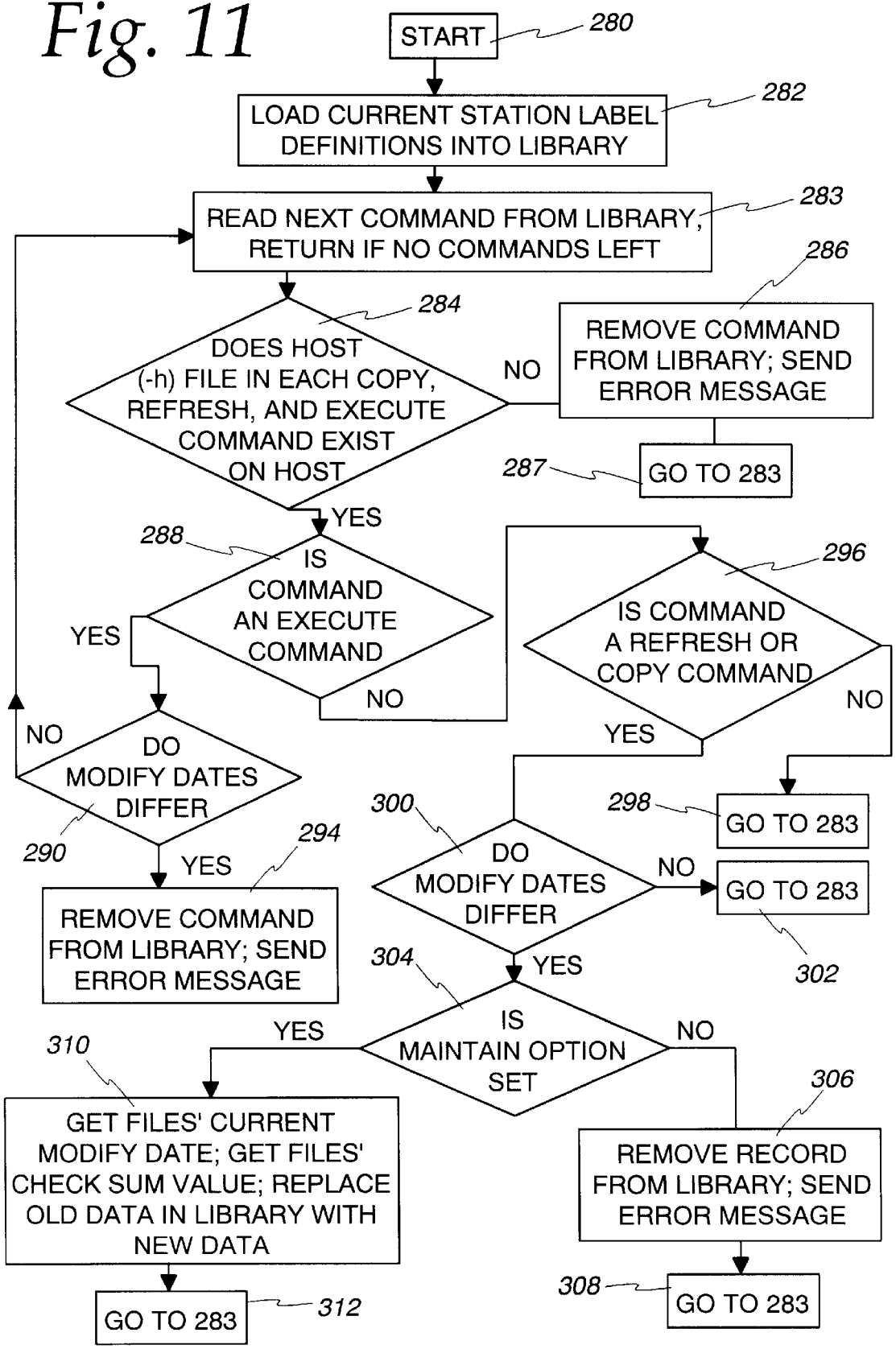
FIG. 11 is a flow diagram of a program update program module.

As shown in FIG. 11, the update utility starts a subroutine at step 280. At step 282, the command loads the current station label definitions into the library. Once the current station label definitions have been loaded, the subroutine reads the next command from the library at step 283, and returns if no commands remain. The subroutine then determines whether or not the host file in each copy, refresh and execute commands exist on the host at step 284. If the host files in each copy, refresh and execute commands do not exist on the host, then these commands are removed from the library and an error message is sent to the programmer at step 286, whereupon the subroutine at step 287 goes to step 283 to read the next command.

If, however, the host files in each copy, refresh and execute commands do exist on a host, then at step 288 the check is made to determine whether or not the command is an execute command. If the command is an execute command, at step 290 the subroutine determines whether or not the host file's modify date in the command differs from the file's actual modify date. If the modified dates do not differ, then it is known that the file has not changed and the subroutine returns at step 283 to read the next command.

If, however, the modified dates do differ, then the command is removed from the library and an error message is sent at step 294. If it is determined at step 288 that the command is not an execute command, then the command is checked to determine whether or not it is a refresh or a copy command at step 296. If the command is not a refresh command or a copy command, then the program returns at step 298 to step 283.

If the command is a refresh command or a copy command, then at step 300 the subroutine determines whether or not the host file's modify date in the command differs from the file's actual modify date. If the modified dates do not differ, then the subroutine returns at step 302 to step 283.

If, however, the modified dates do differ, then the command is checked to determine whether or not the maintain option has been set at step 304. If the maintain option is not set, then at step 306 the record is removed from the library and an error message is sent. Upon completion of these tasks, the program returns at step 308 to step 283.

If it is determined, however, at step 304 that the maintain option is set, then at step 310 the subroutine gets the file's current modify day, gets the file's check sum value and replaces the existing command with a new command using the new data. The subroutine returns at step 312 to step 283.

Workstation Comparison System

The Workgroup Organized Network Manager includes a workstation comparison system for comparing the files or directories that are located on the individual workstations to determine whether any discrepancies exist between files or directories that are intended to be the same, to locate extra files or directories, or to identify missing files or directories. The workstation comparison system operates in conjunction with the workgroup organized network manager described herein and in co-pending application Ser. No. 07/898,191, which is incorporated herein by reference. The workstation comparison system is used to compare aspects of computers that should be the same. For example, the electrical department might want all of their workstations to have the same software and want the software set up in the same way. The workstation comparison system compares the software maintained on each of the workstations to determine whether the software is in fact the same.

The workstation comparison system includes two types of programs. One type of program collects the data from each of the workstations and the other type analyzes the data that is collected. Data is collected by a workstation designed to be the collection workstation. The collection workstation can be any workstation so designated and can include the host or client workstation. The data collected includes the attributes of the files or directories located on the individual workstations. The attributes include the type of file, mode or protection of the file, number of links, owner and group that the file belongs to, the date, the size, and the checksum. Other attributes can also be used. As used hereinafter,"files" is defined to include files, directories, and software or any other collection of data having identifiable attributes.

Inv_collect is the attribute collection utility used in the present invention. It is similar to a 1s—1R command in UNIX except that it collects more data and it treats symbolic links to directories as if the symbolic link is a directory and includes the checksum of the file. The inv_collect is run by an execute command in the workgroup organized network manager. It sets up the input for an inv_prog utility, runs the inv prog utility, and sends output and error messages from inv_prog back to the workgroup host.

The inv_collect utility requires that a directory, -h host_ directory, be created to receive the attributes collected by the inv_collect utility. This utility optionally includes a list, -d d_list, be created to identify the complete path names of directories and files that should be excluded from the data collection process. The inv_collect utility includes the option of preventing inv_collect from using symbolic links to find data. The parameters path1 path2 etc., indicate the point where a search begins. The path names can be either directories or files. More than one path can be given. In the present invention, this information is written as:

```
inv_collect -h host_directory [-d d_list] [-1]
path1 path2 . . .
```

Figure 13:
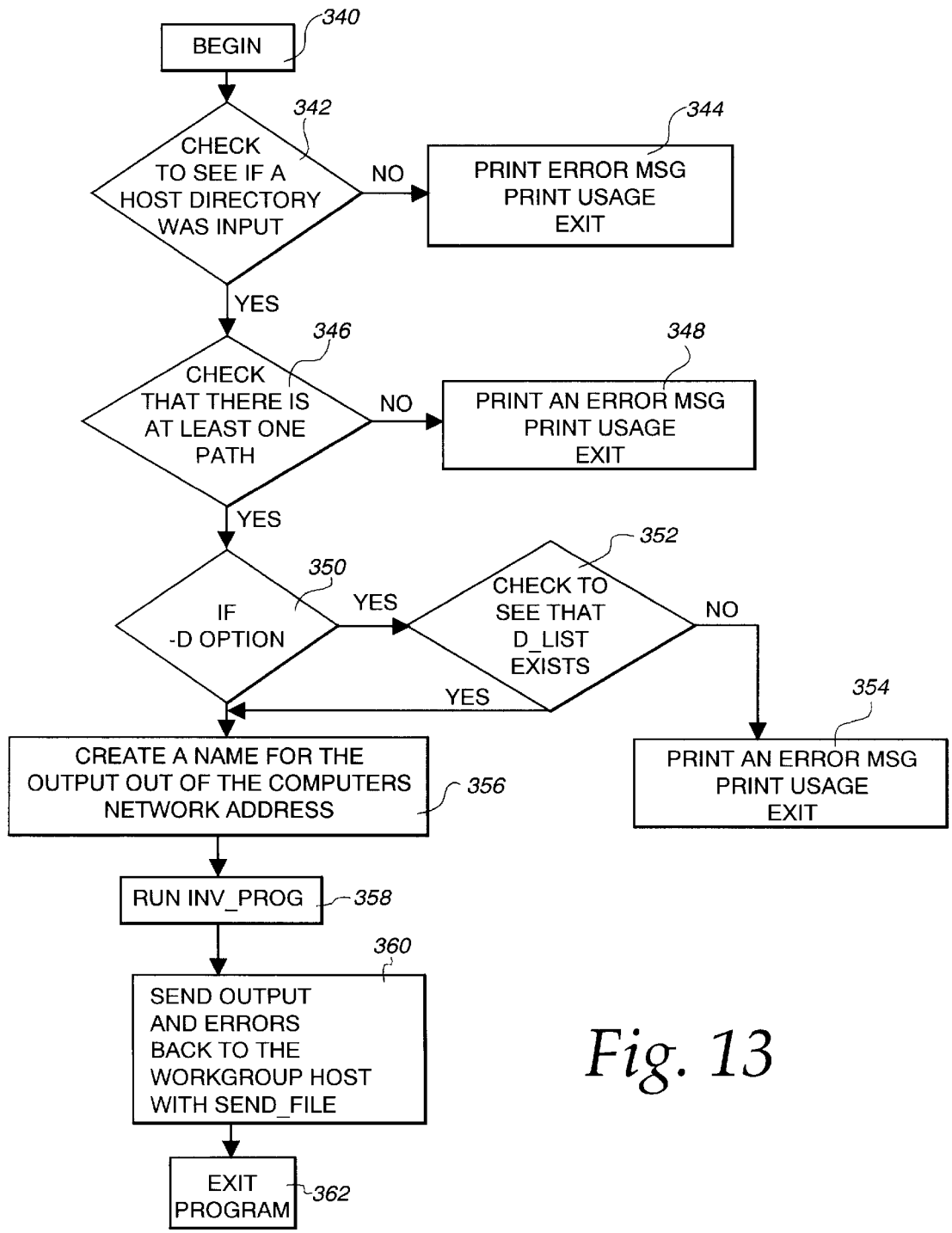
FIG. 13 is a flow diagram of an inventory collect program for collecting attribute data of files and directories.

FIG. 13 is a flow chart illustrating the operation of the inv_collect utility. The inv_collect utility begins at block 340.

At step 342, a check is made to determine whether a host directory has been input. The host directory is created prior to executing the inv_collect command and receives output and error messages from inventory program (inv_prog) to be described later. If not, an error message is printed at step 344 including the proper usage of the inv_collect command and then the program exits. At step 345, a check is made to determine whether or not at least one path has been specified. If a path has not been specified at 345, at block 348, an error message is printed, and the program exits. If there has been at least one path specified in step 346, at step 350, a check is made to determine if the -d option has been selected. As previously stated, the -d option indicates which files are to be deleted from the collection process. If the -d option has been selected, the routine proceeds to step 352 to make certain that a d_list exists. If a d_list does not exist, at step 354, an error message is again printed, and the program exits. If, however, at step 352, the d_list does exist, then, at step 356, a name of a workstation file is selected for the output. The workstation file is a file established to hold the records describing all the attributes of the files contained on a single workstation. The workstation file is given a unique name created out of the workstation's network address. This file will contain the attributes of files existing on a particular workstation.

Once step 356 has been completed, step 358 begins by running an inventory program. The inventory program is similar to a standard program which can be found in the following book: The C Programming Language by Kerningham and Ritchie, 2nd Edition, published by Prentice-Hall, ©1988, modified to follow symbolic links and to compute the checksum of the file, as would be understood by one skilled in the art. Other derived attributes such as a cyclic redundancy check can also be used. The inventory program, at step 358, collects the attributes from the various files which are located on the workstations which have previously been selected. Once the inventory program is completed at step 360, the output and any errors are sent back to the work group host with the program send file. Send_file is a simple utility that sends files from a client computer to its host. The output and errors, which have been gathered by inventory program at step 358, are sent back to the host computer and saved in the directory that has been previously specified with the -h parameter host_directory.

The output of inventory collect is arranged in certain fields. The fields are as follows: device number, inode number, type of file (d=directory, -=regular, 1=symbolic link, p=pipe, b=block special, c=character special and s=socket), mode of file, number of links, owner, group, size in bytes, date in seconds, since 00:00:00 Greenwich mean time, Jan. 1, 1970, checksum and path name. Data in this format is used by the analysis programs, comp_station and comp_model routines, in the present invention to determine similarities and differences between specified workstations. At step 362, the inventory collect program is exited.

Figure 14:
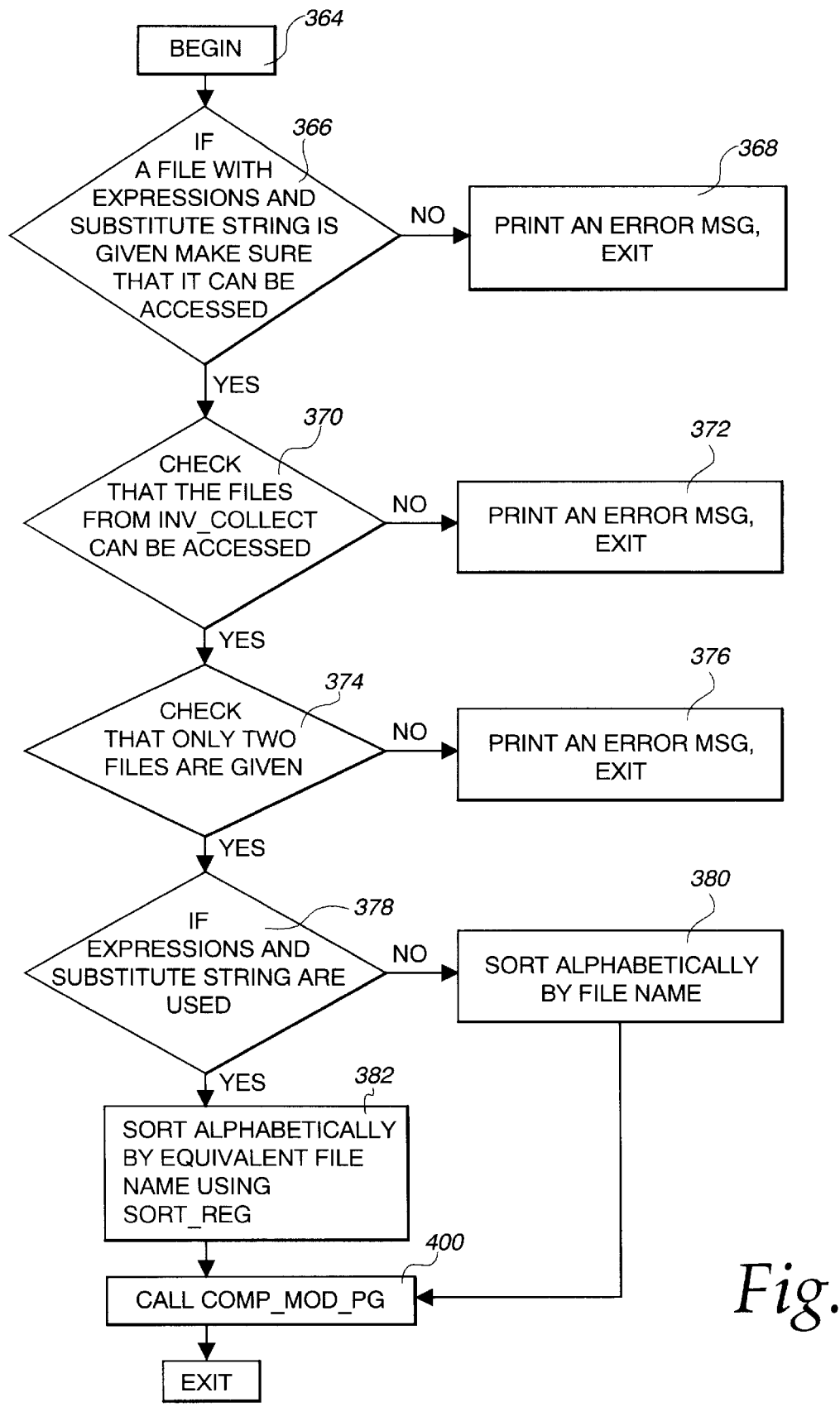
FIG. 14 is a flow diagram of a compare model program for comparing files located on a model workstation to a target workstation.

The comp_model program is illustrated in FIG. 14. The comp_model program uses data from the inventory collect routine. The comp_model program is used to compare the data collected from two workstations. Typically, one of the workstations is considered to be a model workstation and includes all the proper files, directories and software without any errors. The other workstation, to which the model workstation is to be compared, is called a target workstation. The target workstation is a workstation which the operator is checking to determine whether or not it is set up properly and operating correctly. Consequently, once the comp_ model program has been completed, any differences between the two workstations indicate specific areas where problems may exist on the target workstation.

The comp_model program compares attributes of files, directories, and software common to the two computers. The attributes of one file, directory, or software are contained in a record. A report is generated based on a comparison of records indicating which files are missing from the target workstation. The report also indicates files that are extra on the target workstation and files that may have the same content on the model workstation. Finally, files with the same or equivalent names that have different attributes are also shown.

The comp_model program includes the means to define names of files that are equivalent and to compare the attributes of those files. An operator sets up the equivalence by constructing pairs of expressions and substitute strings. If the comp_model program finds a string in a file name that matches the expression, then the string is replaced with the substitute string to produce an equivalent name.

The comp_model program begins at block 364 of FIG. 14. At step 366, a check is made to determine whether or not a given file with expressions and substitute strings can be accessed. This file is an option and need not be specified. If this file cannot be accessed, at step 368, an error message is printed and the program exits. If, however, this file can be accessed, at step 370, a check is made to determine that the files from the inv_collect program can be accessed by the operator. If these files from the inventory program cannot be accessed, at step 372, an error message is printed and the program exits. If, however, the files which are collected by the inv_collect program can be accessed, at step 374, a check is made to determine that only two workstation files are given. Each workstation file corresponds to one workstation and includes the attributes of the files contained therein. If two workstation files are not given, however, at block 376, an error message is printed and the program exits.

If only two workstation files are given, as determined at step 374, step 378 checks to determine whether or not expressions and substitute strings are used for the files contained in the workstation file. If expressions and substitute strings are not used, then the files are sorted alphabetically by file name at step 380. Sorting files alphabetically by file name prepares the files for comparison so that the files from the model work station can be compared to the target work station. If, however, expressions and substitute strings are used, at step 382, a different type of sort routine is used which sorts alphabetically by equivalent file name. This sort routine is called sort_reg. Sort_reg is a short subroutine using the standard C language routine qsort, which uses comp_reg for comparison. Comp_reg compares equivalent file names rather than the file name itself. The equivalent file names are compared alphabetically. Once the files have been sorted alphabetically, either by equivalent file name using sort_reg or sorted alphabetically by file name if no equivalent file names are used, a program called compare model program (comp_model_pg) is called at step 400.

Figure 15A:
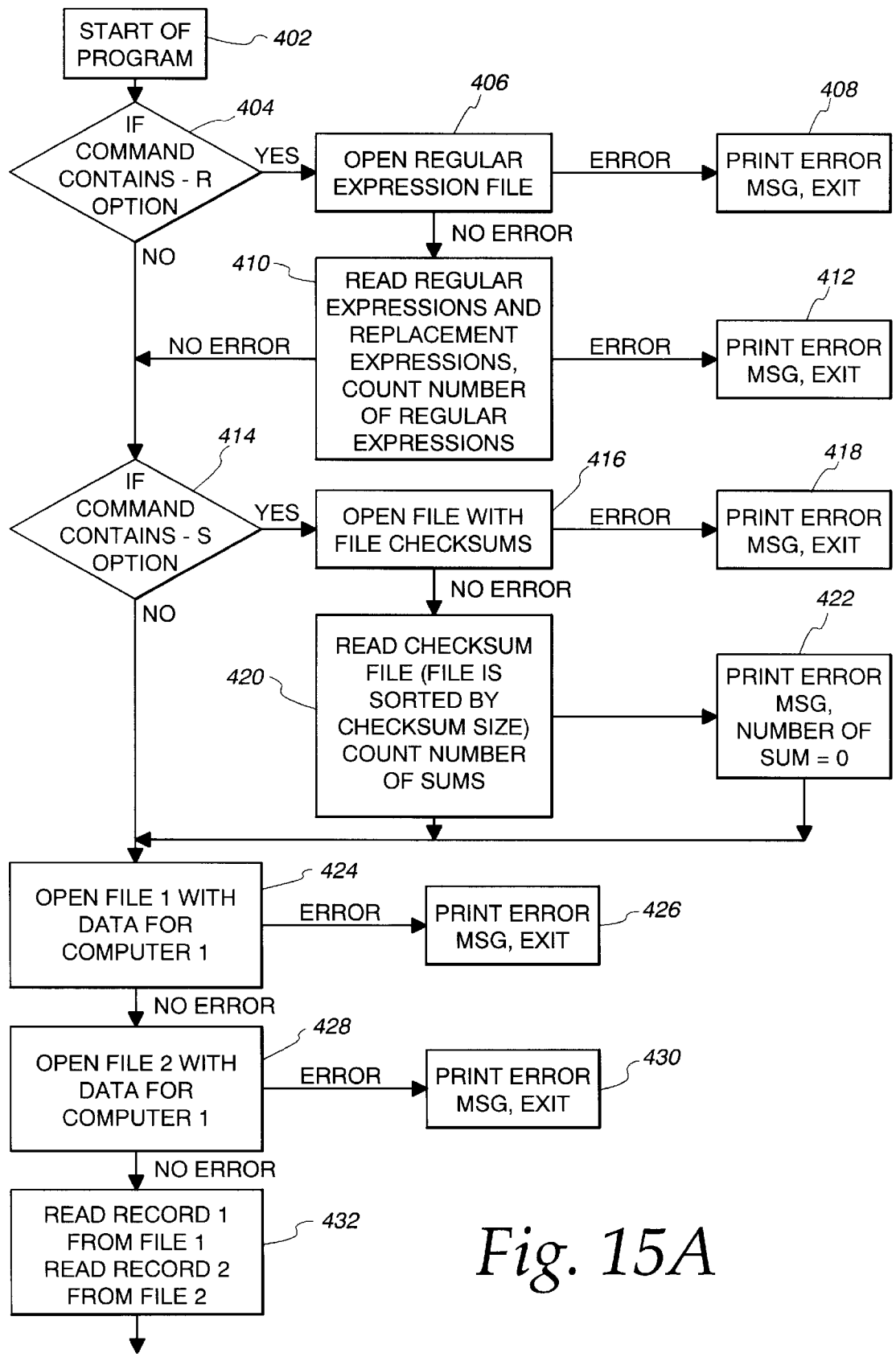
Figure 15B:
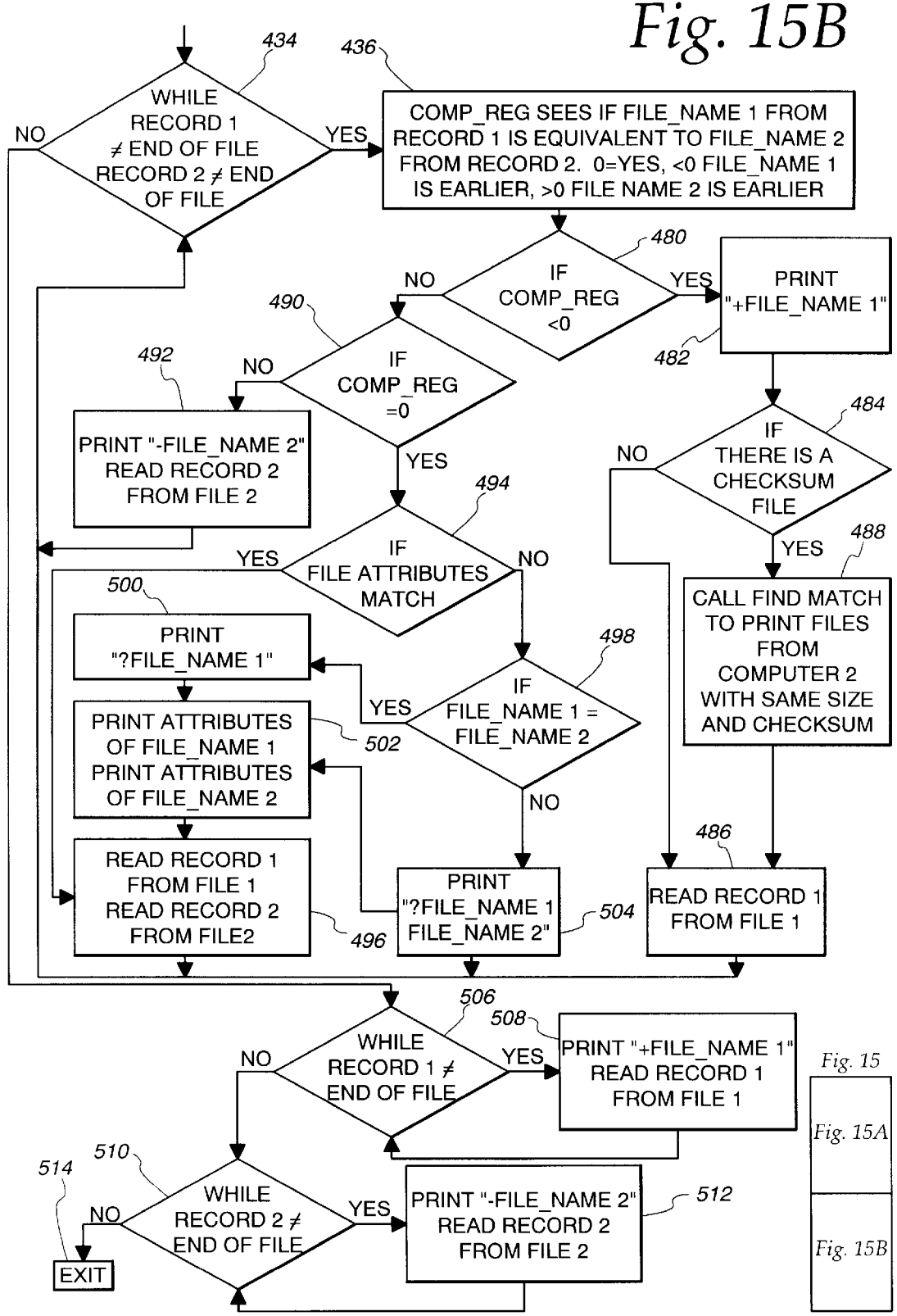

The compare model program 400 is shown in FIGS. 15A and 15B. The inputs for the comp_model program are the workstation file for the target computer which contains the record of attributes for each file, including names of each of the files. The files must be sorted alphabetically either by a sort routine, sort reg or another sort routine. Another input for the comp_model program is the workstation file for the model computer with records containing the attribute files located there. This workstation file must also be sorted by the sort_reg subroutine or some other sorting routine. If the sort_reg subroutine sorted the records based on a group of expressions in substitute strings, then a file with those expressions and strings must also be input to the comp_model program. Optionally, a checksum/size file derived from the workstation file for the model computer can exist which contains records with the size, checksum and name of the files. This checksum/size file is sorted by checksum and size.

The comp_model program compares attributes of the files, including attributes that reflect the file content and directories on the two computers. The comp_model program produces a report of files that are missing from the target computer. If a file is extra on the target, then files that may have the same content on the model are listed. In addition, files with the same or equivalent names but having different attributes are also listed. Comp_model can check files with equivalent names. Users set up equivalents by constructing pairs of expressions and substitute strings. If comp_model, as seen in FIG. 14, finds a string in a file name that matches the expression, then it is replaced with the substitute string.

As previously stated, the comp_model routine compares the files on a target station to the files on a model station. The files on the model station are assumed to be correct. Deviation from these files and directories are noted in the output of the comp_model routine. Comp_model checks for deviations based on size, checksum, owner, group, number of links and mode. It does not check for differences in the dates of the files but such a check is within the scope of the invention. Comp_model also notes files that are missing from the target station and files that are extra on the target station.

The comp_model subroutine includes two options. The first option being a -r regular list option. The -r option is used to compare files with different names. Each record listed in the file regular list (reg_list) contains a regular expression and a substitute string. Comp_model looks for the regular expression in the complete path name of each file. If the regular expression matches part of the path name, then the substitute string replaces the match part during comparisons with other files names. The other option available is -s containing sizes, checksums and file name for files on the model computer. Fields are separated by tabs or blanks. The inputs to the comp_model routine are the -r regular list, the -s option, the target file and the model file, an output of inventory collect, each containing lists of files and attributes for the target and model workstations, respectively.

Returning now to FIG. 15A, the start of the comp_model program begins at block 402. A check is made to determine if the command contains the -r option at step 404. If it does contain the -r option at step 404, the routine opens a regular expression file at step 406. If there is an error, however, an error message is printed and the program exits to the calling program at step 408. If, however, there is no error at step 406, the program continues to step 410. Step 410 reads the regular expressions and the replacement expressions, and counts the number of regular expressions. If there is an error during this particular portion of the routine, an error message is printed and the program exits at step 412. If however, there is no error at step 410, the program continues to step 414.

Step 414 determines whether or not the command contains the -s option. If it does contain the -s option, a checksum/size file is opened at step 416 containing file sizes, checksums, and file names. This file is sorted first by file size and then by checksum. Again, if there is an error at step 418, an error message is printed and the routine exits. If, however, there is no error, at step 420, the checksum/size file is read. This file, having been sorted by checksum and size, is used to locate files which may be the same file but have different names. A count of the number of sums is made. If an error occurs, at step 422, an error message is printed. Once either step 420 or step 422 has been completed, the program continues to step 424, in which a file 1 is opened to contain the data for a computer 1 or the target computer. If there is an error, however, it will be printed at step 426 and the program exits. If no error occurs, a file 2 is opened with data for computer 2 or model computer at step 428. Again, an error message is printed at step 430 if there is an error, and the subroutine exits. If no error occurs at step 428, record 1 from file 1 and record 2 from file 2 are read by the subroutine at step 432.

Referring now to FIG. 15B, a check is made to determine if the end of file 1 or file 2 has been reached. If it is determined at step 434 that file 1 is not at the end of file and file 2 is not at the end of file, then the program continues to step 436. At step 436, the subroutine compares file names, determines whether or not file name 1 from file 1 is equivalent to file name 2 from record 2 by calling a compare regular expression subroutine (comp_reg).

Figure 16:
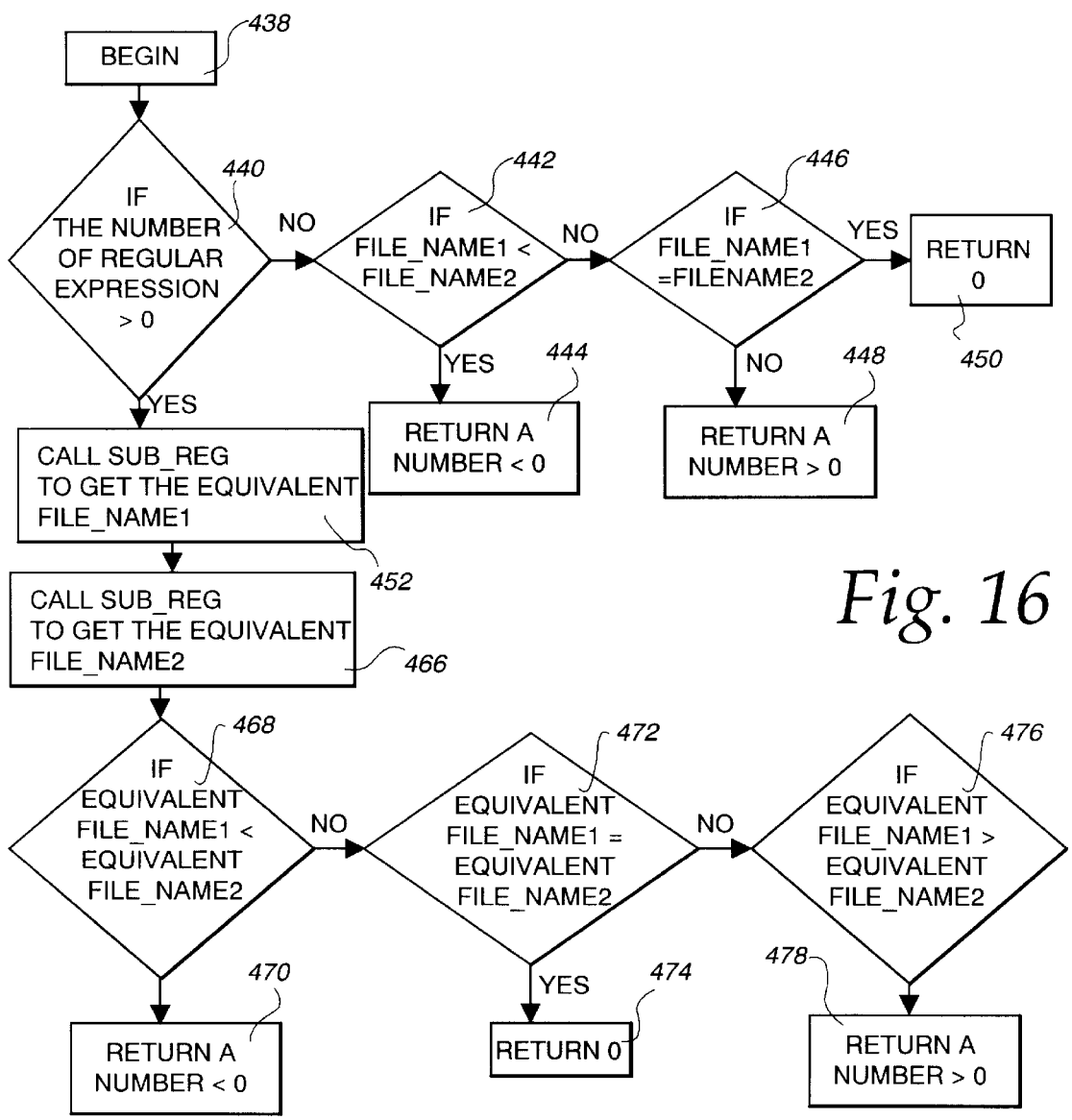
FIG. 16 is a flow diagram of a subroutine for determining whether file names have substitute or equivalent expressions.

The compare regular subroutine is illustrated in FIG. 16. The compare regular subroutine compares two file names. This particular subroutine first produces equivalent file names by calling a subroutine regular (sub_reg) subroutine illustrated in FIG. 17. The subroutine sub_reg matches parts of the file name with expressions. The expressions contain characters that must be matched or other symbols and syntax that represent choices of characters to match. If a matching string is found, it is replaced in the file name with an alternative string of characters. For example, if the matching expression is /usr*/ and the alternative expression is /usr/, then the file name /usr2/abc is changed to /usr/abc.

As seen in FIG. 16, the subroutine compare_reg begins at step 438. At step 440, the subroutine determines whether or not the number of regular expressions is greater than zero. If the number of regular expressions is not greater than zero, then at step 442, a check is determined to see whether or not file name 1 is less than file name 2, that is, does file name 1 precede file name 2 alphabetically. If yes, at step 444, a number less than zero is returned to step 436 of FIG. 15B. If, however, file name 1 is not less than file name 2, then at step 446, a check is made to determine whether or not file name 1 is equal to file name 2. If they are not equal, the program returns to step 436 at FIG. 15B, a number greater than zero, shown by step 448, indicating file name 1, follows file name 2 alphabetically. If file name 1 equals file name 2, step 450 returns a zero to step 436.

If it is determine at step 440 that there are regular expression, then the subroutine sub_reg is called to get the equivalent file name for file_name 1 at step 452.

Figure 17:
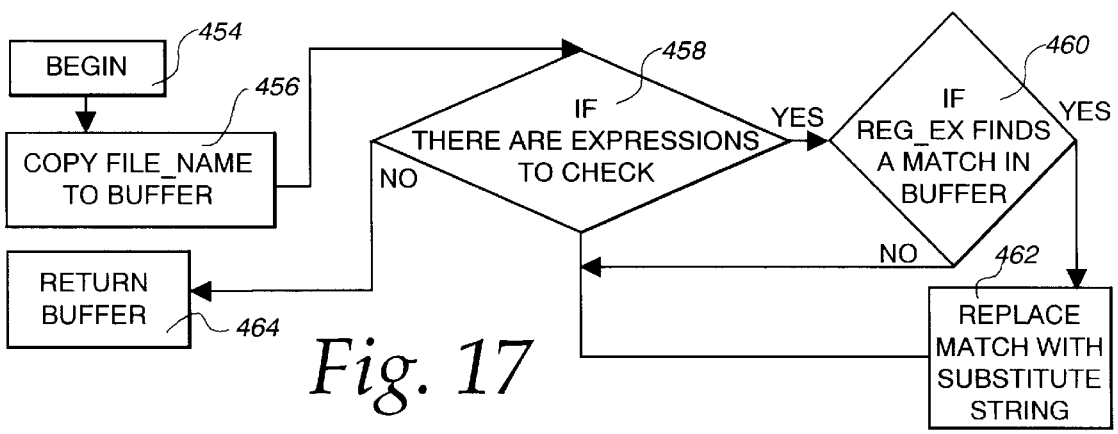
FIG. 17 is a flow diagram of a subroutine for replacing regular file names with substitute or equivalent expressions.

The subroutine substitute regular begins at step 454 of FIG. 17. At step 456, the file name is copied to a file buffer. At step 458, a check is made to determine whether or not there are any expressions to check which were read in at step 410 of FIG. 15A. If there are expressions to check, the routine continues to step 469, in which reg_ex looks for a string in the buffer that matches the expression. If there is a match, the matching characters are replaced with a substitute string at step 462. If there is not a match, the routine continues back to step 458 to see if there are additional expressions to check. If a match is found and is replaced with the substitute string at step 462, the routine continues back to step 458 to look for any additional expressions to check. If there are no expressions to check, the routine at step 464 returns the equivalent file_name 1 to step 452 of FIG. 16.

At step 466, the substitute regular subroutine is called again to get the equivalent file name for file_name 2. The routine in FIG. 17 proceeds as it did before with step 452. Once equivalent file names have been found for the names in file_name 1 and file_name 2, the routine in FIG. 16 continues at step 468 and compares equivalent file names from file_name 1 to equivalent file_names from file_name 2. If equivalent file_name 1 is less than equivalent file_name 2, a number less than zero is returned to step 436 of FIG. 15B, as shown in FIG. 16 at step 470. If equivalent file_name 1 is not less than equivalent file_name 2, a check is made at step 472 to determine if equivalent file_name 1 is equal to equivalent file_name 2. If they are equal, a zero is returned at step 474 to step 436 of FIG. 15B. If they are not equal, as determined at step 476, a number greater than zero is returned to the call in routine at step 478.

Returning now to FIG. 15B, once file name equivalence has been determined at step 436, and the numbers have been returned to this program to indicate whether equivalent file_name 1 is equivalent to file_name 2, equivalent file_name 1 comes before equivalent file_name 2, or equivalent file_name 1 comes after equivalent file_name 2. At step 480, if it is determined that the value returned to the comp_reg at 436 is less than zero, then "+file_name 1" is printed at step 482. This indicates that file_name 2 follows file_name 1 alphabetically and that an extra file exists on the target workstation. If "+file_name 1" is printed at step 482, the routine continues to step 484 to check whether or not there is a checksum file. If there is not a checksum file, at step 486, a new record 1 is read from file 1 and the routine returns to step 434 to check whether or not the end of file has been reached. If, however, there is a checksum file, at step 488, the routine find_match is called to print the names of the files from computer 1 that have the same size and checksum. This check is made to point out which files may have the same content but which have been named differently. Once this has been completed, a new record 1 is read from file 1 at step 486, and again we return to step 434 to check for the end of file.

If it is determined at step 480 that the comp_reg subroutine returns a value not less than zero, then at step 490, a check is made to determine if the comp_reg value is equal to zero. If it is not equal to zero,"−file name 2" is printed at step 492 and a new record 2 is read from file 2. "−file name 2" indicates a file is missing from the target computer. Once record 2 has been read from file 2, the routine returns to step 434 to determine whether or not the end of the file has been reached. If, however, at step 490 the comp_reg value is equal to zero, at step 494, a check is made to determine if the attributes of the files having equivalent file names are different. If it is found that the file attributes do match, a new record 1 is read from file 1 and a new record 2 is read from file 2 at step 496. Once file 1 and file 2 have been read, the routine returns to step 434 to see if an end of file has been reached. If, however, it is determined at step 494 that the file attributes don't match, then at step 498, a check is made to determine if file_name 1 equals file_name 2. If file_name 1 does equal file_name 2, at step 500, "? file name 1" is printed and then at step 502, the attributes of file_name 1 and the attributes of file_name 2 are printed. At step 496, a new record 1 is read from file 1 and a new record 2 is read from file 2. If, however, it is determined that file name 1 does not equal file name 2 at step 498, then at step 504 "? file name 1 file name 2" is printed, indicating the equivalent file names were equal. Once printed, the routine goes to step 502 where the attributes of file_name 1 and file_name 2 are printed, and on to step 496 where a new record 1 is read from file 1 and a new record 2 is read from file 2. Once this has been completed, the routine continues to step 434 to determine if there is an end of file.

If it is found that file 1 does not equal the end of file or record 2 does equal the end of file, the routine continues to step 506, which determines whether or not file 1 does not equal the end of file. At step 508, the subroutine prints "+file_name 1" to indicate extra files on the target workstation, and reads record 1 from file 1. Once the positive sign has been printed in front of the file name and a new record 1 has been read from file 1 at step 508, the routine returns to step 506 to determine whether or not record 1 does not equal the end of file. If record 1 does equal the end of file at step 506, then we continue to step 510, which checks to see whether or not record 2 does not equal the end of file. If it is not the end of file at step 512, a negative sign is printed in front of file_name 2 to indicate files missing from the target and record 2 is read from file 2. Once printed, the routine returns to step 510 and continues to print a negative sign in front of the file names satisfying step 510. Once the end of the file is found, the program exits at step 514.

The present invention also includes a means for comparing a plurality of workstations at a time. A program entitled "compare station" takes the data from inventory collect on a number of computers and prepares it for a program called "compare station program." The compare station program looks for discrepancies between files existing on more than one computer. Compare station program compares the attributes of files on a number of computers and produces a report on files whose names are equal or equivalent. The report consists of two files, an index file and a data file. The index file contains a list of the files that have differences in their attributes. The data file contains a record for each computer with a file or equivalent file listed. The record contains all of the file attributes, the file name and the station name. The type of discrepancies compare station checks for depends on certain options which are used. The default is that compare station checks for all discrepancies, except for modify date. The following command illustrates how compare station is executed in the present invention:

usage: comp_sta [cmtogld] -r r_list sta_list index_file

The -c option checks for content differences by comparing the size and the checksum. The -d option checks for differences in the modify date. The check is to the second. The -g option checks for differences in the group. The –1 option checks for differences in the number of links. The -m option checks for differences in the mode. The -o option checks for differences in the owner and the -t option checks for differences in the type. Of course, other options can also be included, as would be understood by those skilled in the art.

The argument -r reg_list is used to compare files with different names. Each record in the file reg_list contains a regular expression and a substitute string. Compare station looks for the regular expression in the complete path name of each file. If the regular expression matches part of the path name, then the substitute string replaces the match part during comparisons with other file names. The regular expressions used must follow the syntax of UNIX's regcmp utility. The argument sta_list is a file containing one record for every station that is to be compared. Each record has two fields. The first field is the name of the station, the second field is the name of the file that contains the input data for the station. The fields should be separated by tabs or blanks. The argument index_file is an output file that will contain a list of all the files that have a discrepancy. It is useful as an index into the output from comp_sta.

Figure 18:
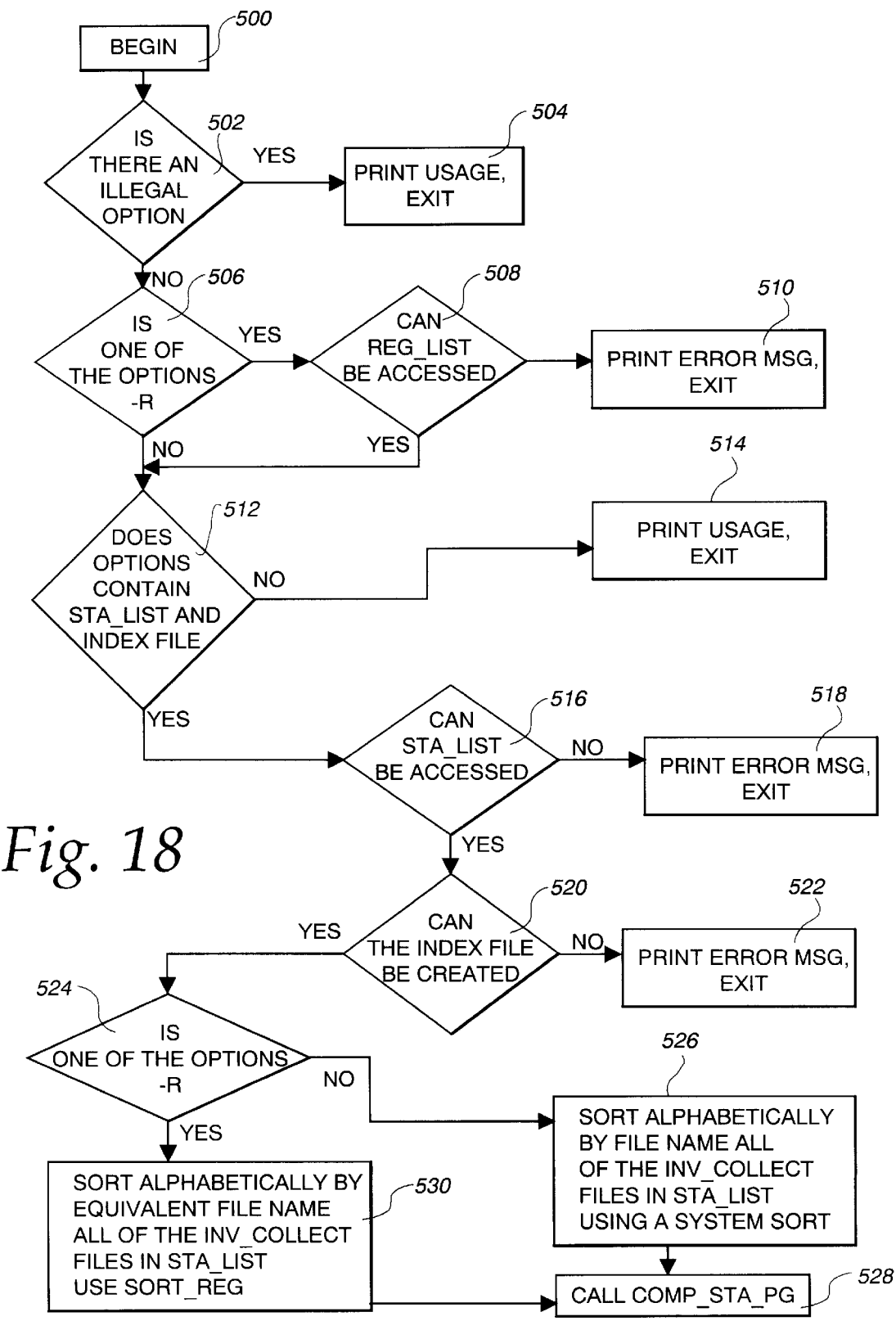
FIG. 18 is a flow diagram of a compare station program for comparing the files located on a number of computer workstations.

The program compare station is illustrated in FIG. 18 and begins at step 500. The program compare station initially checks to determine whether or not there is an illegal option at step 502. If there is, the usage is printed and the program exits at step 504. If there is no illegal option, at step 506, a check is made to determine if one of the options is -r. If one of the options is -r, at step 508, a check is made to determine whether or not the files listed in reg_list can be accessed. If they cannot be accessed, at step 510, an error message is printed and the program exits. If, however, they can be accessed, at step 512, a check is made to determine whether or not the options include a sta_list file and in an index file. If they do not, the usage is printed at step 514 and the program exits. If, however, the options doindexain a sta_list file and an index file, at step 516, a check is made to determine whether or not a sta_list file can be accessed. If it cannot, at step 518, an error message is printed and the program exits. If, however, it can be accessed, at step 520, a check is made to determine if the index file can be created. If not, an error message is printed at step 522 and the program exits. If the index file can be created, at step 524, a check again is made to determine if one of the options is -r. If it is not -r, then at step 526, all of the files found in sta_list which have been collected by the inventory collect program are sorted alphabetically by file name, using a system sort.

Figure 19A:
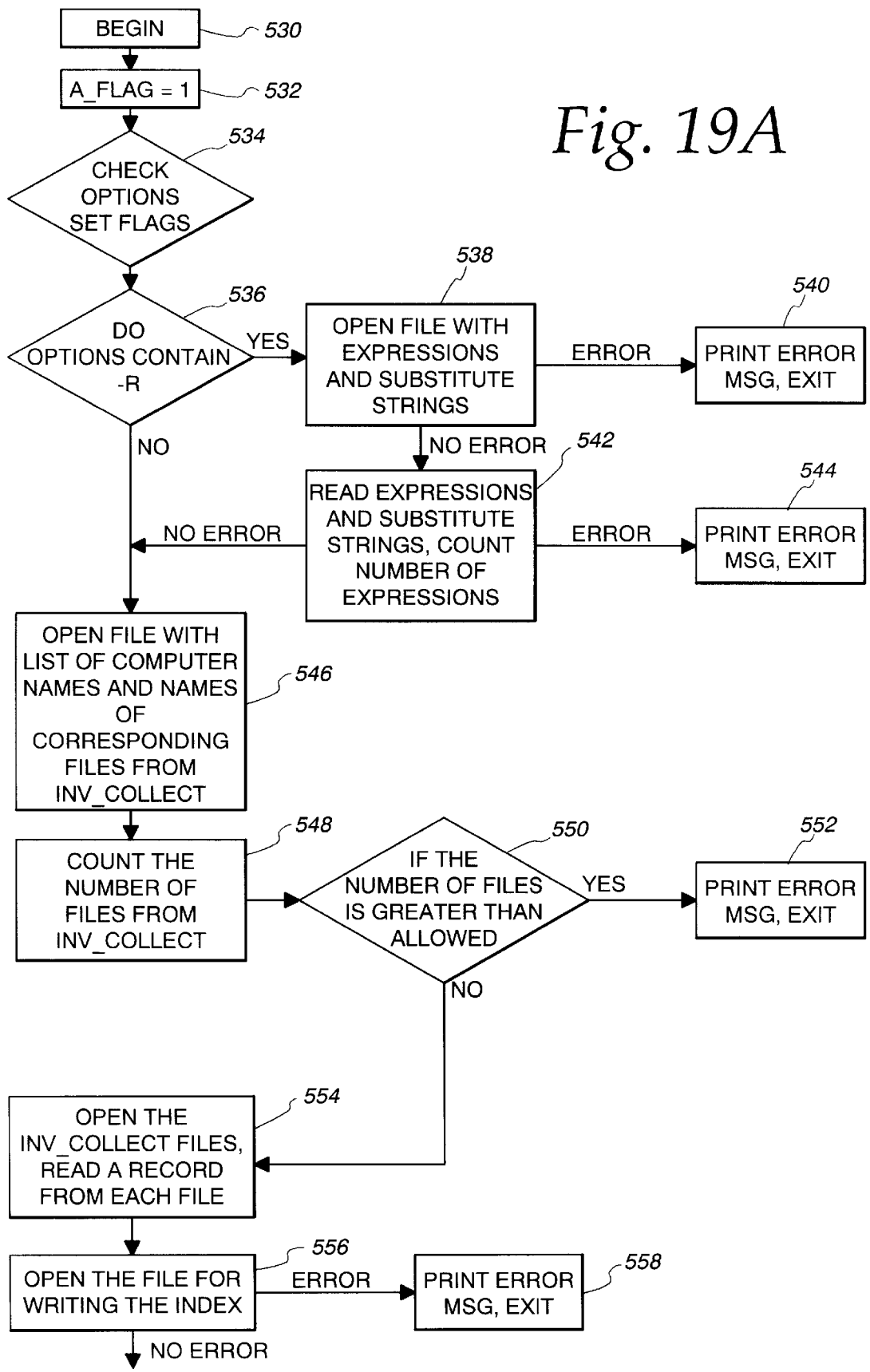
FIGS. 19A, 19B and 19C, 19 are a flow diagram of subroutine of the compare station program of FIG. 18 for determining similarities and differences between the files located on a number of computer workstations.
Figure 19B:
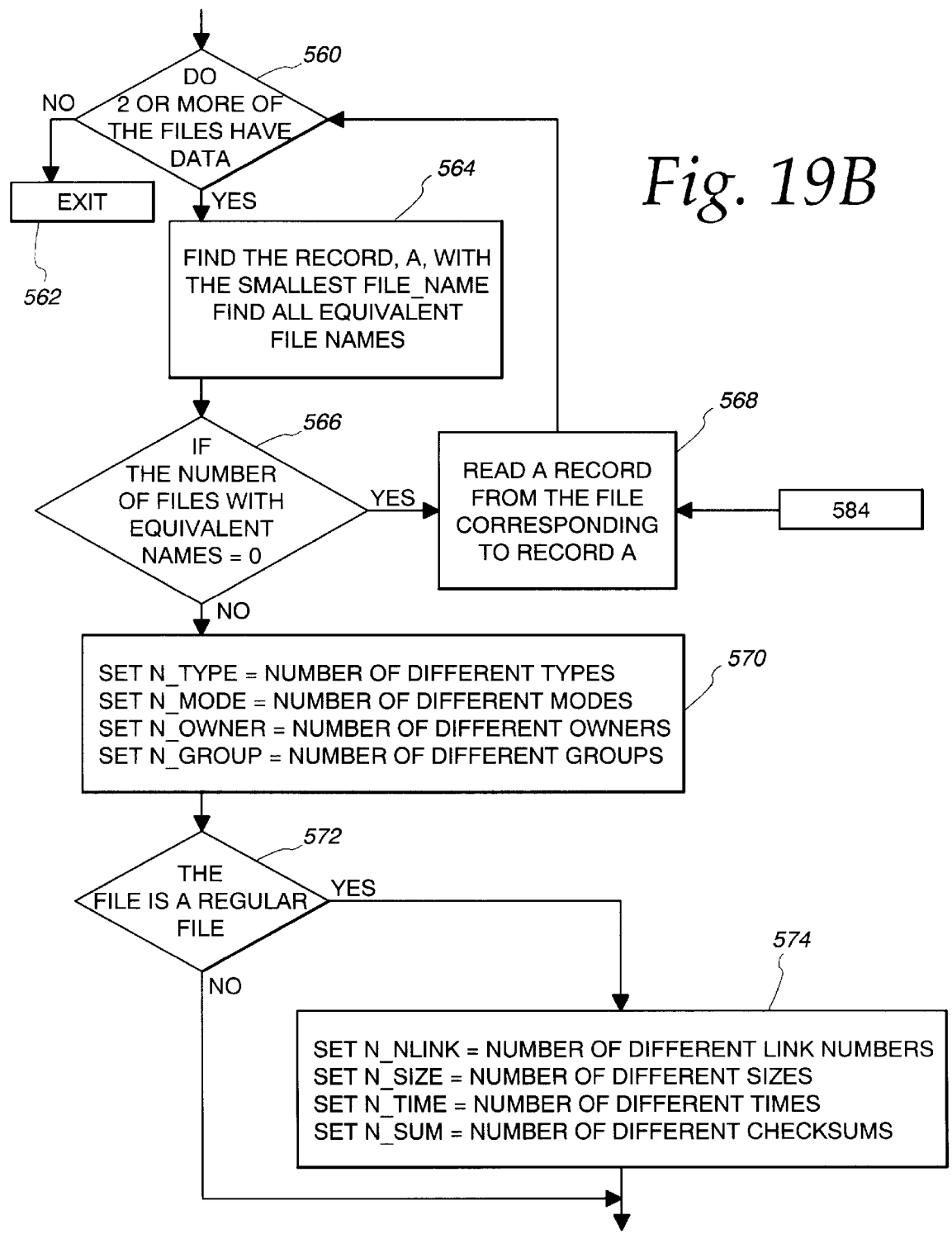
Figures 19, 19A, 19B, 19C:
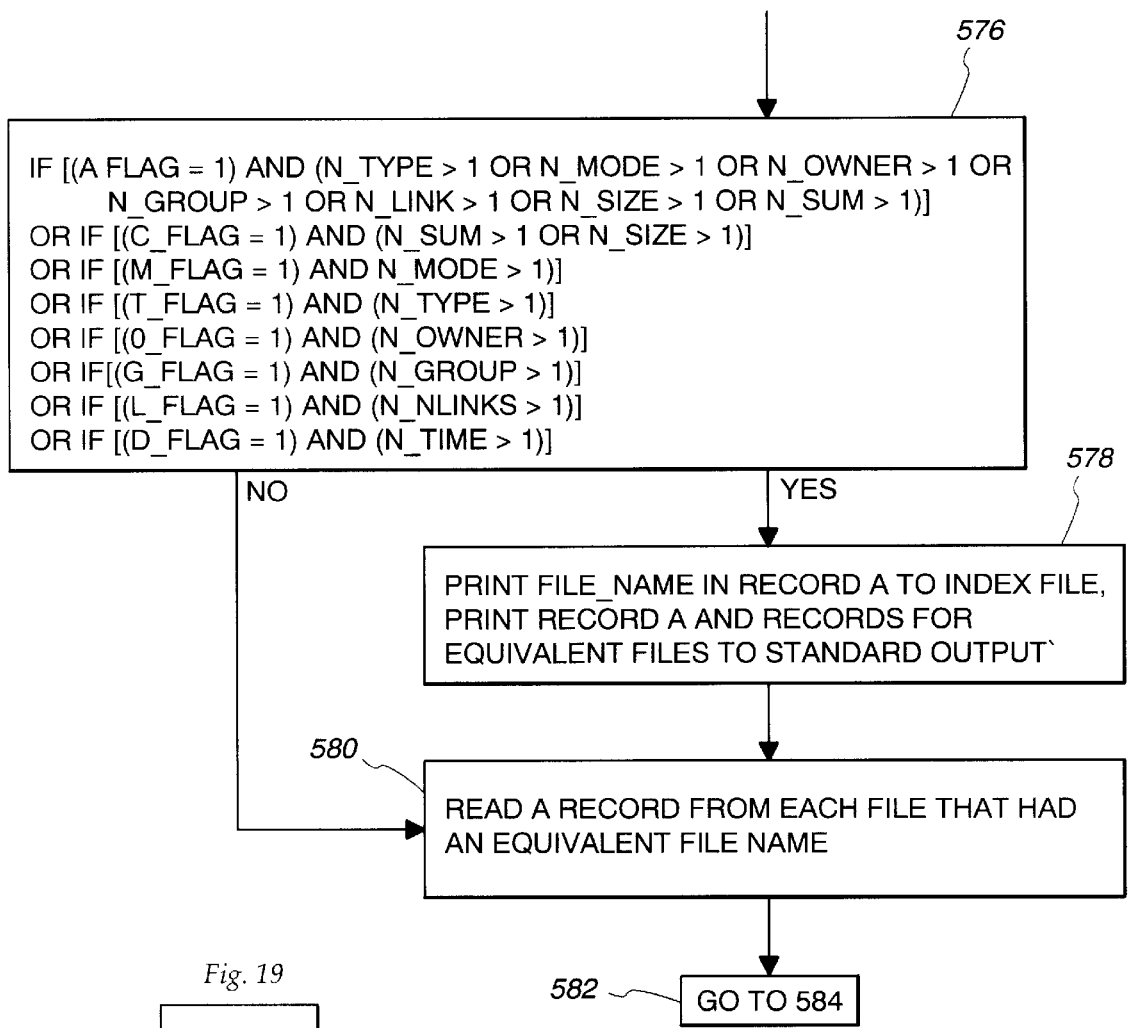

Once the sort has been completed and the files are in alphabetical order, at step 528, the program compare station program (com_sta_pg) is called and is discussed with reference to FIG. 19. If, however, at step 524, it is determined that one of the options is -r, then all the files appearing in sta_list which have been collected by the inventory collect program are sorted alphabetically by equivalent file name, at step 530, using the previously described program sort regular (sort_reg). Once these files have been sorted, the program proceeds to step 528, where the subroutine compare station program is called.

The subroutine compare station program compares the inventory collect program output from many computers. The program compares the attributes of files that have the same or equivalent names on more than one computer. If there is a difference in any attributes, then the complete record for every computer with that file, is printed. Options to compare station allow checking for specific attributes. The compare station program is illustrated in FIGS. 19A, 19B and 19C. The program begins at step 530, and at step 532 an a_flag is set to 1. Setting the a_flag to 1 means that all options will be set except the -d option. This is the default mode. At step 534, each of the options previously described are checked to see if they have been set and appropriate flags are set. The options c, m, t, o, g, l and d are checked. If any of these options is set, the a_flag is set to zero. For instance, if the c option is specified, then a c_flag is set to 1 and the a_flag is reset to zero, indicating that there is no default mode. Likewise, if the -m option is set, an m_flag is set to 1 and the a_flag is set to zero. Once these options have been checked and the appropriate flags set at step 534, at step 536 the -r option is checked.

If the -r option has been set, at step 538 a file is opened for reading in expressions and substitute strings. In addition, if any error is detected, an error message is printed at step 540 and the program exits. However, if there is no error at step 538, the expressions, as well as the substitute strings, are read into appropriate arrays set up by the program, and the number of expressions are counted at step 542. Again, if an error is detected, an error message is printed at step 544 and the program exits.

Once the expressions and substitute strings have been read and the number of expressions has been counted, and no errors have occurred, at step 546 a file is opened containing a list of computer names and names of corresponding files which have been collected by the inventory collect program. At step 548, the number of files are counted which have been received from the inventory collect program. Once the files have been counted, the number of files is checked to make certain that the number of files does not exceed the number that is allowed, which, in the current case, is 121 files. Of course, this number can be changed, depending upon the number of workstations to be examined, and the amount of memory space available and the comparison techniques used. If the number of files is greater than that allowed, an error message is printed at step 552 and the program exits. If, however, the number of files is not greater than that allowed, then the inventory collect files are opened and a record is read from each file, at step 554.

At step 556, an index file is opened for writing the index. If an error occurs at this step, an error message is printed at step 558, and the program exits. If, however, there is no error in opening the file for writing the index at step 556, at step 560, found on FIG. 19B, a check is made to determine if two or more of the files have data. This check is made to determine if there are any files left on the various computer workstations, so that comparisons between computer workstations can continue. If there are not two or more files having data, the program exits at step 562. If, however, two or more of the files do have data, at step 564, all of the files relating to the various computer workstations, which have previously been put in alphabetical order, are searched to determine record A, the record with the smallest equivalent file name; in addition, any records with equal or equivalent file names are determined.

At step 556, a check is made to determine if the number of files with equivalent file names is equal to zero. If the number of files with equivalent names is equal to zero, then at step 568 a record is read from the file that record A came from. At this point, the program returns to step 560, to determine if two or more of the files have data, thereby indicating that the comparison should proceed. If, however, at step 556, the number of files with equivalent names does not equal zero, then at step 570, a number of variables are set according to comparisons made between the attributes of each of the files with equivalent file names.

As shown in step 570, four types of variables are calculated based on a comparison of file attributes. These are n_type, n_mode, n_owner, and n_group. At this point, a comparison is made between each of the records having the same file names or equivalent file names, to determine if any of these files have different types, different modes, different owners or different groups. If any are different, then the number of differences is counted and the value is set to the appropriate variable. For instance, if two of the records have the same file name, but one record is for one owner and the other record is for a different owner, a comparison between the owners indicates that there are two different owners. In this case, the variable n_owner will be set to 2. Once the comparisons have been made and the variables have been set at step 570, at step 572 a check is made to determine if the file is a regular file.

If the file is a regular file, then at step 574, four additional variables are calculated based on a comparison of file attributes. These are n_link (the number of links), n_size (the number of different sizes), n_time (the number of different modify times), and the n_sum (the number of different checksums). As in step 570, the attributes of each of the records having the same file name or equivalent file names, are compared with one another. If these attributes are found to be different, the number of differences is counted and is set to the appropriate variable. For instance, if two records exist and have different modify times, this will be counted as 2 and the variable set n_time will be set equal to the number 2. Once the variables in step 574 have been set, or if at step 572, it is determined that the file is not a regular file, step 576, shown in FIG. 19C, is completed.

AS shown here, in step 576, each of the flags, the a_flag, the c_flag, the m_flag, the t_flag, the o_flag, the g-flag, the l_flag and the d_flag, are checked to determine if they have been previously set to a value equal to one. Once it has been determined which flag has been set, then at that point the appropriate checks are made to determine which attributes are different between the files. For instance, if the a_flag has been set to 1, this indicates that all of the attributes are to be compared. As shown, if the a_flag has been set to 1, and if the attributes of type, mode, owner, group, link, size or sum, have been found to be greater than 1, then at step 578, the file name in record A will be printed to the index file, record A will be printed, and records for equivalent files will also be printed, to the standard output. Likewise, if the a_flag was not set, but any of the other remaining flags were set, a check for that particular attribute is made, and if the numbers for those attributes showing differences are greater than 1, then they likewise will be printed, as dictated at step 578. If, however, no differences are found in step 576, at step 580, a record is read from each file that has an equivalent file name. Once the record has been read from each file that has an equivalent file name, then the program, at step 582, will return to step 584, found in FIG. 19B.

Step 584 returns the program to step 568, where a new record from the file corresponding to record A is read, then each of these records are compared as before to determine file equivalence.

The present invention also includes a means for automatically updating any files on the target workstation which have been found to have discrepancies. A make program program (make_prog) uses output from compare model program, to create a new program for the workgroup organized network manager. This new program changes the files on the target computer to match the files on the model computer. The make program program is not, however, limited to use with the workgroup organized network manager, but can be used in other applications. In particular, when used with the workgroup organized network manager, this new program changes the target computer to match the model computer when the model computer is the host of a workgroup and the target computer is one of the clients in the same workgroup. The following command is used in the present invention to cause the make program program to generate a program for the workgroup organized network manager to match the files of the target computer to the files found on the model computer. The usage is as follows:

```
make_prog -s label     comp_model mp_file chmod prog
```

Label is a label identifying one of the clients in a workgroup that refers to the client, which is the target computer. Comp_model is the output from the compare model program. Mp_file is the program generated by the make program for the workgroup organized network manager, which will change the files on the target computer to match those files found on the model computer. Chmod_rog is a UNIX program that will be run by the execute command used by the workgroup organized network manager on the target computer.

Figure 20:
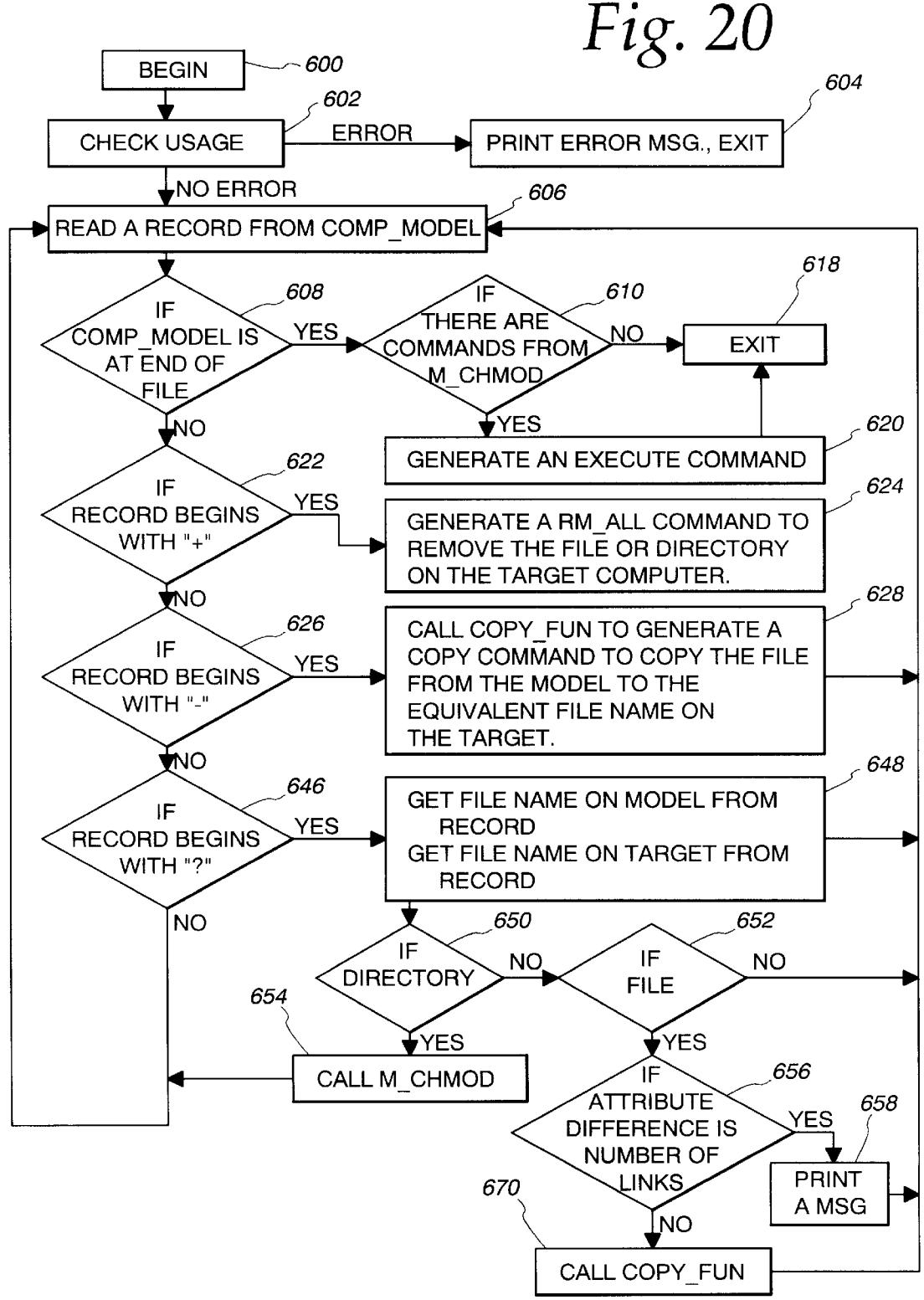
FIG. 20 is a flow diagram of a make program program.

The program make program begins at step 600 of FIG. 20. At step 602, the usage of the command used to run the program make program is checked. If there is an error, at step 604, an error message is printed and the program exits. If, however, there is no error, at step 606, a record is read from the output of the compare model program. Initially, the make program determines whether or not the compare model program output is at the end of file at step 608. If the output is at the end of file, then at step 610 a check is made to determine if there are commands from a subroutine called the change mode subroutine (m_chmod). The change mode program generates a UNIX program that changes the owner, the group, and the mode of a file or directory. This program is executed by the execute command, as previously described. The change mode program gets the name of the file or directory, the owner, the group, and the mode from the calling program.

As seen in FIG. 21, the change mode subroutine begins at step 612. At step 614, a UNIX change group (chgrp)

command is created. Additionally, a UNIX change mode (chmod) command is created, and a UNIX change owner (chown) command is created. Once these commands have been created by the change mode subroutine at step 616, the subroutine returns to the calling program. If it is determined at step 610 that there are no commands from the change mode subroutine, then the program exits at step 618. If, however, there are commands from the change mode program, at step 620, an execute command is created, and then at step 618, the program exits. If it is determined at step 608 that the compare model program output is not at the end of the file, then it begins to check each individual record found in the output of the compare model program, to determine whether it is an extra file, a missing file, or a file with equivalent names on the model and target, but differences in attributes on the model and target.

As previously described, the output listing of the compare model program indicates that files are extra by placing a plus sign in front of the file name. Therefore, at step 622, the record is checked to determine whether or not a plus sign exists, indicating that this is an extra file. If it is an extra file, then at step 624, a remove all command is generated to remove the file or directory on the target computer. Once the remove all command is generated, the program returns to step 606, to read a record from the output of the compare model program, and the sequence of checking records begins again. If, however, at step 622, it is determined that the record does not begin with a plus sign, then at step 626, a check is made to determine if the record is a record which does not appear on the target workstation. This is done by checking to see whether or not the record begins with a negative sign. If the record does begin with a negative sign, at step 626, the make program routine calls a copy function (copy_fun) subroutine, to generate a copy command which will copy the file from the model computer to the equivalent file name on the target computer.

The copy function subroutine is illustrated in FIG. 22, where the subroutine begins at step 630. At step 632, the attributes of the file or directory contained on the model workstation are retrieved. If there is an error at this time, at step 634, an error message is printed and the subroutine returns to the calling program. If, however, no error occurs, a check is made to determine whether or not the retrieved attributes are for a file, or for a directory. If it is a directory, at step 638, a workgroup organized network manager directory (dir) command is created for the target station, with the attributes of the model workstation, which includes the owner, group and mode. Once the directory command has been completed, the program returns to the calling program. If it is determined, at step 636, that it is not a directory, then at step 640 a check is made to determine if it is a regular file. If it is a regular file, then the workgroup organized network manager generates a copy command to copy this particular file from the model workstation to the equivalent file on the target workstation. Attributes on the target workstation will now be the same as on the model workstation. Once the copy command has been generated, the subroutine returns to the calling program. As seen at step 642, if it is determined that it is neither a directory or a regular file, an error message is printed at step 644, and the subroutine returns to the calling program. Once returning to the calling program, at step 628, step 606 is repeated to read a new record from the output of the compare model program, to examine the next record in the list.

If it has been determined, at step 626, that the record does not begin with a negative sign, then at step 646, a check is made to determine if the record begins with a question mark. If the record dos begin with a question mark, at step 648, the file name for the model workstation and the file name for the target workstation are retrieved. At step 650, a check is made to determine if the file name is a directory. If it is not a directory, it is checked at step 652, to determine if it is a file name. If it is not a file name, the program returns to step 606, to read a new record. If it is determined, at step 650, that it is a directory, then the change mode subroutine illustrated in FIG. 21 is called, the functions are performed there as previously described, and once the change mode program returns to the calling program, the program returns to step 606, to read a new record. If it is not a directory but it is determined that it is a file, then at step 656 a check is made to determine if the attribute difference is in the number of links. If the attribute difference is in the number of links, then at step 658 a message is printed, indicating the difference. Once the message is printed at step 658, the program returns to step 606, to read a new record. If, however, it is determined that the attribute difference is not in the number of links at step 656, then at step 670 the copy function subroutine illustrated in FIG. 22, is called and operates as previously described. Once the copy function subroutine has either printed an error message, generated a directory command, or generated a copy command, the copy function subroutine returns to the calling program, at step 606, to read a new record. The process of reading records and checking records to determine their existence on the target workstation, as compared with the model workstation, continues until it is determined that no more records exist, at step 608, at which point the program exits, at step 618.

Windows 95 Version of the Invention

FIGS. 23–31 illustrate the changes that are made from earlier embodiments of the invention to render it suitable to the DOS and Windows PC environment. Also, a number of enhancements have been made to the system. In particular, the system now maintains a record of the status of command execution in an instruction file, such that reexecution of commands is possible: and it also now permits the user to specify "reset" or "notify" as options in the case of the commands copy, replace, set INI, set registry, and keep versions. These enhancements enable the system to monitor the status of each workstation and, in the case of a change in status, either to "reset" the status to its original configuration (by creating subdirectories and copying files, for example) or to "notify" the supervisor that a particular workstation has been changed in some way. A "backup" specification provides for the automatic maintenance of backup copies of file entities that have been modified.

Figure 25A:
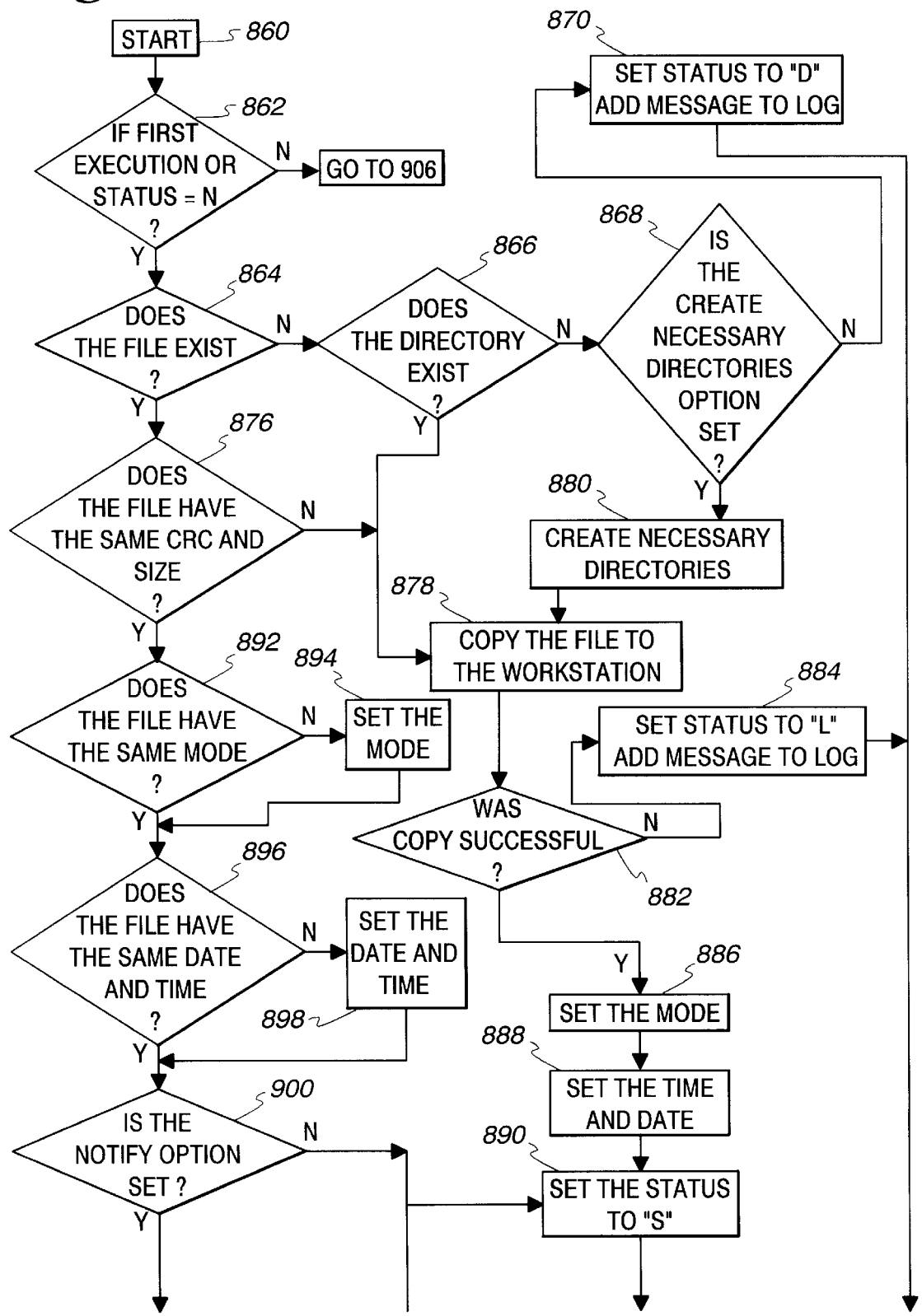
FIG. 25 is a program flow diagram for the copy command.
Figure 25B:
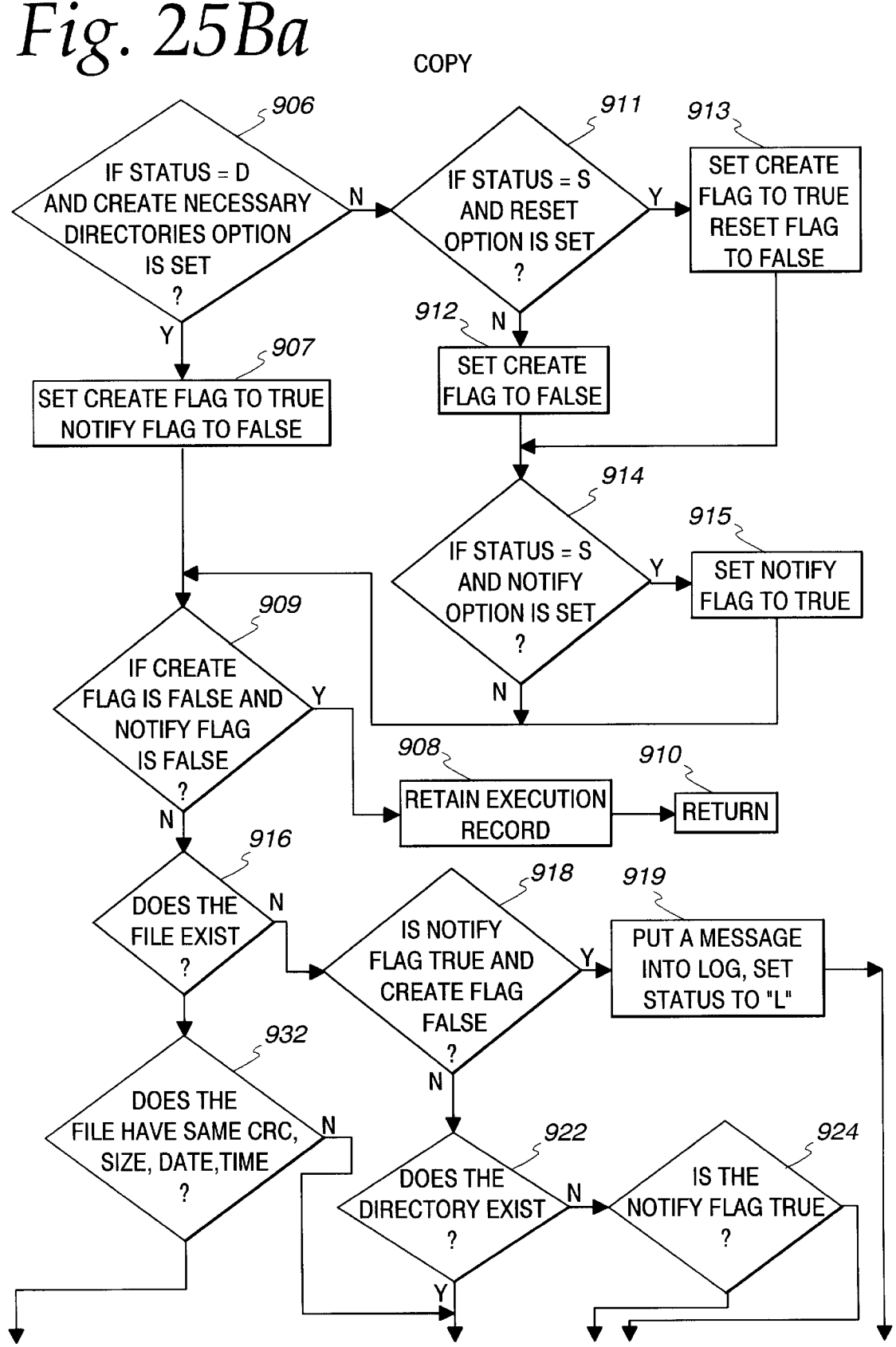
Figure 25B:
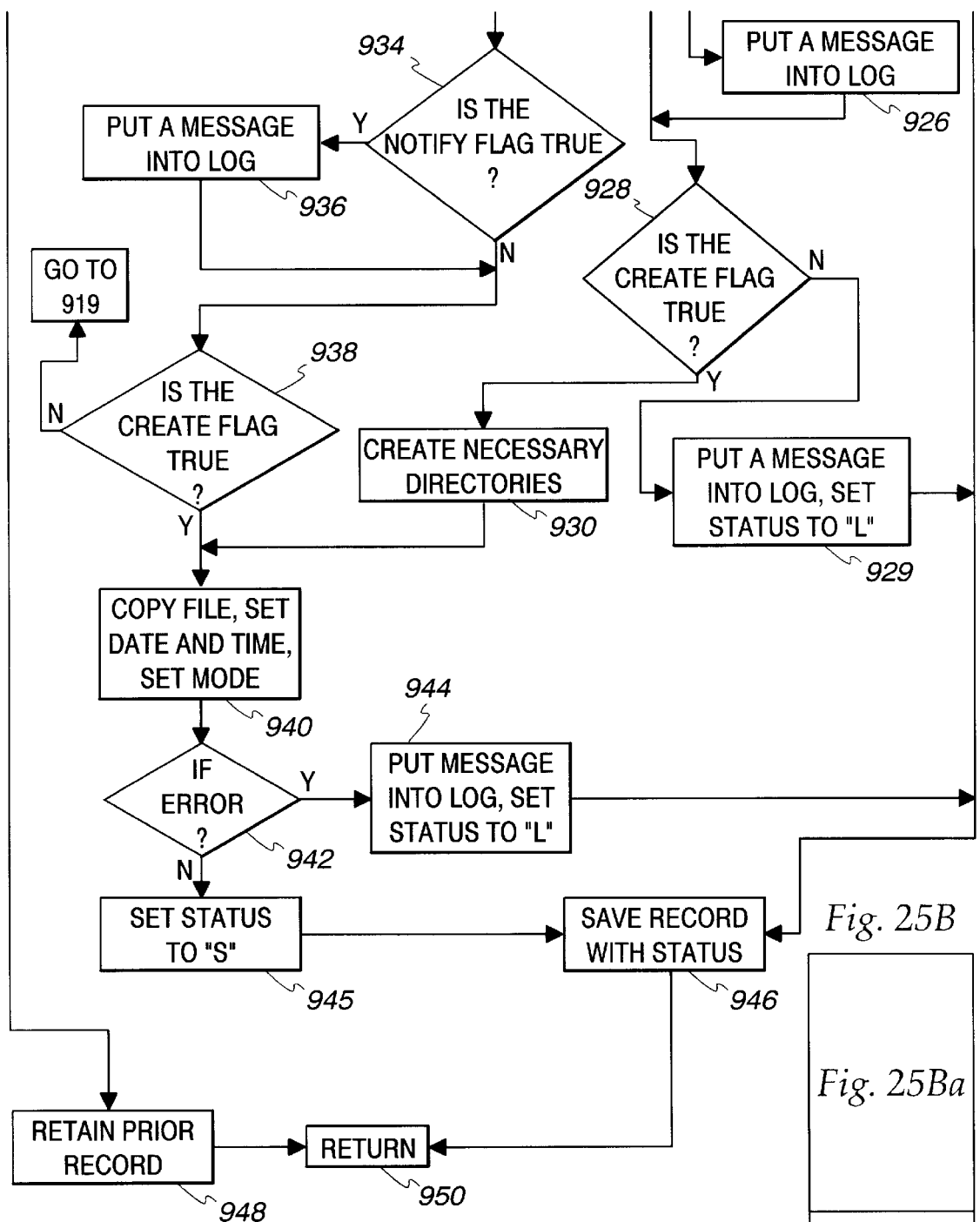
Figure 26:
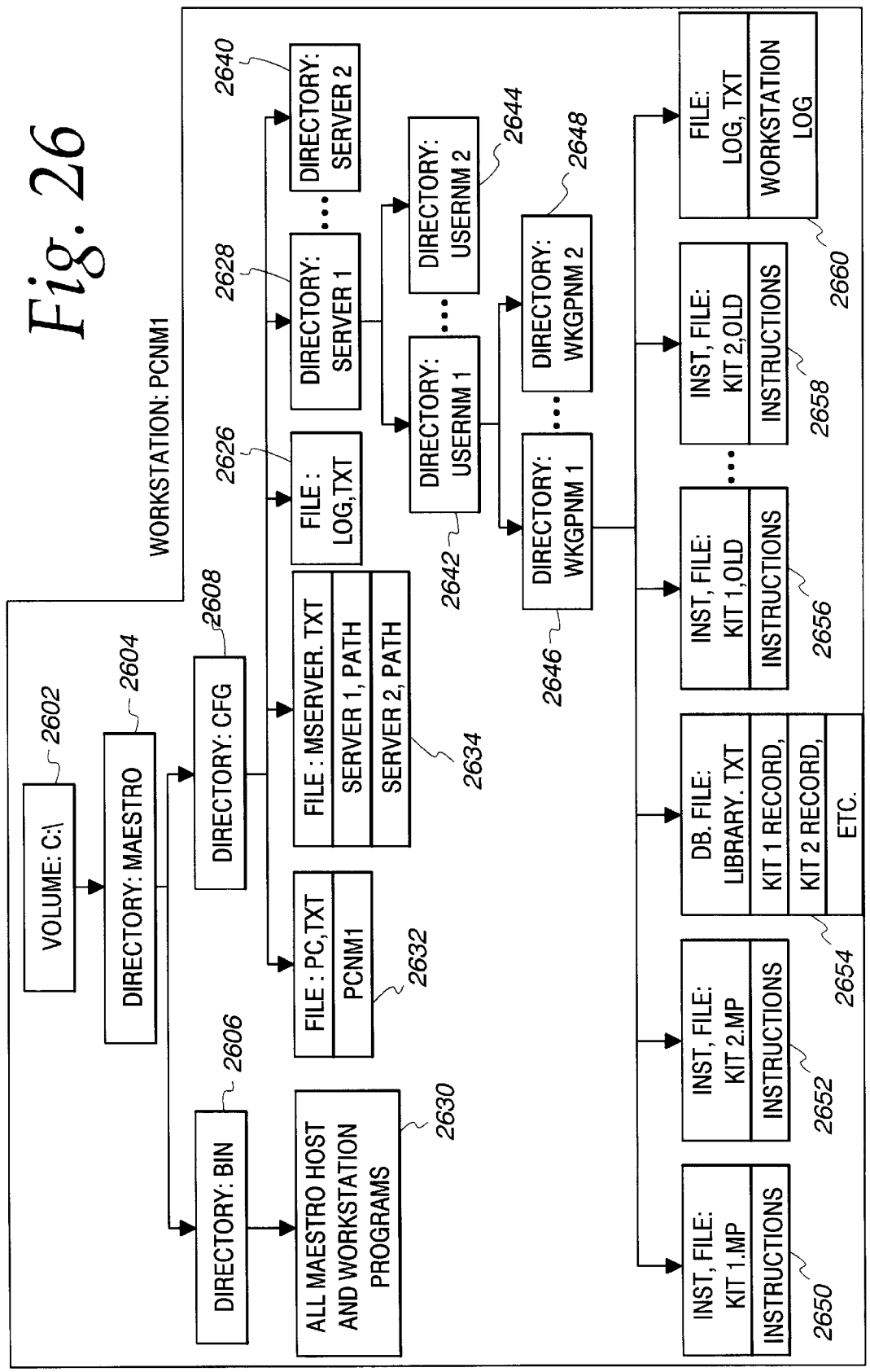
FIG. 26 is a block diagram of a typical data structure on a workstation.
Figure 29:
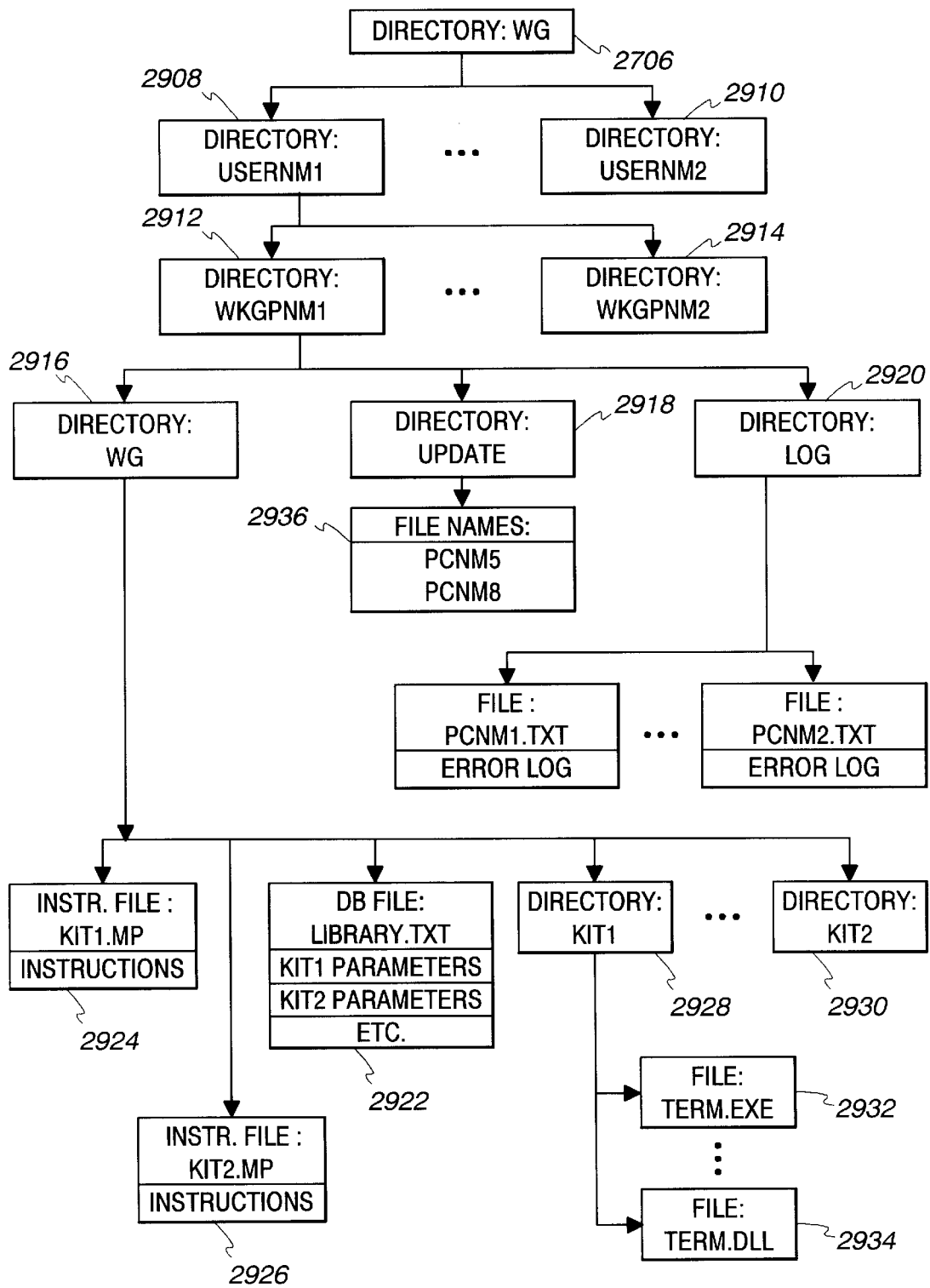
Figure 30:
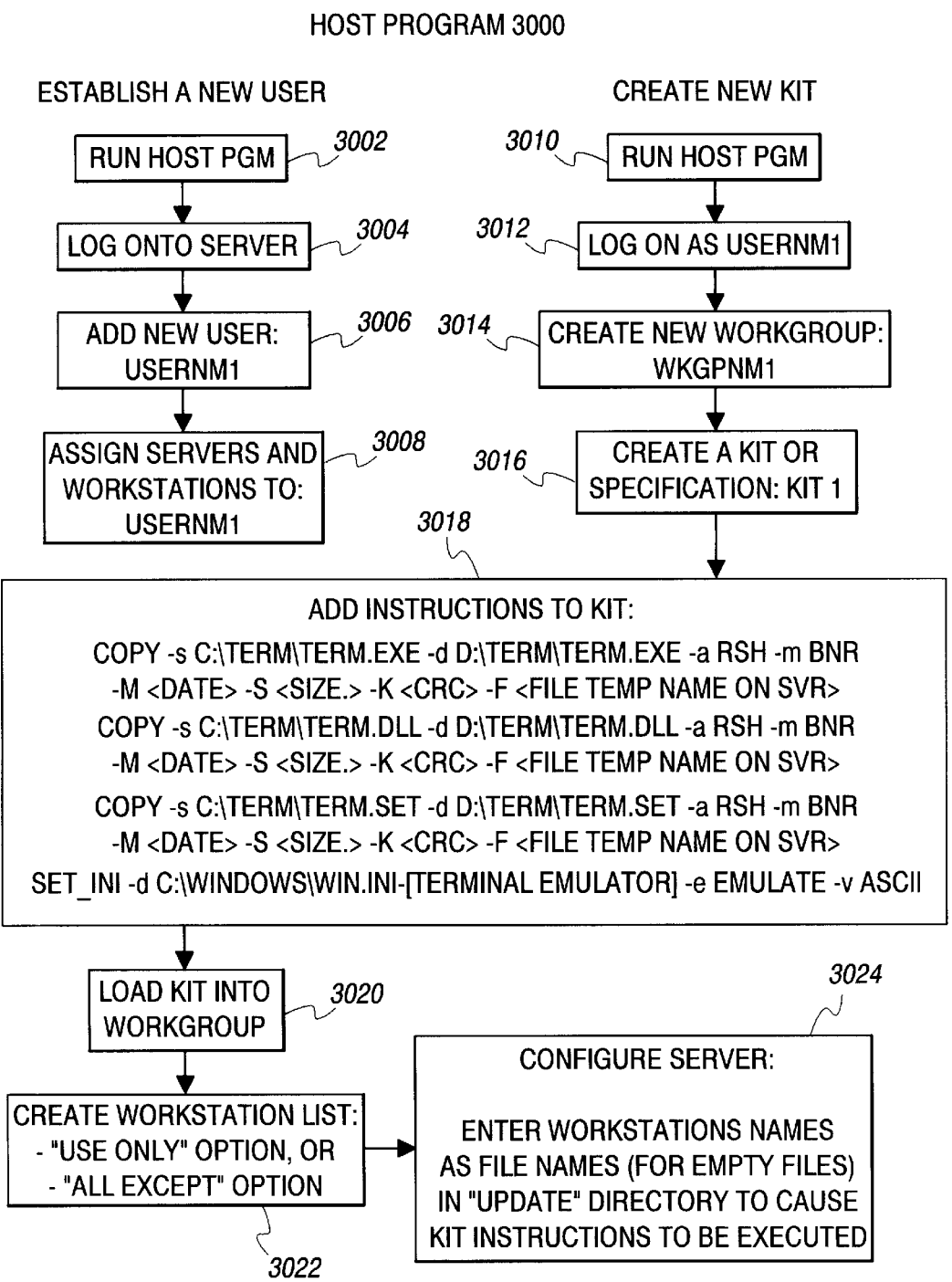
FIG. 30 is an overview block diagram of the steps carried out by the host program to establish a typical kit of instructions within a typical workgroup.

In brief overview, FIG. 26 presents the data structure which the program creates on each individual workstation. FIGS. 27–29 illustrate the data structure that is created on a typical server to provide back-up support for workstation maintenance. FIG. 30 presents an overview of the host program which is used to set up workgroup configurations, and FIG. 31 presents an overview of the workstation program which runs periodically to establish and later maintain the configuration of each workstation. A more detailed flow diagram of the workstation program is presented in FIG. 23. To illustrate new features of the invention, FIGS. 24 and 25, respectively, present in complete detail the program that executes the "SET_INI" instruction and the "COPY" instruction, illustrative of the types of improvements that are implemented in this new embodiment of the invention.

To illustrate the way in which this embodiment of the invention functions, let it be assumed that the program is to be used to establish and maintain a terminal communications program on several PC workstations. This terminal communications program includes three files: TERM.EXE, TERM.DLL, and TERM.SET. In addition, since this program is to run under Windows, it is necessary to add certain lines of instructions to the Windows set up file WIN.INI. These lines should read as follows:

[TERMINAL EMULATOR]
EMULATE=ASCII

The files are to be stored together in a subdirectory "TERM" which must be created on each workstation.

As an initial step, both the host program and the workstation program must be installed on the workstations. The workstation program 3100 (FIG. 31) must be installed on every workstation that is to receive programs, updates and maintenance. The host program 3000 (FIG. 30) need only be installed upon those workstations where users are located who are in charge of setting up and maintaining workgroups.

Following installation of the programs 3000 and 3100, a typical workstation configuration is as shown in FIG. 26. The hard drive C:\\2602 contains a directory MAESTRO 2604 under which are established subdirectories BIN 2606 and CFG 2608. The directory BIN 2606 contains all the MAESTRO host and workstation programs 2630 including the workstation program 3100 and optionally the host program 3000.

The directory CFG 2608 contains several files and several directories. First, it contains a file PC.TXT 2632 which contains the name "PCNM1" of this particular workstation. Every individual workstation must contain such a file containing that particular workstation's name. A second file MSERVER.TXT 2634 contains the names and the network path addresses of all the servers containing information relevant to this workstation. A file LOG.TXT 2636 contains a log of maintenance activities that have taken place at this workstation but that have malfunctioned. Then, for each of the servers whose names are listed in the file 2634, a separate subdirectory 2638 . . . 2640 is set up to contain information about system configurations.

A typical server is a server named "SERVER1" whose data structures are illustrated in FIGS. 27–29. Assuming that this server is associated with the workstation PCNM1 shown in FIG. 26, the file 2634 will contain the name SERVER1 together with the path and network name of that server. Because the network name, under Novell, may be long and not compatible with directory and file names, the name SERVER1 is, in many cases, a pseudonym for the actual long name of the server which appears in the path portion of the text within the file 2634. It is the pseudonym that is used as a subdirectory name at 2638 . . . 2640.

Consider the directory for the server SERVER 2638. Under that directory, separate subdirectories are established for each user 2642 . . . 2644. Under a typical user USERNM1 2642, a directory is established for each workgroup at 2646 . . . 2648. Under the typical workgroup 2646, whose name is WKGPNM1, a series of files are maintained. A database file called LIBRARY.TXT 2654 contains a record identifying every kit of instructions that has been created and associated with that workgroup. The record portion of this library file contains information such as whether subdirectories are automatically to be created and other properties that are global to all the instructions in a kit. The actual instructions in each kit are contained in files having the extension MP. For example, instruction file KIT1.MP 2650 contains one set of instructions, while the instruction file KIT2.MP 2652 contains a different set of instructions. Once these files have been executed, copies of the files with the file name extension OLD are created at 2656 and 2658 in which the status of execution of each instruction is maintained, as will be explained below. Finally, a temporary log file LOG.TXT 2660 is created which contains a copy of the log file that is uploaded into the server. This file contains records of errors, which record is submitted to the server. More serious errors, which may reflect the fact that the network is down, are recorded only in the log file LOG.TXT 2636 in the subdirectory CFG.

The configuration of data on a typical server SERVER1 is illustrated in FIGS. 27–29. In FIG. 27, a volume (or disk drive) on the server named VOLUME1 2702 has established on it a pair of directories: MAESTRO 2704 and WG 2706.

With reference to FIG. 28, the directory MAESTRO 2704 is shown to contain a directory CONFIG 2806. In this configuration directory, there exists a file PCS.TXT 2808 which contains the names PCNM1, PCNM2, etc., of all of the workstations which this server helps to maintain. A second file SERVERS.TXT 2810 contains DOS files names (which may be pseudonyms) for servers, together with the actual network path where those servers are located, of all servers that contain files and other materials relevant to the maintenance of workstations. Another file 2812 called OWNERS.TXT contains information relevant to the users who are to maintain the various workgroup configurations. This is a database file. Each record in this database contains the actual name of a user plus a DOS file name acronym for the user if the user's name is not suitable for use as such a file name, plus path addresses to various servers which that user is authorized to use, plus the names of workstations which that user is authorized to maintain.

A separate directory named WG_DB 2814 contains one file for each user. For example, the user USERNM1 has a corresponding file USERNM1.TXT 2816, while the user USERNM2 has a corresponding file USERNM2.TXT 2818. Each user may have created a number of different workgroups, each of which workgroups has a name and each of which is associated with a certain number of the workstations. Each of the files 2816 and 2818 is a database which lists, opposite the name (WKGPNM1, WKGPNM2, etc.) of each of workgroup, the path to the server for that workgroup plus the list of all the workstations which are included in that workgroup.

With reference to FIG. 29, the subdirectory WG 2706 contains a directory named after each of the authorized users 2908, 2910, etc. Each of these user directories contains a directory for each workgroup which that user has created 2912, 2914, etc. Each workgroup directory contains three subdirectories: a subdirectory WG 2916, a subdirectory UPDATE 2918, and a subdirectory LOG 2920. The subdirectory WG 2916 contains information defining a given workgroup. This includes a library database file 2922 which contains the parameters associated with each kit or instruction set that is included within the workgroup. A file exists for each kit containing the instructions for that kit. For example, the file 2924, named KIT1.MP, contains a series of instructions defining a workgroup configuration. The separate file 2926, named KIT2.MP, contains a different series of instructions defining another workgroup configuration.

Normally, a series of program files and data files are associated with each such kit. These are the programs and data files that the kit probably installs and then maintains upon a plurality of workstations. These files are stored in subdirectories who have as their names the names of the corresponding kits. The subdirectories 2928 and 2930, for example, are named respectively KIT1 and KIT2. In our example task, the files TERM.EXE and TERM.DLL and TERM.SET are to be installed on each workstation.

Accordingly, the subdirectory KIT1 2928 contains the file TERM.EXE 2932 and the file TERM.DLL 2934 as well as the file TERM.SET (not shown). Accordingly, these backup files are maintained on the server from which they can be transferred directly to any workstation.

The above data structures are typical. When the program is first installed, naturally there are no user files or subdirectories, nor are there any workstation files or subdirectories nor any kits to find. These are created by the host program 3000, an overview of which appears in FIG. 30.

The first step is to establish a new user on a server with the host program which is run at step 3002 in FIG. 30. After logging onto the appropriate server (step 3004), the program is called upon to add a new user, in this case USERNM1, to the server (step 3006). An entry for that user is added to the file 2812 (FIG. 28), and a user name subdirectory 2908 is established under the directory WG (FIG. 29).

Next, at step 3008, servers and workstations are assigned to the user USERNM1. These are listed in the database file 2812 entry for that user name (see FIG. 28). Also, the names of the servers are added to the file 2810, and the names of the workgroups are added to the file 2808, so that these files show all of the servers and workgroups associated with this particular server.

The task of establishing a new user on the system, just described, is typically done by someone having high level supervisory authority over the network. That task is completed once the user is added to the system and is authorized to work with certain servers and certain workstations.

The host program 3000 may also be used by an authorized user (established as described above) to create new workgroups and new kits of instructions or specifications within each workgroup. This process begins at step 3010 in FIG. 30 with the running of the host program. The user logs on as USERNM1 at 3012 and then proceeds to create a new workgroup WKGPNM1 at step 3014. With reference to FIG. 28, a new workgroup is established by adding to the file USERNM1.TXT 2816, the name of the new workgroup WKGPNM1, the path to the workgroup server, and the names of the workstations. In FIG. 29, a directory WKGPNM1 2912 is established as are the three subdirectories 2916, 2918, and 2920 for this particular workgroup. A library file LIBRARY.TXT 2922 is established for the workgroup, but initially it is empty and contains no kit parameters.

Returning to FIG. 30, the next step is to create a kit for specification KIT1 (step 3106). The particular kit created contains the instructions illustrated at 3018. These include three copy commands, for copying the three files TERM.EXE, TERM.DLL, and TERM.SET from their present location on a host machine to a given destination on drive D:\ on each of the workstations that is to be configured. The server program locates these files and copies them into the subdirectory 2928 (FIG. 29) as shown at 2932 and 2934. Thus, the host source of these files does not need to be accessed when a workstation is updating itself from the server. The parameter "s" indicates the source of the file, the parameter "d" the destination path, the parameter "a" indicates file attributes (R for Read only, S for System, and H for Hidden), and the parameter "m" indicates if the file is to be backed up ("B"), if the system operator is to be notified ("N") when the file was modified or if the file is to be restored to its initial condition ("R") if the file is modified. The remaining parameters are not entered by the user, but are automatically added to the instructions in the kit by the host program 3000. These include the "m" parameter which is the file date, the "S" parameter which is the file size, the "K" parameter which is a cyclical redundancy check sum computed from the entire contents of the file for use in determining whether the file has been corrupted, and a parameter "F" which is a temporary name for the file used in the subdirectory 2928 on the server since this file and some other files stored in that same subdirectory might have the same name and might be confused if they were not assigned pseudonyms.

The final instruction in this kit is the SET_INI command which causes a change to be made in the Microsoft Windows WIN.INI file that enters the two lines of information set forth above so that the terminal program comes up emulating a standard ASCII terminal whenever it operates. A similar command can be used to add data to the registry under Windows 95.

Once defined, the name of the kit, and various parameters relating to its execution, are stored together with the kit's name in the LIBRARY.TXT file 2922. Then the actual set of instructions is stored at 2924 in a file named KIT1.MP. A subdirectory named KIT1 2928 is also established to contain the files which are to be copied 2932 and 2934.

The steps of creating the above files and data base entries is indicated in FIG. 30 as the step of loading the kit into the workgroup 3020. The step of creating and gathering from the user the kit parameters for storage in the library 2922 is carried out at the step 3022 in FIG. 30. The parameters in the library 2922 can list workstations which may be designed either "use only", meaning use only the workstations listed when this kit is processed, or "all except", which means all the workstations within the workgroup (server file 2816 in FIG. 28) other than those listed may be processed. If the parameter list contains no workstations, then the default list of workstations for that particular workgroup, listed under the workgroup name at 2816 in FIG. 28, will be used. Finally, in step 3024, the names of all the workgroups which are to be affected by this new kit are stored as file names (for zero length files) in the subdirectory UPDATE 2918. This is a flag which causes those respective workstations to download all relevant kit files (2924, 2926, etc.) and to take whatever actions are appropriate to implement the commands which they contain. If a workstation's name does not appear as a file name in the UPDATE directory 2918, than that workstation configures itself using kit instructions retrieved on previous occasions and does not go back to the server for new kit instructions. That completes the process of establishing a new user, a new workgroup, and a new kit of instructions on the server under the control of the host program 3000.

The workstation program 3100 (FIG. 31) is placed into operation automatically every time a workstation is turned on or boots (step 3102), or it may be placed into operation manually by the user of a workstation in case there is some problem at the workstation. This program begins by locating the server or servers whose names appear in the file 2634 (FIG. 26). With reference to FIG. 29, the program locates all users authorized to manage this workstation and all workgroups created by those users that have reference to this workstation. Finally, the program searches for all kits under each of those workgroups that include this workstation within their scope.

The remaining steps in FIG. 31 are executed with respect to every kit that is found within every workgroup found within every user found within every server. Accordingly, the steps including and following 3106 may be executed repeatedly many times.

At step 3108, the workstation program 3100 checks the server's directory UPDATE 2918 to see if the workstation's name appears as a file name at 2936. The first time the workstation program runs, following the installation of a new kit, the workstation's name will appear at 2936. Accordingly, program control commences at 3110 where all commands in the kit are executed, since all of these commands are new commands. Assuming that the create necessary directory option is specified in the kit parameter at 2922 (FIG. 29), the new subdirectory TERM will be created, and the three files will be copied into that subdirectory. Then the Windows file WIN.INI will be modified as needed. In this manner, the workstation is fully configured and is ready for program execution.

At 3112, with respect to the sublist of commands copy, replace, SET_INI, set__registry, and keep version, the status of command execution is actually recorded as a letter which is placed into a modified copy of the KIT1 file stored under the name KIT1.OLD 2656. The unmodified KIT1 file is stored as a file KIT1.MP 2650 on the workstation. By comparing these two files, one can find out the status of certain critical commands as to whether or not they executed successfully. Also, when a new kit file is downloaded from the server, it replaces the file 2650, but the file 2656 is retained so that new commands can be identified.

In the present preferred embodiment, four status codes are used. The letter S indicates success. The letter L indicates a catastrophic error occurred, and this instruction is never to be executed again. A record of such catastrophic errors is maintained on the workstation in the log file 2636 (FIG. 26). The letter N indicates a network error, and the error would also be recorded in the file 2636, since the network might not have been working at that time. The letter "D" indicates that a directory was missing in a kit that is not authorized to create directories automatically. Again, these letters are appended to the corresponding instructions in the copy of the instruction kit KIT1.OLD 2656.

Finally, at 3114, the name of the workstation is erased from the subdirectory 2936 (where it appeared as a file name) so that the next time the workstation program 3100 runs, it will know not to download another copy of the kit instructions file 2924 from the server.

Upon subsequent executions of the workstation program 3100, the workstation name would not be found in the update directory at step 3108. Accordingly, program execution proceeds with steps 3116 and 3118.

At step 3116, if the status of an instruction in the file KIT1.OLD is N, meaning a network problem interfered with a task such as copying a file, then the instruction is simply reexecuted, and the new status is stored in the file KIT1.OLD. It may have been that a portion of the network containing a particular server was down on the date when the workstation program 3100 ran, and it is simply necessary to wait until that part of the network is up so that these instructions can be executed successfully.

If an instruction was executed satisfactorily, as indicated by an S execution code, and if an instruction is one that specifies the RESET or NOTIFY option, then step 3118 checks to see if the system element has been altered in any way. This can be a simple matter of checking for the existence of the file, checking the file creation date, and checking its length in the directory. However, in the case of critical elements, it is also possible to call for the computation of a file check sum which can then be compared to the check sum value that is part of the instruction in the kit. If a file is modified or corrupted, the NOTIFY option will cause this to be reported to the system administrator. The RESET option will simply cause a new copy of the corrupted file to be brought down and reinstalled. The same may be done to the modifications to either the Window system's registry or to a Windows INI file, such as the file WIN.INI, to insure that some program has not corrupted or deleted a Windows setup string of instructions. In this manner, continued maintenance and automatic repair of the system can be carried out, without any need for human intervention, each time the workstations are turned on.

Figure 23:
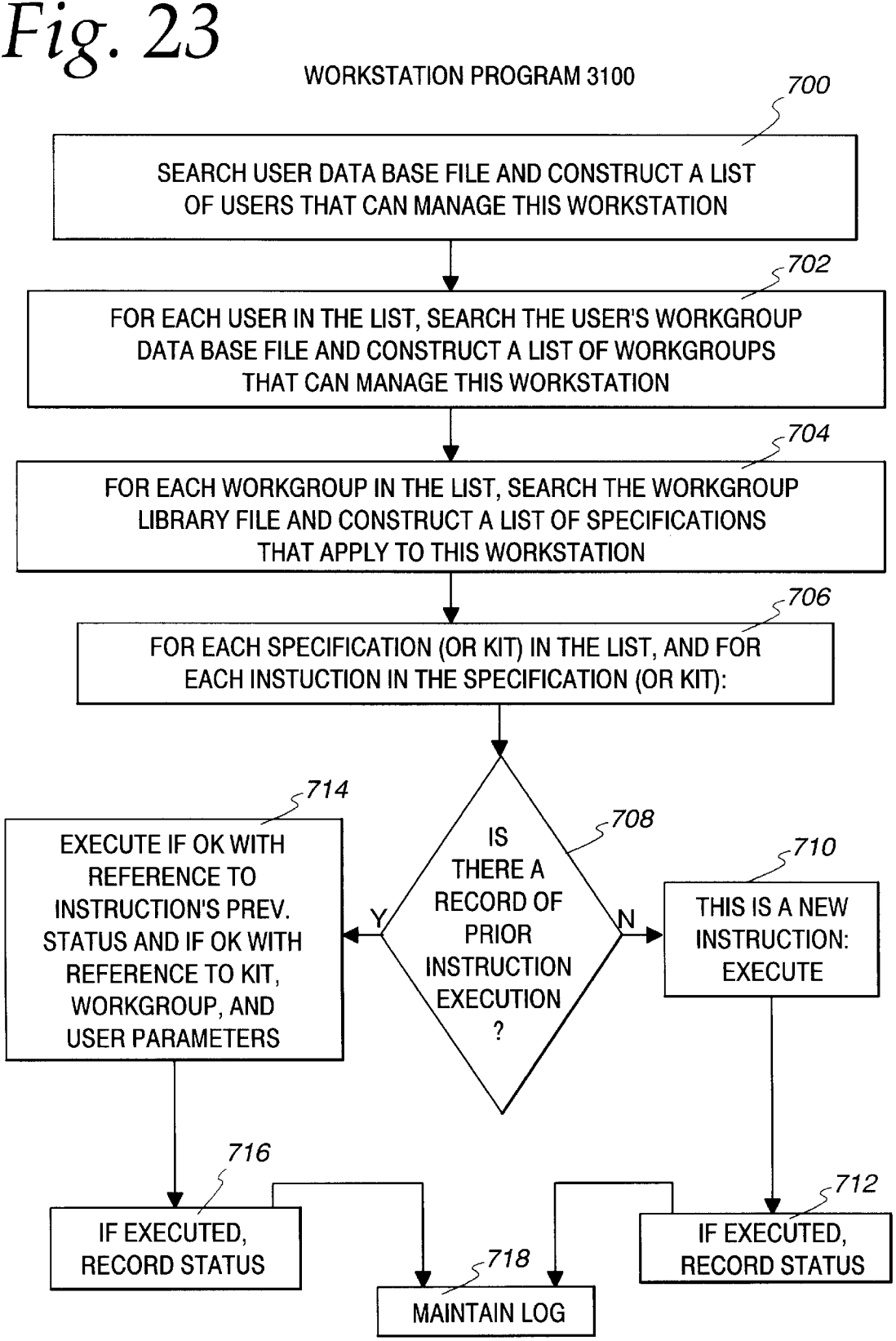
FIG. 23 is a block diagram illustrating the workstation program for maintaining kits or specifications for management of a personal computer from a server, in accordance with the present invention.

Turning now to FIG. 23, the workstation program begins with a search of the user database file and construction of a list of users that can manage the workstation at step 700. The database of users orders the users so that the workgroups of users earlier in the database are acted on before workgroups of users later in the user database file.

An exemplary user database is provided as follows:

---
ron¦ron¦serl,Novell,mstro:\beckwg¦desk_bob,pc_bob01,pc_phil,ron 01
supervisor¦supervis¦serl,Novell,mstro:\beckwg¦desk bob,pc_bob01,pc_phil,ron_01
bob¦bob¦serl,Novell,mstro:\beckwg¦desk_bob,pc_bob01,pc_phil,ron_01
phil¦phil¦serl,Novell,mstro:\beckwg¦pc_bob01,pc_phil
rbeck¦rbeck¦serl,Novell,mstro:\beckwg¦pc_bob01,pc_phil
---

The description of data in the foregoing example provides major fields separated by "¦", subfields separated by a ",", and major fields in order as: (a) user name; (b) unique shortened version of user name, limited to eight characters (c) information about the servers the user can use to store workgroup data; and (d) a list of stations the user is allowed to manage. The subfields in the server information are, in order: (a) a name for the server; (b) the type of network; and (c) network typespecific information describing a path on the server. The server subfields are repeated to describe other servers the user may use.

The user database file specifies the order that users'management of workstations is performed. All of the instructions in specifications created by users earlier in the database are executed before instructions in specifications created by users later in the user database. This allows coordination of management between users. As an example, user1 may install an application and user2 may configure the application. It is important that the install happens before the configuration by the later user.

Managing computers is a dynamic process. By ordering users, workgroups and specifications correctly, a new workstation can be added to a workgroup, and then the new workstation can be set up to match the current specification. Users may be added or subtracted, workgroups may grow or shrink, specifications may be moved to other workgroups, and instructions may be added or removed. In these situations, instructions are executed initially based upon time of addition to a specification or kit, as well as the order of user, workgroup and kit. It is important to put instructions in the right user, workgroup, kit combination so as to insure that workstations added to the system later are properly set up. Maintaining the order of execution based upon user, workgroup and specification makes the proper set up possible.

For each user in the list, step 702 is provided to search the user's workgroup database file and construct a list of workgroups that can manage the workstation. An example of a user's workgroup database is as follows:

---
group-a |SER1,Novell,SYS:\MAESTRO\WRKGRP| PC1,PC2,PC3
group-b |SER1,Novell,SYS:\MAESTRO\WRKGRP| PC2,PC3
---

A description of the fields as indicated in the exemplary user's workgroup database are provided wherein major fields are separated by a "|", subfields separated by ",", and major fields in order are: (a) workgroup name; (b) information about the server where workgroup files are stored; and (c) a list of workstations that can be managed by the workgroup. The user's workgroup database orders the workgroups so that specifications in workgroups earlier in the database are acted upon before specifications in workgroups later in the database. This allows a user to coordinate the management of workgroups. Later workgroups may be dependent on actions in earlier workgroups. For each workgroup in the list, step 704 provides for a search of the workgroup library and the construction of a list of specifications that applies to the workstation.

An exemplary workgroup library is provided as follows:

---
kit1|AllExcept||Test the set ini command|0|194|1907049548|1
spec1|AllExcept|c3|This specification has one of each command|0|554|3005730883|1
---

The description of the workgroup library fields wherein the fields are separated by a "|", in the following order: (a) the name of the specification (b) a description of the meaning of the list in the list of workstations; (c) a list of workstations; (d) a description of the specification; (e) a number representing the date of the specification file; (f) the size of the specification file; (g) the CRC (Circuit Redundancy Code) of the specification file; and (h) a flag indicating whether to create the necessary directories. Fields (b) and (c) are inter-related because the fields may indicate an entirely exclusive or entirely inclusive list. If field (b) is "AllExcept" the specification applies to all workstations except those listed in field (c). In this case, of course, field (c) may be left empty. If field (b) is "OnlyList" then the specification only applies to workstations listed in field (c). The use of "AllExcept" allows workstations to be added to the workgroup and have every specification with "AllExcept" applied to it with no changes to the kit or its parameters.

The workgroup library file specifies the order that the specifications in the workgroup manage workstations. All of the instructions in specifications earlier in the library are executed before instructions later in the workgroup library file. This allows a user to coordinate the activities of specifications. Later specifications can thus be dependant upon earlier specifications.

For each specification in the list, step 706 provides a look-up for a record about prior execution of the instruction for each instruction in the specification in the order that the instruction is positioned in the specification. Step 708 determines whether a record of prior execution exists. If there is no record of prior execution, step 710 provides for the instruction being treated as new, and thus it is executed. A record about the execution of the new instruction is kept at step 712. If there is a record of prior execution, step 714 then identifies that the instruction has been executed before. The instruction is executed again or else skipped based upon the information in the record and parameters related to the user, workgroup or specification, e.g., the creation of necessary directories. At step 16, the record from instructions that are skipped is retained and a record of previously executed instructions which have been executed again is generated. Note that records about instructions that have been previously executed and are no longer in the specification are removed.

An example of a specification in the list reviewed at step 706 is as follows:

---
```
mkdir -d c:\test
copy -s c:\autoexec.bat -d c:\test\autoexec:bat -a RSH -m NRB -M 841321590 -S 1196 -K
    2449975033 -F autoexec.bat
replace -s c:\autoexec.mst -d c:\test\autoexec:mst -a RSH -m NRB -M 839006978 -S 1120 -K
    3800459082 -F autoexec.mst
m_dir -d c:\test
m_file -d c:\test\autoexec.mst
m_tree -d c:\test
run -d c:\test\test.bat -c "one two"
set_ini -d c:\test\auto.ini -r [section1] -e entry1 -v "value1" -m NR
m_ini -d c:\test\auto.ini -r [section2] -e entry2
keep_versions -d c:\test\autoexe.mst -n 9 -m N
# This is a comment
```
--- where the specification parameters are as follows:

---
| | | | | |
|---|---|---|---|---|
| mkdir | -d | directory name on workstation | | |
| copy | -s | file name on host | -d | file name on workstation |
| | -a | DOS Mode (RSH) | -m | N (Notify) R(Reset) B(Backup) |
| | -M | number of related to date and time of file | -S | size |
| | -K | CRC Value | -F | file name on server |
| replace same options as copy | | | | |
---

```
rm_dir   -d directory name on workstation
rm_tree  -d name of directory or file on the workstation
run      -d name of program on workstation  -c arguments to program
set_in   -d   name of file on the workstation   -r   name of section in file
         -e   name of entry in section           -v   value of entry
         -m   N(Notify) R(Reset) M(Multiple Entries)
rm_ini   -d   name of file on workstation       -r   name of section in file
         -e   name of entry in section           -v   value of entry
keep_version -d file on workstation    -n number of versions kept
# comments
```

An example of a specification wherein part of the record indicates prior execution according to steps 708 and 714, is provided as follows:

```
mkdir -d c:\test
copy -s c:\autoexec.bat -d c:\test\autoexec:bat -a RSH -m NRB -M 841321590 -S 1196 -K
    2449975033 -F autoexec.bat -R S
replace -s c:\autoexec.mst -d c:\test\autoexec:mst -a RSH -m NRB -M 839006978 -S 1120 -K
    3800459082 -F autoexec.mst -R L
m_dir -d c:\test
m_file -d c:\test\autoexec.mst
m_tree -d c:\test
run -d c:\test\test.bat -c "one two"
set_ini -d c:\test\auto.ini -r [section1] -e entry1 -v "value1" -m NR -R S
m_ini -d c:\test\auto.ini -r [section2] -e entry2
keep_versions -d c:\test\autoexe.mst -n 9 -m N -R S
``` where parameters of the record indicating prior execution are as follows:

```
mkdir    -d    directory name on workstation
copy     -s    file name on host            -d   file name on workstation
         -a    DOS Mode (RSH)               -m   N (Notify) R (Reset) B (Backup)
         -M    number of related to date and time of file    -S size
         -K    CRC Value                    -F   file name on server
         -R    Status of Prior Execution, S (Success) or N (Network Error) or
               D (Missing Directory) or L (Error)
replace same options as copy except
         -R    cannot have D argument
rm_dir  -d directory name on workstation
rm_file -d file name on workstation
rm_tree -d name of directory or file on the workstation
run     -d name of program on workstation  -c arguments to program
set_in   -d   name of file on the workstation   -r   name of section
         -e   name of entry in section           -v   value of entry
         -m   N(Notify) R(Reset) M(Multiple Entries)
         -R   Status of Execution S (Success) or D (Missing Directory)
              or L (Error)
rm_ini   -d   name of file on workstation       -r   name of section
         -e   name of entry in section           -v   value of entry
keep_version  -d file on workstation   -n number of versions kept
              -m N (Notify) -R status S (Success) or L (Error)
```

The instructions in the specification can be copy, replace, mkdir, rm_dir, rm_file, rm_tree, run, set_ini, rm_ini, set_registry, rm___registry, keep_version, and comment. After the instructions of the specifications are executed and recorded, a log is maintained at step 718. An example of the information logged in the log of step 718 is as follows:

```
11/02/96   09:30 kit1 2  set_ini d c:\test.ini -r [test 1] -e entry2 -v "value 2" -m N
           Someone changed the value of entry2.
11/06/96   00:09 kit1 2  set_ini d c:\test.ini -r [test 1] -e entry2 -v "value 2" -m N
           Someone changed the value of entry2.
```

| | |
|---|---|
| 11/06/96 | 00:09 spec1 4 m_dir –d c:\test |
| | Could not get permission to remove c:\test |
| 11/06/96 | 00:09 spec1 7 run –d c:\test\test.bat –c "one two" |
| | c:\test\test.bat is missing from the target PC. |
| 11/06/96 | 00:09 spec1 10 keep_versions –d c:\test\autoexec.mst –n 9 –m N |
| | Can't keep a version because c:\test\autoexec.mst does not exist. |

Initialization files are set in accordance with the workstation specification or kit of a given workgroup. Initialization files, often called ini files because of their .ini file extension, are sequential text files that are used for storing system configuration data. Windows initialization files contain information that defines the windows environment. Windows and Windows applications can use the information stored in these files to configure themselves to meet the workstation specification. In Windows 95, a registry is the database where configuration information is stored. The registry completely replaces the concept of initialization files by storing the configuration information of the files in a single location at the registry database.

The registry functions provided by Microsoft for developers are summarized as follows by function and purpose:

| FUNCTION | PURPOSE |
|---|---|
| RegCloseKey | Closes an open registry key. |
| RegCreatKeyEx | Creates a new subkey. |
| RegDeleteKey | Removes a key from the registry. |
| RegDeleteValue | Removes a value from a registry key. |
| RegEnumKeyEx | Enumerates through subkeys of a key. |
| RegEnumValue | Enumerates through the value of a key. |
| RegFlushKey | Writes registry changes immediately. |
| RegLoadKey | Loads a hive into a topmost root key. |
| RegOpenKey Ex Extensions. | Opens an existing registry with Win32 |
| RegQueryInfoKey | Returns information about a key. |
| RegQueryValueEx | Returns a value (with Win32 extension data types). |
| RegRestoreKey | Reads a hive into a previously stored key. |
| RegSaveKey | Saves values and subkeys of a subkey to a hive file. |
| RegSetValueEx | Assigns a value to a key (with new datatypes). |
| RegUnloadKey | Removes a hive from the registry. |

Figure 24A:
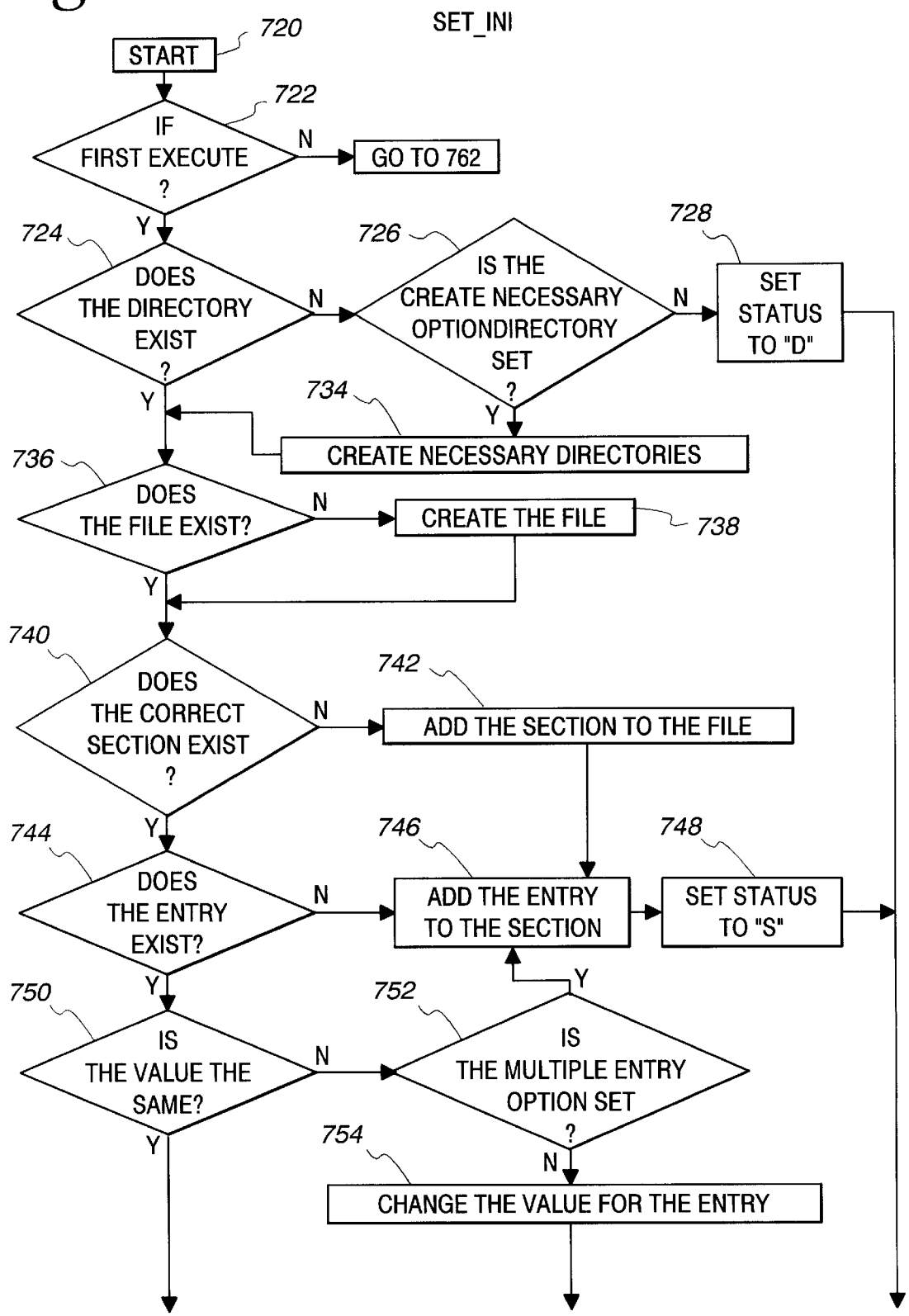
Figure 24A:
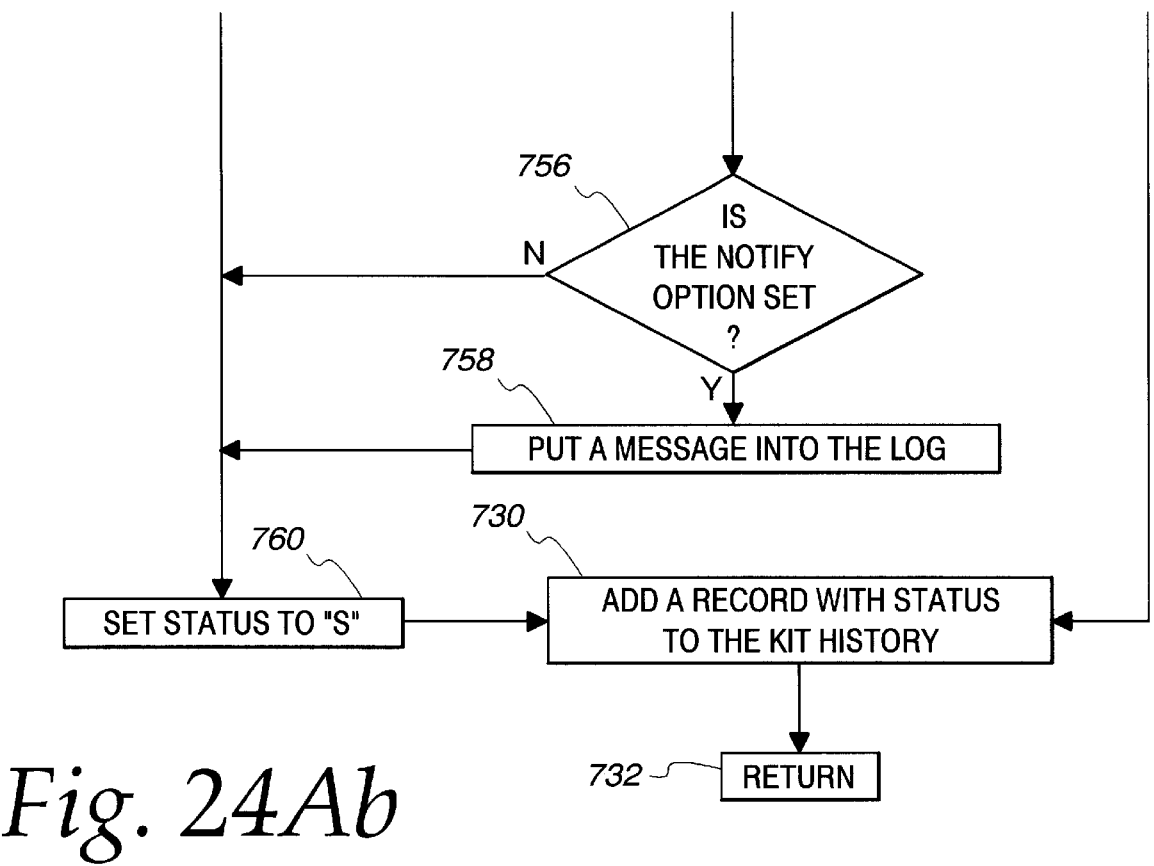

Returning now to the initialization files, which are configured using the "set _ini" instruction of the specification for the workstation of a workgroup, the set ini instruction starts at step 720 in FIG. 24A. The following status codes are employed with the set_ini instruction:

L=local error, instruction already gave an error message, do not notify or reset S=instruction executed OK, do a notify or reset if applicable D=directory did not exist. If make necessary directory option is set on the kit in the future, run like a new command, otherwise treat like an "L"

At step 722 it is determined whether it is the first time that the particular set_ini instruction is being executed, if so, program flow for the first execution continues at step 722 in FIG. 24A. Otherwise, if it is not the first execution for the particular set_ini instruction, then program flow continues at step 762 in FIG. 24B, discussed below.

Where the set_ini instruction is being executed for the first time, step 724 determines whether the necessary directory exists. If the necessary directory is not present, step 726 determines whether the create directory option is set. If the create directory option is not set, step 728 sets the set_ini status to "D" and step 730 adds a record with status to the kit history. The subroutine returns via step 732.

Figure 24B:
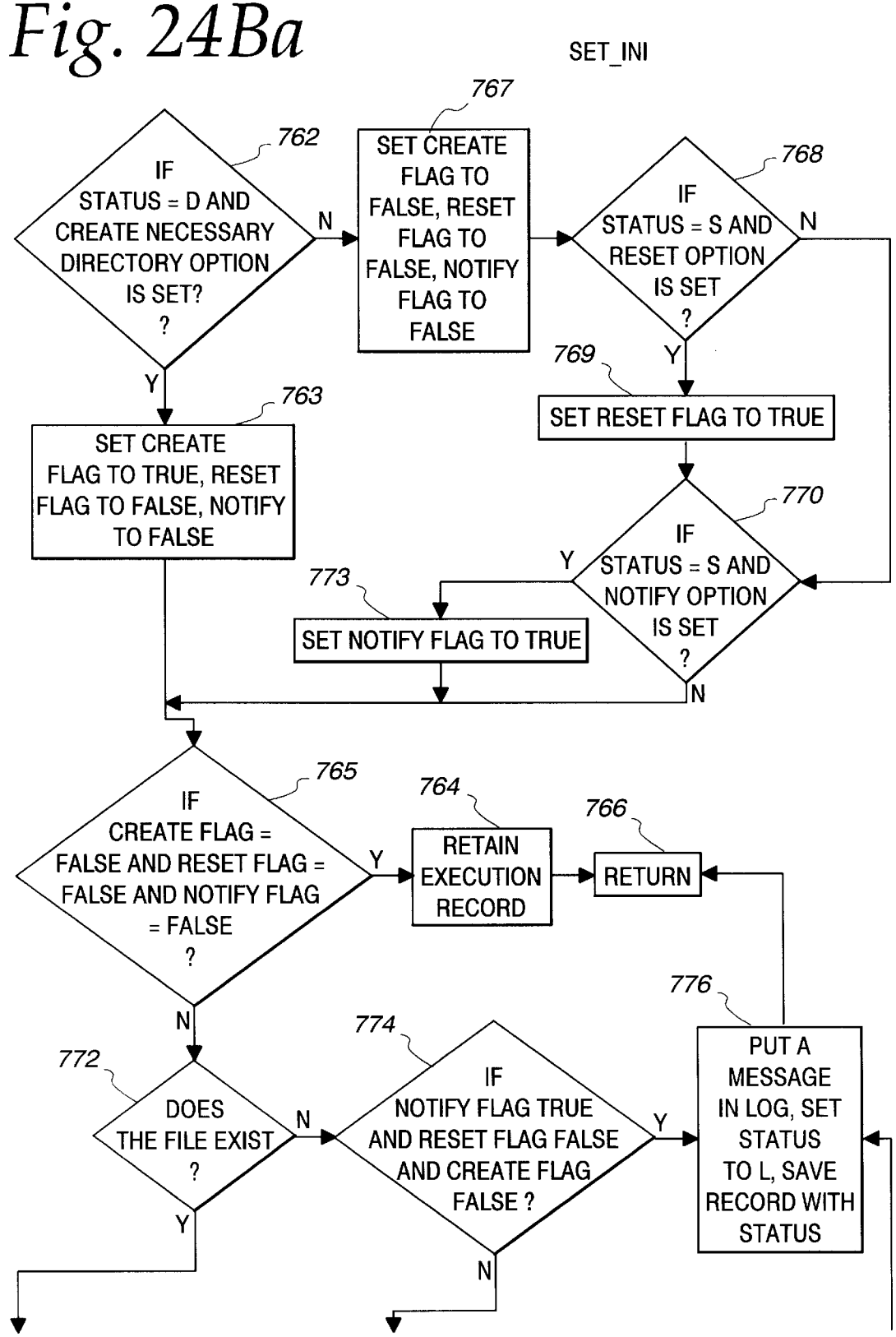

If the create necessary directory option is set, step 734 creates the necessary directory and step 736 determines whether the file indicated by the set_ini instruction exists. If the file does not exist, step 738 is used to create the file. A search of the file is performed for identifying the proper section at step 740. If the correct section needs to be added to the file, step 742 adds the section. Step 744 is used to search the file for the proper entry, and if the proper entry does not exist step 746 adds the entry to the section Where either the section of the file or the entry to the section were required to be added, step 748 sets the status to "S" and as discussed previously the subroutine returns with a record including status added to the kit history via steps 730 and 732.

Where the entry does exist, step 750 is used to determine whether the value of the entry is the same. If the value of the entry is not the same, step 752 checks to determine whether the multiple entry option is set. If the multiple entry option is set program flow continues at step 746 where the entry is added to the section, status is set to "S" and a return from the subroutine is performed.

Where the value of the entry is not the same and the multiple entry option is not set as determined in steps 750 and 752, step 754 changes the value of the entry, step 756 checks to determine whether "Notify" is set as an option, if so a message is put into the log at step 758. The entry having been set by the set_ini instruction, program flow continues at step 760 where the status is set to "S", and as discussed previously, a record including status is added to the kit history and a return from the subroutine is performed at steps 730 and 732.

Where step 722 determines that execution of the instant set_ini instruction is not the first execution, program flow continues in FIG. 24B at step 762 where it is determined whether the status is set to "D" and if the create necessary directories option is set. If so, step 763 sets the create flat to true, the reset flag to false and the notify flag to false. Execution continues at step 765. If at step 762 the status was not "D" or the create for the proper entry, and if the proper entry does not exist step 746 adds the entry to the section. Where either the section of the file or the entry to the section were required to be added, step 748 sets the status to "S"and as discussed previously the subroutine returns with a record including status added to the it history via stops 730 and 732.

Where the entry does exist, step 750 is used to determine whether the value of the entry is the same. If the value of the entry is not the same, step 752 checks to determine whether the multiple entry option is set. If the multiple entry option is set program flow continues at step 746 where the entry is added to the section, status is set to "S" and a return from the subroutine is performed.

Where the value of the entry is not the same and the multiple entry option is not set as determined in steps 750 and 752, step 754 changes the value of the entry, step 756 checks to determine whether "Notify" is set as an option, if so a message is put into the log at step 758. The entry having been set by the set_ini instruction, program flow continues at step 760 where the status is set to "S", and as discussed previously, a record including status is added to the kit history and a return from the subroutine is performed at steps 730 and 732.

Where step 722 determines that execution of the instant set_ini instruction is not the first execution, program flow continues in FIG. 24B at step 762 where it is determined whether the status is set to "D" and if the create necessary directories option is set. If so, step 763 sets the create flat to true, the reset flag to false and the notify flag to false. Execution continues at step 765. If at step 762 the status was not "D" or the create necessary directory option was not set, then step 767 sets the create, reset and notify flags to false. Continuing at step 768 a check is made to see if status is "S" and the reset option is set. If so, step 769 sets the reset flag to true. Execution proceeds to step 770 where the notify option and status are checked. If the notify option is set and status is "S" then step 773 sets the notify flag to true. Execution proceeds to step 765. At step 765 the create flag, reset flag and notify flag are checked, if all are false step 764 retains the execution record and a return from the subroutine is performed at step 766.

If any of the create, reset or notify flags are true, step 772 determines whether the file exists. If at step 774 the notify flag is true and other flags are false, then step 776 puts a message in the log, sets status to "L" on the execution record and saves the execution record. Where the notify flag is false or other flags are true, step 780 determines whether the necessary directory exists, step 782 checks for a true notify flag and if true, step 784 puts a message in the log.

Step 786 determines whether the create flag is true or the reset flag is true. If either are true, the necessary directories are created and the status is set to "S" at step 790 and execution continues at step 806. Otherwise, step 776 sets the status to "L", puts a message in the log and saves a record with the status. The subroutine returns from step 766.

Where the directory does exist, program flow continues from step 780 to step 800 where the program checks to determine whether the notify flag is true. If so, step 802 puts a message in the log. Step 804 checks for a true create flag or reset flag. If one is found, the file is then created at step 806, otherwise execution goes to step 776 and return at step 766. Step 808 then searches the file for the proper section.

Figure 24C:
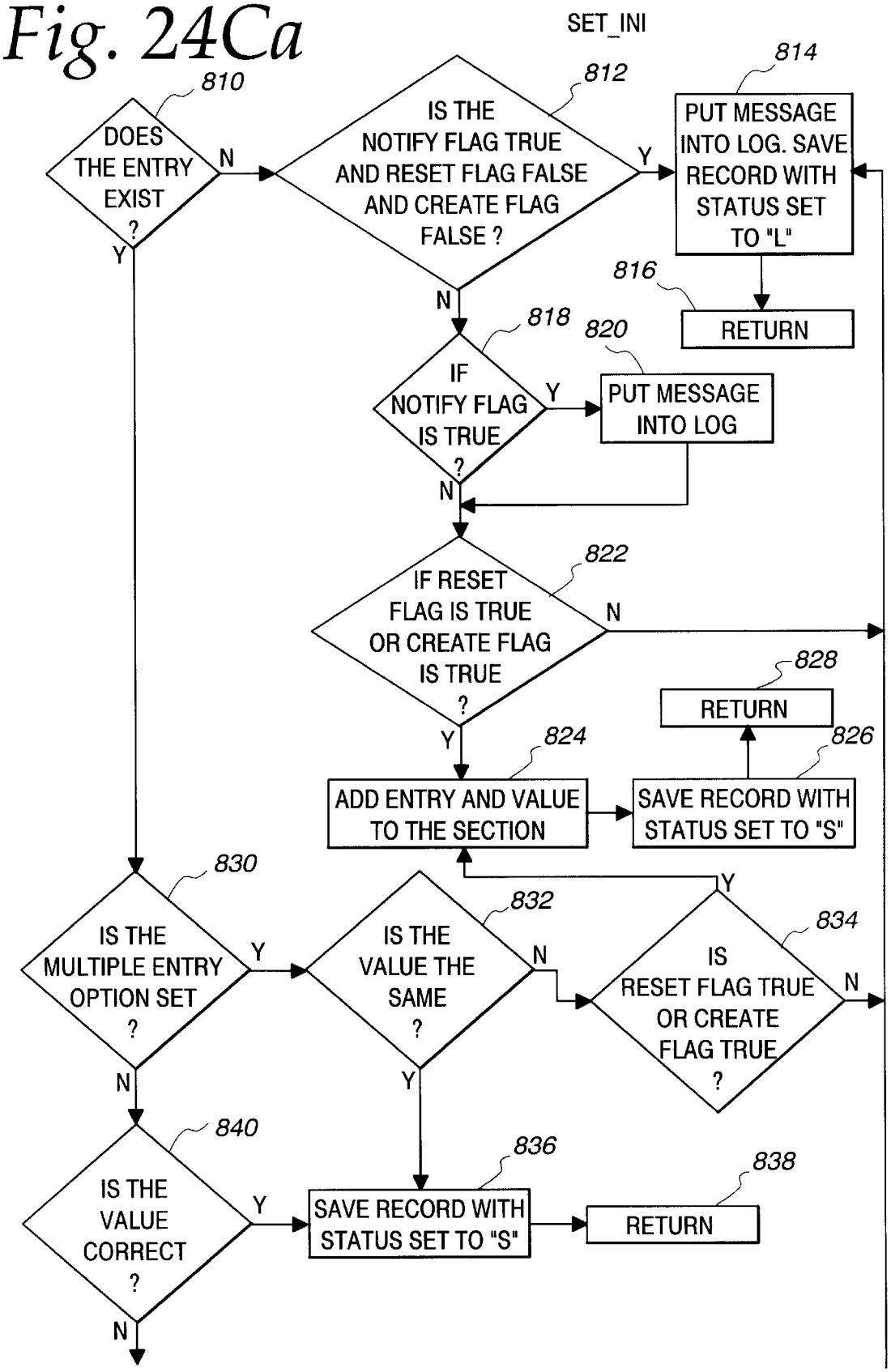
Figure 24C:
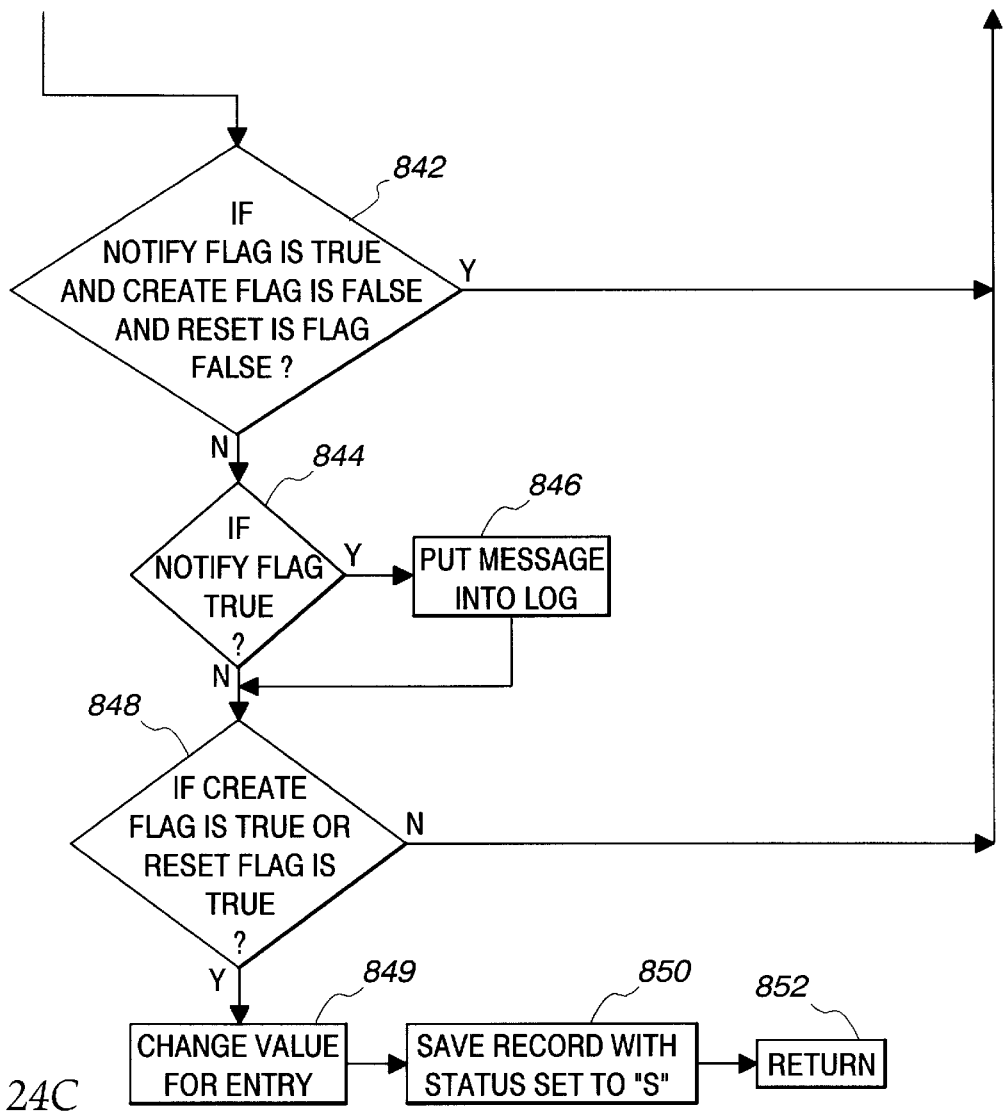

If the proper section does not exist in the file, step 810 determines whether the notify flag is true and the create and restore flags are not, if so, program flow continues via step 776 where the status is set to "L", a message is put into the log and a record with status is saved. If at step 812, the notify flag is true, a message is placed into the log at step 814. Step 792 then determines whether the create or reset flaps are true, if so, at step 794 the section is added to the file, and the entry and value are added to the section. The status is set to "S" and a record with status saved at step 796 and a return from the subroutine is executed at step 798. Otherwise, execution proceeds to step 776 where a message is put in the log and a record with status "L" is saved and a return from the subroutine is made at 776.

Where a search of the file determines that the correct section does exist at step 808, step 810 in FIG. 24C determines whether the entry exists. If the entry does not exist, step 812 determines whether the notify flag is true and the create and reset flags are both false and if so, step 814 puts a message into the log and a return is executed at step 816. Step 814 also sets the status to "L" and saves the execution record in addition to placing the appropriate message into the log.

Where the notify flag is false or the reset or create flag is true, step 818 checks to determine whether the appropriate message should be placed into the log at step 820. Step 822 then determines whether the reset flag is true or the create flag is true and the instruction should be run. If the instruction should not be run, then the status is set to "L" and a return is executed via steps 814 and 816 discussed above. At step 824, the entry and value are added to the section, and step 826 sets the status to "S" and saves the execution record. A return from the subroutine is then performed at step 828.

Where step 810 determines that the entry did exist, step 830 determines whether the multiple entry option is set. If so, step 832 determines whether the value is the same, if not, step 834 determines whether the create flag or the reset flag are true. If so, the entry and value are added to the section in step 824. Where the value is the same, step 836 sets the status to "S" and saves the execution record for return from the subroutine at step 838.

Where the multiple option entry has not been set, step 840 determines whether the value is correct. If not, step 842 determines whether either the notify flag is true and other flags are false. The program saves a record with status "L" and returns through steps 814 and 816. Step 844 checks if the notify flag is true. If so, step 846 then places a message into the log. At step 848 the program checks for either the create flag true or the reset flag true. If neither is true, the program saves a record with status "L" and returns through steps 814 and 816. Step 849 changes the value for the entry. Step 850 then sets the status to "S" and saves the execution record for return at step 852.

Much as the set_ini instruction insures that the ini files are configured according to the workgroup specification, a copy instruction is provided for copying files from the workgroup server to workstation computers within the workgroup according to the specification or kit. The copy instruction is illustrated in the program flow diagrams of FIGS. 25A and 25B. The copy instruction starts at step 860 and a determination is made as to whether this is the first execution of the copy instruction or if the instruction had previously been executed with a status of "N" for network error, similar to the determination made in connection with the set_ini instruction discussed above. Step 906 continues the program in FIG. 25B if the copy instruction had previously been executed and its status was not "N" (network error).

Continuing in FIG. 25A, step 864 determines whether the file exists, and if not, step 866 determines whether the directory exists. At step 868, if the create necessary directory option is not set, then status is set to "D" and a message is added to the log at step 870. A record is then kept about the execution and the status at step 872 and the subroutine returns from execution at step 874. At step 876, where the file does exist, a determination is made as to whether the same CRC and size or check value is attributed to the file. If the file is not the same, then step 878 copies the file from the workgroup server to the workstation. The copy is also provided at step 878 if the necessary directory is created at step 880 when the create necessary directory option is set as determined from step 868 or if the directory exists at step 866. Step 882 determines whether the copy was successful. If the copy was not successful, the status is set to "L" and a message is added to the log at step 884. If the copy was successful, step 886 sets the mode, step 888 sets the date and time and step 890 sets the status to "S". As discussed previously, a record is kept about the execution and status at step 872 and a return is executed from step 874.

Where step 876 determines that the file is the same, step 892 determines whether the file has the same mode. If the mode is different, then the mode is set at step 894 and step 896 determines whether the file has the same date and time. If the date and time are different, step 898 sets the date and time. A status determination of whether the notify option has been set is made at step 900. Where the notify option has been set, step 902 determines whether the file mode was changed or the date or time was set, and step 904 writes a message to the log prior to setting the status to "S" and returning from the subroutine.

Where the particular copy instructions had previously been executed, FIG. 25B continues the program flow from step 862, wherein step 906 determines if the status is "D" and the create necessary directories option is set. If so, the create flag is set to true and the notify flag is set to false. Execution continues at step 909.

At step 911, if the status is not "D" or the create directories option is not set at step 906, then if the status is "S" and the reset option is set, the create flag is set to true and the notify flag is set to false in step 913. Execution continues with step 914. At step 912 the create flag is set to false, since step 911 had a status not "S" or the reset option was not set. In steps 914 and 915 the notify flag is set to true if the status is "S" and the notify option is set. Execution proceeds to step 909. Step 909 checks to see if all the flags are false. If so, then step 908 retains the prior execution record and a return from the subroutine is executed at step 910.

Where either the notify flag is true or the create flag is true, then step 916 determines whether the file exists.

Where the file does not exist, step 918 checks to see if the notify flag is true and the create flag is false and step 919 puts a message into the log and sets the status to "L" and step 946 saves the execution record and returns at step 950. Step 922 determines whether the necessary directory exists. If the directory is not present, step 924 determines whether the notify flag is true, if so, a message is placed in the log at step 926 and step 928 determines whether the create flag is true. If so, the necessary directories are created at step 930, and execution proceeds to step 940.

Where the file does exist at step 916, step 932 determines whether the file is of the same CRC, size, date and time. If the file is not the same as determined from step 932, or the directory does exist as determined at step 922, then step 934 determines whether the notify flag is true. If so, a message is put in the log at step 936. At step 938 the program checks to see if the create flag is true. If so, then the file is copied and the time, date and mode are set at step 940. A check for an error is determined at step 942. If there was an error, then a message is placed in the log at step 944. If, however, there was no error in the copy instruction execution, then step 946 sets the status to "S". Step 946 saves the record and returns at step 950.

Where the file copy was determined to be the same at step 932, step 948 retains the prior execution record and returns from the subroutine at step 950.

The foregoing examples of set_ini and copy instructions are two exemplary instructions which may be provided in the workstation and specification as discussed above. The other instructions which may be provided in the specification as set forth and described above, may follow much the same programming philosophy as discussed in connection with the set_ini and copy instructions. For instance, the set_registry instruction in the specification is intended to act as the set_ini instruction in current Windows applications. combination with regards to a few possible applications of the invention to illustrate the operation thereof. This description is not intended to limit the invention to the precise forms disclosed, however. Consequently, many modifications and variations are possible in light of the above teachings by those skilled in the art as expressed in the specification and the appended claim.

What is claimed is:

1. A method for testing the integrity of select plural files on a workstation comprising the steps of:

providing a workstation where said select plural files are currently configured, said workstation being identified as any of one or more host workstations;

generating, for said one or more host workstations, a set of check values from the contents of said select plural files and combining said check values with other file attributes from said select plural files;

providing one or more client workstations maintaining copies of said select plural files, where the integrity of said file copies is to be checked;

generating, for said one or more client workstations, a set of check values from the contents of said select plural files and combining said check values with other file attributes from said select plural files;

comparing the file attribute data and check values gathered from said client workstation and said host workstation;

said comparison of file attribute and check values indicating a discrepancy or missing file on said client workstation; and replacing said select file where said comparison indicates a discrepancy or missing file to maintain said copies of said select plural files corresponding to said select plural files of said host workstation.

2. The method as recited in claim 1, said method further comprising the steps of:

determining which files are located at a host workstation and not at said client workstation based on said file name comparison step; and moving the files located at the host workstation and not at said client workstation from the host workstation.

3. The method as recited in claim 1, said method further comprising the steps of:

saving at least one of said host workstation check values and file attributes as a record of the state of the corresponding host workstation for use in later analysis of the workstations;

on at least one later date, once again generating client workstation file attribute records for the workstations;

carrying out said comparison step by comparing the once again generated file attributed and check values gathered from said client workstation and said host workstation; and following each such comparison, repeating said replacement step if necessary.

4. A method of computer management automatically re-executing system configuration instructions in dependence upon their execution status and the current condition of a workstation in a system having multiple workstations networked together with a computer network, the method comprising the steps of:

organizing a group of multiple workstations into at least one workgroup based upon tasks, projects, or departments of users;

defining at least one workstation as a host workstation for each workgroup;

using the host workstation, generating a workgroup specification defining the configuration of the workstations in one of said workgroups and containing said configuration instructions;

maintaining for each workstation in said one workgroup a record of at least some of said instructions which have previously been executed including in said record the status of instruction execution; and enabling each workstation in said one workgroup to compare the workgroup specification instructions to the record of any of said instructions which have been executed previously, or also to examine the workstation's current condition, and then to re-execute those instructions in the workgroup specification that should be executed based upon their prior execution status and on the workstations' current condition.

5. A method in accordance with claim 4 wherein the instruction status is whether or not the instruction, when previously executed, was prevented from performing some action by the condition of the workstation.

6. A method in accordance with claim 5 wherein the condition of the workstation was whether a specified directory existed on a workstation, the absence of which directory prevented an instruction from performing some action.

7. A method in accordance with claim 6 wherein the instruction is a file copy instruction which only copies a file into a designated directory if the designated directory existed on a workstation.

8. A method in accordance with claim 6 wherein the instruction was a create directory instruction which only created a new directory within a designated directory if the designated directory exists on a workstation.

9. A method in accordance with claim 6 wherein the instruction was one which creates or modifies a system configuration file or registry only if a designated directory exists on a workstation.

10. A method in accordance with claim 9 wherein the file created or modified is an "ini" system configuration file.

11. A method in accordance with claim 5 wherein the condition of the workstation was whether a specified file existed on the workstation, the absence of which file prevented an instruction from performing some action.

12. A method in accordance with claim 11 wherein the instruction is a refresh instruction which only causes a file to be replaced if the file already exists on a workstation.

13. A method in accordance with claim 5 wherein the condition of the workstation was whether a problem with the network existed the presence of which problem prevented one or more instructions from performing some action.

14. A method in accordance with claim 13 wherein the instruction is a file copy instruction which can only copy a file across the network if the network is operating properly.

15. A method in accordance with claim 13 wherein the instruction is a refresh instruction which can only replace a file across the network if the network is operating properly.

16. A method in accordance with claim 5 wherein the condition of the workstation was whether a system configuration file or registry did or did not contain certain information.

17. A method in accordance with claim 4 wherein the instruction execution status is the precise identity and configuration of the system elements affected by instruction execution following instruction execution.

18. A method in accordance with claim 17 wherein the instruction copies a file and the precise configuration of the file is recorded as the status of instruction execution.

19. A method in accordance with claim 18 wherein the configuration of the file includes its name and most recent modification date.

20. A method in accordance with claim 17 wherein the instruction creates or modifies a system configuration file or registry and the information which the instruction adds to the file created or modified is recorded as the status of execution.

21. A method in accordance with claim 20 wherein the information added to the system configuration file or registry affects and configures the operation of an executable program that operates on the workstation.

22. A method in accordance with claim 17 wherein the current condition of the workstation examined includes the current status of at least some system elements whose status was recorded earlier as instruction execution status information, and wherein an instruction is re-executed if at least some of the instruction's recorded status information does not correspond precisely to the current status of these system elements, whereby the workstation is automatically reset to and maintained in a preferred proper state.

23. A method in accordance with claim 22 wherein the instruction copies a file and the precise configuration of the file is recorded as the status of instruction execution, wherein the current condition of the workstation includes the current status of the same file, and wherein the instruction is re-executed if the file has been deleted or otherwise modified in any way, thereby restoring the file to a preferred proper state.

24. A method in accordance with claim 23 wherein the directory in which a deleted file previously resided is restored, if it is missing, when the instruction is re-executed to recreate the file.

25. A method in accordance with claim 23 wherein the instruction execution status information which is compared to information derived from the current configuration of the workstation includes file size and file most recent modification date.

26. A method in accordance with claim 23 wherein the instruction creates or modifies a system configuration file or registry, the status information is specific information placed in that file or registry, the current condition of the workstation includes the existence of that file or registry and whether it still contains the specific information, and wherein the instruction is re-executed if the system configuration file or registry either does not exist or does not contain the correct information, thereby restoring the proper system configuration to support a preferred proper state of program execution.

27. A method of computer management automatically resetting the system to a preferred configuration by executing system configuration instructions in dependence upon a comparison of prior system status to the current condition of a workstation in a system having multiple workstations networked together with a computer network, the method comprising the steps of:

organizing a group of multiple workstations into at least one workgroup based upon tasks, projects or departments of users;

generating a workgroup specification defining the configuration of the workstations in one of said workgroups and containing said configuration instructions;

maintaining for each workstation in said one workgroup a record of the preferred configuration status established by execution of the instructions, wherein said status includes the identity and configuration of system elements directly affected by the instructions following their execution; and enabling each workstation in said one workgroup to compare the preferred configuration status to the workstation's current condition and then to execute those instructions in the workgroup specification that should be executed to reset the system to the preferred configuration, said workstation's current condition being defined by and including at least some of the same type of information included in said preferred configuration status.

28. A method in accordance with claim 27 wherein an instruction copies a file and the configuration of the file is recorded as the preferred status, wherein the current condition of the workstation includes the current configuration of the same file, and wherein the instruction is executed if the file has been deleted or otherwise modified in any way, thereby restoring the file to a preferred configuration.

29. A method in accordance with claim 28 wherein the directory in which a deleted file previously resided is restored, if it is missing, when the instruction is executed to recreate the file.

30. A method in accordance with claim 28 wherein the preferred status information compared to information derived from the current configuration of the workstation includes file size and file most recent modification date.

31. A method in accordance with claim 26 wherein the instruction creates or modifies a system configuration file or registry, the preferred status information is specific information placed in that file or registry, the current condition of the workstation includes the existence of that file or registry and whether it contains the specific information, and wherein the instruction is executed if the system configuration file or registry either does not exist or does not contain the correct information, thereby restoring the preferred system configuration for program execution.

32. A method of computer management automatically resetting a computer to a preferred configuration by executing system configuration instructions in dependence upon a comparison of prior computer status to the current condition of the computer, the method comprising the steps of:

generating a computer specification defining the configuration of the computer and containing said configuration instructions;

maintaining in said computer a record of the preferred configuration status established by execution of the instructions, wherein said status includes the identity and configuration of system elements directly affected by the instructions following their execution; and enabling the computer to compare the preferred configuration status to the computer's current condition and then to execute those instructions in the specification that should be executed to reset the system to the preferred configuration, said workstation's current condition being defined by and including at least some of the same type of information included in said preferred configuration status.

33. A method in accordance with claim 32 wherein an instruction copies a file and the configuration of the file is recorded as the preferred status, wherein the current condition of the workstation includes the current configuration of the same file, and wherein the instruction is executed if the file has been deleted or otherwise modified in any way, thereby restoring the file to a preferred configuration.

34. A method in accordance with claim 33 wherein the directory in which a deleted file previously resided is restored, if it is missing, when the instruction is re-executed to recreate the file.

35. A method in accordance with claim 33, wherein the preferred status information compared to information derived from the current configuration of the workstation includes file size and file most recent modification date.

36. A method in accordance with claim 32 wherein the instruction creates or modifies a system configuration file or registry, the preferred status information is specific information placed in that file or registry, the current condition of the workstation includes the existence of that file or registry and whether it contains the specific information, and wherein the instruction is executed if the system configuration file or registry either does not exist or does not contain the correct information, thereby restoring the preferred system configuration for program execution.

* * * * *